(12) United States Patent
Hütsch et al.

(10) Patent No.: US 7,269,664 B2
(45) Date of Patent: Sep. 11, 2007

(54) NETWORK PORTAL SYSTEM AND METHODS

(75) Inventors: Matthias Hütsch, Hamburg (DE); Ralf Hofmann, Hamburg (DE); Kai Sommerfeld, Hamburg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 644 days.

(21) Appl. No.: 09/759,740

(22) Filed: Jan. 12, 2001

(65) Prior Publication Data

US 2001/0034771 A1    Oct. 25, 2001

(30) Foreign Application Priority Data

Jan. 14, 2000   (EP) ................... 00100738

(51) Int. Cl.
*G06F 15/16* (2006.01)
*G09G 5/00* (2006.01)

(52) U.S. Cl. .............. 709/246; 345/672; 707/100; 707/3; 715/513; 715/514

(58) Field of Classification Search ............. None
See application file for complete search history.

(56) References Cited

U.S. PATENT DOCUMENTS

| | | | | |
|---|---|---|---|---|
| 5,339,422 A | 8/1994 | Brender et al. | ............. | 395/700 |
| 5,471,615 A | 11/1995 | Amatsu et al. | ............. | 709/202 |
| 5,481,721 A | 1/1996 | Serlet | ............. | 395/700 |
| 5,596,702 A | 1/1997 | Stucka et al. | ............. | 345/746 |
| 5,724,588 A | 3/1998 | Hill | ............. | 395/684 |
| 5,727,159 A | 3/1998 | Kikinis | ............. | 395/200.76 |
| 5,809,415 A | 9/1998 | Rossmann | ............. | 455/422 |
| 5,812,768 A * | 9/1998 | Page et al. | ............. | 709/228 |
| 5,826,062 A | 10/1998 | Fake, Jr. et al. | ............. | 715/513 |

(Continued)

FOREIGN PATENT DOCUMENTS

EP      0766172 A1    4/1997

(Continued)

OTHER PUBLICATIONS

Dan Johnson, Converting PC GUIs for NonPC Devices, Feb. 1998, Circuit Cellar Ink, pp. 40-45.*

(Continued)

*Primary Examiner*—Ashok B. Patel
(74) *Attorney, Agent, or Firm*—Gunnison, McKay & Hodgson, L.L.P.; Forrest Gunnison

(57) ABSTRACT

A network portal system includes a web-top manager and a universal content broker system. The web-top manager is configured to receive a content request from a user device, where the content request includes a content provider identifier. The universal content broker system is coupled to the web-top manager. The universal content broker system includes a plurality of content providers. Each content provider in the plurality of content providers is associated with a different content provider identifier. Also, each content provider accesses content having a different raw data format. A universal content broker is coupled to the web-top manager and to the plurality of content providers. Upon the receipt of the content request from the web-top manager, the universal content broker passes the request to a content provider in the plurality of content providers that is associated with the content provider identifier.

40 Claims, 31 Drawing Sheets

U.S. PATENT DOCUMENTS

| | | | |
|---|---|---|---|
| 5,862,328 | A | 1/1999 | Colyer ................ 395/200.33 |
| 5,958,013 | A | 9/1999 | King et al. ................ 709/227 |
| 5,999,988 | A | 12/1999 | Pelegri-Llopart .......... 709/304 |
| 6,012,098 | A | 1/2000 | Bayeh et al. ............... 709/246 |
| 6,078,866 | A * | 6/2000 | Buck et al. .................... 702/2 |
| 6,182,129 | B1 | 1/2001 | Rowe et al. ............... 709/221 |
| 6,286,003 | B1 | 9/2001 | Muta .......................... 707/10 |
| 6,300,947 | B1 | 10/2001 | Kanevsky .................. 345/333 |
| 6,323,881 | B1 | 11/2001 | Broulik et al. ............. 715/744 |
| 6,421,733 | B1 * | 7/2002 | Tso et al. ................... 709/246 |
| 6,591,245 | B1 * | 7/2003 | Klug ........................... 705/10 |
| 6,717,593 | B1 | 4/2004 | Jennings ..................... 715/760 |
| 6,732,330 | B1 * | 5/2004 | Claussen et al. ........... 715/513 |
| 6,880,126 | B1 | 4/2005 | Bahrs et al. ................ 715/526 |
| 7,020,882 | B1 | 3/2006 | Lewallen .................... 719/328 |
| 7,072,932 | B1 | 7/2006 | Stahl ......................... 709/203 |
| 2001/0009016 | A1 | 7/2001 | Hoffmann et al. .......... 709/219 |
| 2001/0020255 | A1 | 9/2001 | Hoffmann et al. .......... 709/318 |
| 2001/0034771 | A1 | 10/2001 | Hutsch et al. .............. 709/217 |
| 2001/0037417 | A1 | 11/2001 | Meyer ........................ 709/332 |
| 2001/0039540 | A1 | 11/2001 | Hoffmann et al. ............. 707/3 |
| 2002/0049833 | A1 * | 4/2002 | Kikinis ....................... 709/219 |
| 2002/0059344 | A1 | 5/2002 | Britton et al. |

FOREIGN PATENT DOCUMENTS

| | | |
|---|---|---|
| EP | 0 825 526 A1 | 2/1998 |
| EP | 0 908 832 A2 | 4/1999 |
| EP | 0969389 A2 | 1/2000 |
| WO | WO96/37817 | 11/1996 |
| WO | WO98/02810 | 1/1998 |
| WO | WO98/02814 | 1/1998 |
| WO | WO98/24020 | 6/1998 |
| WO | WO98/47270 | 10/1998 |
| WO | WO98/53393 | 11/1998 |
| WO | WO 00/20985 | 4/2000 |

OTHER PUBLICATIONS

Java™ 2 Platform Enterprise Edition Specification, Version 1.2, Final Release, Sun Microsystems, Inc., Palo Alto, CA, Dec. 17, 1999.

JavaServer Pages™ Specification, Version 1.1, Sun Microsystems, Inc., Palo Alto, CA, Nov. 30, 1999.

Java™ Servlet Specification, Version 2.2, Final Release Sun Microsystems, Inc., Palo Alto CA, Dec. 17, 1999.

Ford and O'Higgins, "Public-Key Cryptography and Open Systems Interconnection," *IEEE Communications Magazine*, vol. 30, No. 7, pp. 30-35 (Jul. 1992).

Hild and Robinson, "Mobilizing Applications," *IEEE Personal Communications*, vol. 4, No. 5, pp. 26-34 (Oct. 1997).

Bickmore et al., "Web Page Filtering and Re-Authoring for Mobile Users," *Computer Journal, Oxford University Press for British Computing Society*, vol. 42, No. 6, pp. 534-546, 1999.

Evans and Rogers, "Using Java Applets and Corba for Multi-User Distributed Applications," *IEEE Internet Computing*, vol. 1, No. 3, pp. 43-55, May-Jun. 1997.

Dömel, "Mobile Telescript Agents and the Web," *Digest of Papers of the Computer Society Computer Conference Compcon*, Conf. 41, pp. 52-57, Feb. 2, 1996.

Cunningham, "Architecture for Location Independent CORBA Environments," MSc Degree Dissertation, University of Dublin, Dublin Ireland, pp. 1-104, Sep. 1998.

Eberhardt et al., "Electronic Commerce-A Comparative Study of Web Based Database Access," *XVI World Telecom Congress Proceedings*, pp. 97-104, Sep. 21, 1997.

Gokhale and Schmidt, "Evaluating the Performance of Demultiplexing Strategies for Real-time CORBA," *Global Telecommunications Conference*, IEEE, pp. 1729-1734, Nov. 3, 1997.

Berg, "How Do I Transfer Data Securely?" *Dr. Dobb's Journal*, pp. 119-121, Feb. 1998.

Koffman and Wolz, "CS1 Using Java Language Features Gently," *Proceedings of the 4th Annual SIGSCE/SIGCUE Conference on Innovation and Technology in Computer Science Education*, Krakow, Poland, pp. 40-43, Jun. 27, 1999.

Coddington et al., "Web-Based Access to Distributed High-Performance Geographic Information Systems for Decision Support," *Proceedings of the 32nd Hawaii International Conference on System Sciences*, pp. 1-12, Jan. 5, 1999.

Cimpu et al., "Dynamic Managed Objects for Network Management," *Proceedings of the 1999 IEEE Canadian Conference on Electrical and Computer Engineering*, pp. 156-161, May 9-12, 1999.

Schmidt et al., "Experiences with VDM in Compiler Construction," *Informationstechnik IT*, vol. 29, No. 4, pp. 211-216, Jan. 1, 1987.

Johnson, D., "Converting PC GUIs for Non PC Devices", Circuit Cellar Ink, Vernon, CT, vol. 91, Feb. 1998, pp. 40-42, 44-45, XP000852859.

Jones, G. et al., "Web-based Messaging Management Using Java Servlets", Integrated Network Management VI. Distributed Management for the Networked Millennium. Proceedings of IM'99 6th IFIP/IEEE International Symposium, (CAT. No. 99EX302), Piscataway, NJ, pp. 19-33, XP002166299.

"Announcement: SAX—Simple API for XML (Jan. 12, 1998 Draft)", p. 1, http://www.oasis-open.org/cover/SAXAnn980112.html.

Garshol, L., "Free XML Software", Dec. 15, 1999, pp. 1-53, http://horizon.nserl.purdue.edu/Xml/XMLtools.html.

"New SAXON Release (3.03)", Sep. 1, 1998, pp. 1-2, http://xml.coverpages.org/saxon980901.html.

St. Laurent, S., "Toward a Layered Model for XML," (C) 1999, pp. 1-17, http://www.simonstl.com/articles/layering/layered.htm.

Wallace, M. and Runciman, C., "Haskell and XML: Generic Combinators or Type-Based Translation?" ICFP'99 Sep. 1999, ACM, pp. 148-159.

"XT extension mechanism", Jan. 2, 1999, pp. 1-2, http://www.oasis-open.org/cover/xt-extension199901.html.

N. Freed, N. Borenstein, Network Working Group, Request for Comments: 2045, "Multipurpose Internet Mail Extensions (MIMe) Part One: Format of Internet Message Bodies," Nov. 1996.

Eric Miller, An Introduction to the Resource Description Framework, D-Lib Magazine, ISSN 1082-9873, May 1998.

Extensible Stylesheet Language (XSL) Specification, W3C Working Draft Apr. 21, 1999, pp. 1, 16 and 17.

Digital Equipment Corporation, "COM/CORBA Interworking," Aug. 22, 1995.

Digital Equipment Corpoartion, "COM/CORBA Interworking RFP Part A," Revised Joint Submission, Dec. 22, 2995.

Otte, Randy et al. "Understanding CORBA, The Common Object Request Broker Architecture" Prentice-Hall Inc., Upper Saddle River, NJ, 1996.

Vogel, Andreas, et al. "C++ Programming with CORBA" John Wiley and Sons, Inc., pp. 1-27, 1999.

Fielding, et al. "Hypertext Transfer Protocol—HTTP/1.1", *Network Working Group; Request for Comments: 2068; Category: Standards Track*, pp. 1-162, Jan. 1997.

Zeiger, Stefan, "Servlet Essentials", Version 1. 3. 5, Nov. 4, 1999, pp. 1-52 [online]. Retrieved from the Internet at URL: <http://www.novocode.com/doc/servlet-essentials/>.

Moore, Robert Byron, "An Extensible Architecture for Distributed Object System Interoperability", pp. 1-81, University of Illinois at Urbana-Champaign, 1998.

Weiler, John et al., "COM-CORBA Interoperation for DII COE Applications", Version 7, Oct. 13, 1999, pp. 1-28 [Online], Retrieved from the Internet on Nov. 22, 2005.

Rosen, Lowell, "Architectural Issues in COM/CORBA Bridging", The MITRE Corporation, Nov. 19, 1997, pp. 1-4 [Online], Retrieved from the Internet on Nov. 22, 2005.

Author Unknown, "A history of browsers", Aug. 8, 2004, URL: <http://www.quirksmode.org/browsers/history.html>.

* cited by examiner

```
<%--Default html-template--%>
<%@ taglib uri="/WEB-INF/config/taglib.tld"prefix="starportal"%>
<%@ page import = "com.sun.star.portal.web.servlets.MainServlet"%>
<%@ page import = "com.sun.star.portal.web.beans.ErrorBean"%>
<%@ page import = "com.sun.star.portal.web.beans.LoginBean"%>
<html>
 <head>
  <starportal:insert componentName="Action"/>
  <title>
      <starportal:insert componentName="Title"/>
  </title>
  <meta name="description" content="StarPortal">
  <meta name="keywords" content="starportal, staroffice, software">
  <meta http-equiv="Content-Type" content="text/html; charset=iso-8859-1">
 </head>
<body leftmargin="0" topmargin="0" marginwidth="0" marginheight="0"
background="<%request.getContextPath()%>/pics/fillgrey.gif">
...
<tr>
<td width="%"height="18">
    <starportal:insert componentName="Shortcuts"/>
</td>
 ...
    <table width="100%" border="0" cellspacing="0" cellpadding="0">
    <tr>
     <td width=10></td>
     <td>
        <p><starportal:insert componentName="CurrentFolder"/></p>
        <p><starportal:insert componentName="FolderView"/></p>
        <p><starportal:insert componentName="FileView"/></p>
     </td>
    </tr>
    <tr><td height=10></td></tr>
    </table>
  <%
    }
      else
      {
  %>
        <p><starportal:insert componentName="Error"/></p>
  <%
    request.removeAttribute(MainServlet.ERROR);
    }
  %>
</body>
</html>
```

FIG. 11

```
<root node>
<default template="/html/HTMLTemplate.jsp" class="default">

<!-- processing WAP Devices --> if (user-agent=Nokia*)
    then (use template=WMLTemplate.jsp for generating all other WAP-based pages)

if (user clicks Bookmarks (module=hcpExplorer))
    then (use template=WMLTemplate.jsp AND its associated components as required per request)

elseif (user clicks Clipboard (module=clipboard))
    then (use template=WMLTemplate.jsp AND its associated components as required per request)

elseif (user clicks My Documents (module=explorer))
    then (use template=WMLTemplate.jsp AND its associated components as required per request)

elseif (user clicks Network portal system 100 (module=login))
    then (use template=WMLLoginTemplate.jsp AND its associated components as required per request)

elseif (user provides correct username and password and clicks Login (module=start))
    then (use template=WMLTemplate.jsp AND its associated components as required per request)
```

FIG. 12A

```
<!-- processing Palm VII Devices -->
elseif (user-agent=Palm VII)
  then (use template=PQATemplate.jsp)

if (user clicks a StarOffice document (resource=StarOffice document))
  then (use servlet=com.sun.star.portal.web.servlets.StarOfficeServlet)

if (command=installRVP)
  then (use template=PQATemplate.jsp and its associated components as requested)

elseif (user clicks a non-StarOffice document (resource=non-StarOffice Document))
  then (use servlet=com.sun.star.portal.web.servlets.DocumentServlet)

elseif (user clicks Bookmarks (module=hcpExplorer))
  then (use template=PQATemplate.jsp AND its associated components as required per request)

elseif (user clicks Clipboard (module=clipboard))
  then (use template=PQATemplate.jsp AND its associated components as required per request)

elseif (user clicks My Documents (module=explorer))
  then (use template=PQATemplate.jsp AND its associated components as required per request)

elseif (user clicks Network portal system 100 (module=login))
  then (use template=PQACCPPTemplate.jsp AND its associated components as required per request)

elseif (user provides correct username and password and clicks Login (module=start))
  then (use template=PQATemplate.jsp AND its associated components as required per request)
```

FIG. 12B

```
<!-- processing HTML Devices --> elseif (command = download)
then (use servlet=com.sun.star.portal.web.servlets.DownloadPrepareServlet)

elseif (command = downloadexecute)
then (use servlet=com.sun.star.portal.web.servlets.DownloadExecuteServlet)

elseif (user clicks a StarOffice document (resource=StarOffice document))
then (use servlet=com.sun.star.portal.web.servlets.StarOfficeServlet)

elseif (command=installRVPSetup)
then (use servlet=com.sun.star.portal.web.servlets.InstallServlet)

if (command=installRVP)
then (use servlet=HTMLTemplate.jsp and its associated components as requested)

elseif (user clicks a non-StarOffice document (resource=non-StarOffice Document))
then (use servlet=com.sun.star.portal.web.servlets.DocumentServlet)

elseif (user clicks Bookmarks (module=hcpExplorer))
then (use template=HTMLTemplate.jsp AND its associated components as required per request)

elseif (user clicks Clipboard (module=clipboard))
then (use template=HTMLTemplate.jsp AND its associated components as required per request)

elseif (user clicks My Documents (module=explorer))
then (use template=HTMLTemplate.jsp AND its associated components as required per request)

elseif (user clicks Network portal system 100 (module=login))
then (use template=CCPPTemplate.jsp AND its associated components as required per request)

elseif (user provides correct username and password and clicks Login (module=start))
then (use template=HTMLTemplate.jsp AND its associated components as required per request)
```

FIG. 12C

```
<?xml version="1.0" encoding="ISO-8859-1"?>
<node>
  <screen template="/html/HTMLTemplate.jsp" class="default">
    <component name="Title" value="StarPortal Default page" direct="true" />
    <component name="Error" value="/html/HTMLError.jsp" />
  </screen>
...
<node>
  <requirement type="requestParameter" name="module" value="login" />
  <screen template="/html/CCPPTemplate.jsp" class="ccpp" >
    <component name="Title" value="StarPortal Login" direct="true" />
    <component name="CurrentFolder" value="/html/HTMLLogin.jsp" />
    <component name="Error" value="/html/HTMLError.jsp" />
  </screen>
</node>
<node>
  <requirement type="requestParameter" name="module" value="start" />
  <screen class="default" >
    <component name="Title" value="StarPortal Welcome" direct="true" />
    <component name="Shortcuts" value="/html/HTMLShortcute.jsp" />
    <component name="FolderView" value="/html/HTMLWelcome.jsp" />
  </screen>
</node>
```

FIG. 13A

```
<node>
  <requirement type="requestParameter" name="module" value="explorer" />
  <screen class="default">
    <component name="Title" value="StarPortal Explorer" direct="true" />
    <component name="Shortcuts" value="HTMLShortcuts.jsp" />
    <component name="CurrentFolder" value="/html/HTMLCurrentFolder.jsp" />
    <component name="FolderView" value="$FOLDERVIEW" />
    <component name="FileView" value="$FILEVIEW" />
  </screen>
</node>
<substitution name="$FILEVIEW">
  <element>
    <requirement type="requestParameter" name="viewTypeFiles" value="iconView" />
    <result value="/html/HTMLFileView.jsp" />
  </element>
  <element>
    <requirement type="requestParameter" name="viewTypeFiles" value="detailView" />
    <result value="/html/HTMLFileTableView.jsp" />
  </element>
</substitution>

<substitution name="$FOLDERVIEW">
  <element>
    <requirement type="requestParameter" name="viewTypeFolders" value="iconView" />
    <result value="/html/HTMLFolderView.jsp" />
  </element>
  <element>
    <requirement type="requestParameter" name="viewTypeFolders" value="detailView" />
    <result value="/html/HTMLFolderTableView.jsp" />
  </element>
</substitution>
```

```
<envelop>
<header>
 <transaction type="request"
        name="openNode"
        clientId="C0" serverId=" " />
</header>
 <body>
  <params total=2
     <data name="nodepath" type="String"
      <value> "com.sun.star/Writer" </value>
     </data>
     <data name="numLevels" type="int"
      <value> 1 </value>
     </data>
  </params>
 </body>
</envelop>
```

FIG. 19A

```
<envelop>
 <header>
  <transaction type="Acknowledgement"
           name="openNode"
           clientId="C1"
           serverId="R01"/>
 </header>
</envelop>
```

FIG. 19B

```
<envelop>
  <header>
    <transaction type="response"
                 name="openNode"
                 clientId="C2"
                 serverId="R02/>
  </header>
  <body>
    <params total=2
      <data name=type="String"
        <value> "N001" </value>
      </data>
      <data type="Node"
        <value> "......" </value>
      </data>
    </params>
  </body>
</envelop>
```

FIG. 19C

```
<envelop>
  <header>
    <transaction type="error"
                 name="openNode"
                 clientId="C3"
                 serverId="R03"/>
  </header>
  <body>
    <params total=2
      <data type="String"
        <value> "ERRNODEOPEN" </value>
      </data>
      <data type="String"
        <value> "Could not open the given node. XML file does not exist" </value>
      </data>
    </params>
  </body>
</envelop>
```

FIG. 19D

```
<envelop>
  <header>
    <transaction type="notify"
                 name=" "
                 id=" " />

</header>
  <body>
   <params total=2
     <data type="Nodepath"
       <value> "root/ApplProfile/starPortal/Writer" </value>
     </data>
     <data type="Node"
       <value> "......" </value>
     </data>
   </params>
  </body>
</envelop>
```

FIG. 19E

NETWORK PORTAL SYSTEM AND METHODS

BACKGROUND OF THE INVENTION

1. Field of the Invention

This invention relates generally to network systems and in particular to network portal systems 2. Description of Related Art Laptop and notebook computers abound, virtually every enterprise in every business sector uses e-mail for internal and external communications, mobile phones are commonplace, and many people carry personal digital assistants (PDAs) with wireless communication capability. Internet cafes can be found in almost every city, airports routinely have Internet kiosks, and most hotel rooms come equipped with data communication facilities.

With these developments come limitations and frustrations. Laptops and notebooks frequently require that special applications be installed. If work needs to be done when that particular machine is not available, the work must be postponed. In addition, there are employees without laptops who nonetheless need to access information and applications when they are away from the office.

Data on laptops must be synchronized with data on the enterprise's central computers. Before employees can work on their laptops, they must be certain that they have the latest information, and that after they have finished, the centrally housed information must be updated.

Functionality available from mobile phones and PDAs is typically limited to general information services, such as stock quotes and airline schedules.

Many enterprises have realized significant benefits from client/server technology, but this typically entails the installation of specialized software on the client systems, thereby limiting access to only those devices with the specialized software as well as placing a maintenance burden on the organization, which must propagate changes and updates to all individual workstations, laptop computers, etc.

As organizations implemented individual applications, frequently in different languages, functionality and data often became fragmented. A growing amount of valuable information is available from web-based service providers. However, locating the information can be time-consuming, and the information comes in as isolated pieces of data.

As a result, people are frequently not able to do the work they need to do when they want to do it. The information would be more valuable if the information were made available to corporate applications and merged with enterprise data.

Competitive business pressures make this issue even more urgent. Not long ago, it was perfectly acceptable, for example, for a salesperson to return to a customer's office the following day with requested information. Today, however, immediacy and convenience are the keywords; with the Internet, people have become accustomed to accessing data on demand and to taking action whenever they wish. Any work that has to be postponed because the salesperson could not access applications or data can mean lost opportunity.

Enterprise portals are being developed to close the gap between what users would like to do and what technological constraints permit them to do. While the rapid rate of recent technological innovation has been exciting, there are many attendant restrictions.

Enterprise portals allow users to access a wide variety of applications, services, and data through a single entry point (the portal). Portal computing is a network solution that aims to make recent technological advances serve the way people actually work-r would like to work. Recognizing the advantages of portal computing, several service providers have already embraced the concept, albeit in a limited sense, offering their customers a growing number of application services. Notable examples include Yahoo!, Excite, and Lycos. Although these all started as search engines, they now offer such capabilities as e-mail, stock quotes, calendar facilities, etc.

Quick to join the bandwagon, many suppliers have announced portal products. Some are not solutions, but rather tools that would allow companies to develop their own, severely limited portals. Some products provide the ability to access and consolidate different types of data from various sources for reporting purposes, but do nothing to support the inclusion of existing applications. Others may support a diversity of data as well as the ability to interface with existing applications (to varying degrees), but they place restrictions on the types of devices people can use to access the system.

A further limitation of these portal products is the great number of different content and services available over a network like the Internet which in turn, has lead to an enormous variety of different communication standards, data formats and file formats, which are sometimes proprietary for the particular content and services.

As a consequence, services or content provided by some provider systems may be incompatible with services or content provided by other provider systems and thus have a "stove-pipe" nature as to their presence and operation on networks. In addition, there exist many different communication schemes for content or service, which communication schemes again may be incompatible and not universally accessible or supported by all client systems. Accordingly, the existing portal products are limited to a subset of client systems and permit this subset of client systems to access at most a limited amount of content that is available.

SUMMARY OF THE INVENTION

According to one embodiment of the present invention, a network portal system allows the universal and integral use of different services by arbitrary client systems. The network portal system links, via a communication network, a plurality of content provider systems with a plurality of client systems. Each content provider system that offers content is associated with a content identifier, which in one embodiment is a URL scheme. The content is information that is transmittable over the communication network.

In one embodiment, the network portal system includes a web-top manager. The web-top manager receives a content request from a client system. According to one embodiment of the present invention, each content request includes a content identifier of the content requested by the requesting client system. Optionally, the content request includes a client system identifier and/or a content type. Alternatively, a process on the network portal system may determine the client system identifier and content types supported by the client device.

The web-top manager in the network portal system communicates with a universal content broker system that also is in the network portal system. Upon receipt of a content request from the web-top manager, a universal content broker in the universal content broker system, using resources within the network portal system, selects a content provider system, which is able to provide the requested content. Next, the universal content broker accesses the selected content provider system, and issues a request that results in the performance of the action specified in the request by the accessed provider system.

If the request was to retrieve content, the content in a raw data format is passed to the web-top manager. The web-top manager renders the requested content into a page that can be displayed by the requesting client system and this page is returned to the requesting client system. Thus, the network portal system with its different aspects allows a client to get content from a provider system even if the client system and the provider system do not use the same communication protocol.

Provider systems are associated with the URL schemes they implement. A service or content is obtained by passing a uniform resource indicator URL to a provider system. The provider system infers what the scheme is and therefore what provider system can create the content. Provider systems create content objects that implement defined network portal interfaces associated with content such that a client system can infer and or operate on: MIME type, child content, commands, properties, changes to state.

In addition, new content may be created from existing content and stored to be retrieved later. The new content may be related to the existing content. An example of which could be an address book that may only store content of type "folder" and "address".

In another embodiment of the present invention, the network portal system includes a web-top manager and a universal content broker system. The web-top manager is configured to receive a content request from a user device, where the content request includes a content provider identifier.

The universal content broker system is coupled to the web-top manager. The universal content broker system includes a plurality of content providers. Each content provider in the plurality of content providers is associated with a different content provider identifier. Also, each content provider accesses content having a different raw data format. A universal content broker is coupled to the web-top manager and to the plurality of content providers. Upon the receipt of the content request from the web-top manager, the universal content broker passes the request to a content provider in the plurality of content providers that is associated with the content provider identifier.

The web-top manager includes a plurality of remote applications; a web server; a main servlet executing on the web server, wherein the main servlet receives a user device content request; and a presentation and logic system coupled to the main servlet. The presentation and logic system is configured to receive raw data content in a plurality of different raw data formats from the universal content broker system. The presentation and logic system converts raw data content irrespective of the raw data format, based upon characteristics of the user device, into a page displayable on the user device.

In one embodiment, the presentation and logic system includes a plurality of templates. A first set of template sets is for a first type of user device page format. A second set of template sets is for a second type of user device page format. A third set of template sets is for a third type of user device page format. In general, there is a template set for each unique type of user device, which means that the user device cannot display a page created for another user device.

In one embodiment, the first set of template sets includes a set of content format template sets wherein each content format template set is for a different one of the plurality of different raw data formats. The set of content format templates include a set of device capability specific templates.

Yet another embodiment of the presentation and logic system includes a plurality of adapter objects coupled to a plurality of provider objects. Each adapter object is associated with a different content provider identifier. The adapter object receives content from a content provider associated with the different content provider identifier and provides the content to the provider object associated with the different content provider identifier. The provider object selects an appropriate template from the above-mentioned sets and causes information, in the content received, to be inserted in the template so that the page returned to the user device includes the requested content.

In still yet another embodiment, the presentation and logic system includes a profiling service and a profiling service configuration file coupled to the profiling service. The profiling service configuration file includes a decision tree wherein the decision tree performs actions. In one embodiment, the decision tree is a XML decision tree. The actions performed by the decision tree include: an action based upon request parameters; an action based upon request header parameters; an action based upon user device properties; and an action based upon resource properties.

This embodiment of the presentation and logic system also includes a plurality of screen templates. One screen template in the plurality of screen templates is a default screen template for a HTML page. Another one screen template in the plurality of screen templates is a default screen template for a mobile telephone. Still another screen template in the plurality of screen templates is a default screen template for a personal digital assistant.

One screen template in a plurality of the screen templates comprises a default screen template. The default screen template includes a header region having at least one placeholder and a body region having at least one placeholder. An action of the decision tree determines a component that is used for the at least one placeholder in the body region. The component provides information that is taken from the raw data content.

In another embodiment, a universal content broker system also includes a registry of content providers coupled to the universal content broker. The universal content broker selects the content provider from the registry based upon the content provider identifier. The universal content broker system also includes: at least one interface adapted to associate property values with content; at least one interface adapted to set a property value of content; at least one interface adapted to read a property value of content; an interface adapted to notify registered client systems when content of interest to the registered client systems is processed by the universal content broker system; and an interface adapted to notify registered client systems when content of interest to the registered client systems is created by the universal content broker system.

Still another embodiment of the universal content broker system includes a hierarchy content provider. The hierarchy content provider generates a virtual hierarchy of content of the universal content broker system.

Still yet another embodiment of the universal content broker system includes a configuration server. A configuration proxy is coupled to the configuration server.

The configuration server further includes a first DOM tree that in turn includes user profiles and application profiles.

The configuration proxy includes a second DOM tree that in turn includes a subset of data in the first DOM tree.

A client system is coupled to the network portal system. The client system includes a client universal content broker system. The client universal content broker system includes a synchronization component for synchronizing content of the client universal content broker system with content of the universal content broker system.

In one embodiment of the present invention a computer program product comprising computer program code for a universal content broker service including at least one of, or alternatively any combination of a component interface; a content provider interface; a content provider manager interface; and a content identifier factory interface.

In another embodiment, a computer program product comprising computer program code for a configuration and logic service includes a profiling service and a plurality of screen templates.

A method for providing a plurality of content having different types and different protocols to a single user interface includes:

receiving a content request from a client system the content request comprising a content identifier;

selecting a content provider associated with the content identifier from a plurality of content providers wherein each of the content providers provides access to content having a different raw data format;

retrieving the requested content from the selected content provider; and using the retrieved requested content to generate a page displayable on the client system.

Hence, the inventive network portal system delivers the framework for:

Aggregation of existing network portal services so that they are presented for use from single access points.

Interfacing new and existing application systems and enabling them to be presented as network services.

Coupling of separate network service provider systems to deliver integrated functional interactions between these previously standalone network services systems.

Allowing the construction of new network services which are constructed by joining and reconstituting existing network services.

Unifying the interfacing to the services, including the user interfaces (UI) and the service provider interfaces (SPI). By unification of the UI framework, users can experience a contiguous "surfing" metaphor for interactions. Unification of the SPI enhances extensibility and the construction of more sophisticated services with the existing services available as common building blocks.

Creating a highly scalable network service portal infrastructure, using distributed service portal servers—effectively a web of network portal systems.

In one embodiment, the inventive network portal system is used for providing the interfacing and aggregation of services via a network, and acts as a content switch leading these streams to the appropriate service filters of the network portal system, e.g., Office productivity, file format conversion, user interface management, etc. The inventive network portal system is a framework designed to unify the access, modification and creation of structured information.

Services or content such as file systems, databases, mail and news in addition to files, records, mail, and news messages may be represented abstractly using the inventive network portal system in this embodiment. A hierarchy of content may be represented according to the concepts of parent-, peer-, child-relationships. Further, content may be considered as being tasks, which in turn may be further split into higher forms of properties, and commands. Values of properties may be set and obtained. Content may have a set of commands that operate on it.

The communication network may be of any type suitable for communication between computer systems, wired, partially or totally wireless. The computer systems may be of any type of processing environments, and of any size. They may be embedded into other systems.

BRIEF DESCRIPTION OF THE DRAWINGS

FIG. 11 is an actual example of a portion of a default template according to another embodiment of the present invention.

FIGS. 12A to 12C are pseudo code for a decision tree of the profiling service according to another embodiment of the present invention.

FIGS. 13A and 13B are portions of an actual decision tree used in generating the display of FIG. 10 according to another embodiment of the present invention.

FIGS. 19A to 19E are examples of envelopes used by the configuration server according to another embodiment of the present invention.

Figure 1A:
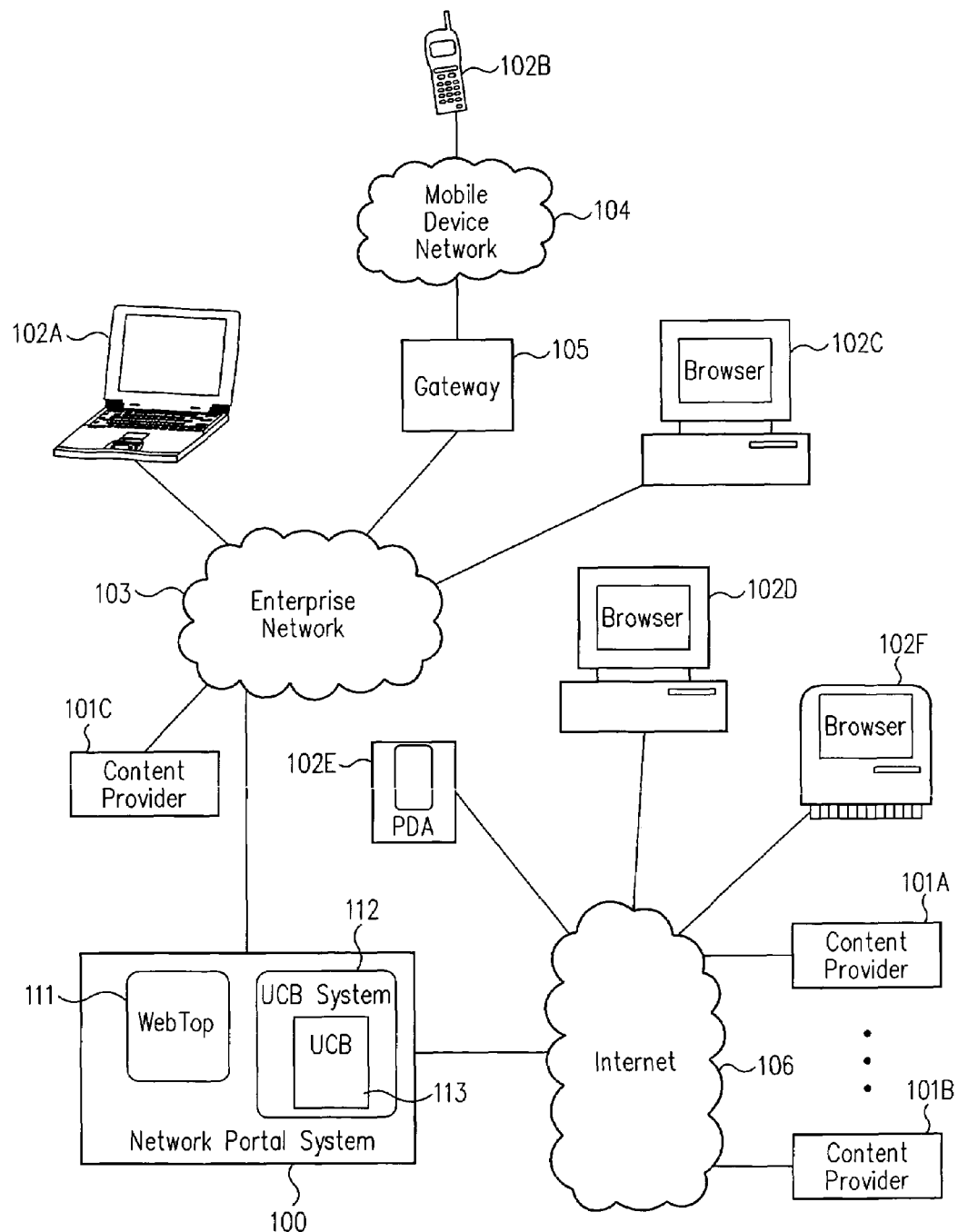
FIG. 1A is a conceptual diagram of a network portal system that includes a web top manager and a universal content broker system according to one embodiment of the present invention.

In the drawings and the following detailed description, elements with the same reference numeral are the same or similar elements. Also, the first digit of a three digit reference numeral and the first two digits of four digit reference numeral indicate the first drawing in which that element appeared.

In the Detailed Description, the headings are for convenience only and are not to be interpreted as limiting any element of the invention to the disclosure under a particular heading. Each embodiment of each element is determined by the entirety of this disclosure. Also, italics are used for convenience only, i.e., an italicized word, and the same word but not in italics are in fact the same thing.

DETAILED DESCRIPTION

According to one embodiment of the present invention, a network portal system 100 solves the prior art portal limitations by giving users access from whatever device is available at the time, through a single system entry point, i.e., "a portal," to a complete complement of applications, services, and data. As explained more completely below, network portal system 100 frees a user from time and location constraints when accessing the complete complement of applications, services, and data.

A user can access applications and data on network portal system 100 from almost any available device, e.g., any one of portable computer 102A, a mobile telephone 102B, a workstation 102C, a home personal computer (PC) 102D, a personal digital assistant 102E, or an Internet café machine 102F. No longer is a user limited to using either workstations and/or portable computers with specialized software installed, or to using any particular Internet Service Provider.

Moreover, network portal system 100 provides the user with comprehensive functionality. The user's full range of applications is always available to the user. In addition, enterprises can easily incorporate existing applications into network portal system 100. Also, the user can access multiple data sources via network portal system 100. Different types and formats of data, from different applications, can all be accessed and processed within a single user interface. Further, data from external sources, such as stock quotes from web-based service providers, can be accessed using the same single user interface.

For example, a user on a vacation overseas suddenly realizes that the presentation her boss is going to deliver the next morning contains a critical error. The user drops by an Internet café and from any machine 102F at the café accesses the presentation via network portal system 100, and makes the necessary corrections using applications written, for example, in a scripting language and/or the C++ programming language even though only a browser is available on machine 102F.

In another scenario, the user is having dinner at a friend's house, and gets an urgent call saying that a report that can be assessed via network portal system 100 must be revised that evening. The revisions will not require much work, but the trip to the office and back is a very unwelcome prospect. Using the friend's PC 102D and the friend's Internet service provider, the user works on the report without leaving his friend's home.

Another user is expecting an important document, but the user has a business appointment outside the office. The document arrives by e-mail while the user is in transit. Using a PDA 102E while on the train, the user accesses the e-mail using network portal system 100, reviews the document, and then re-directs the document to the fax machine at the site to which the user is going.

A customer would like to meet with a user tomorrow. The user thinks he will be available, but the user doesn't know whether anyone scheduled the time while the user was away from the office, and now the office is closed. Using a mobile telephone 102B, the user accesses his up-to-the-minute calendar via network portal system 100 and schedules the appointment.

Hence, according to one embodiment of the present invention, network portal system 100 is a comprehensive client/server offering that enables users to access their applications, data, and services from almost any device anywhere. The applications and data are stored on network portal system 100 and are accessed using a web-top manager 111 in combination with a universal content broker system 112 that includes universal content broker 113. In one embodiment, web-top manager 111 and universal content broker system 112 are designed as a distributed system that can be spread over multiple host machines, and can run on platforms utilizing any one of the operating systems Solaris, Windows NT/Windows 2000 (server version), or Linux.

In one embodiment, using a web browser and an Internet connection on any JAVA-enabled system, the user simply logs on to a web server in web-top manager 111, and proceeds as though everything were locally resident on his/her machine. (JAVA is a trademark of Sun Microsystems, Inc. of Palo, Alto, Calif.) While execution actually takes place on the web server, this fact is transparent to the user. Similarly, local services available on a client system, including devices like printers and local storage, can be utilized by web server-based components in a transparent manner.

In addition to using JAVA-enabled browsers, users can access applications and data from Wireless Application Protocol (WAP) devices, which include mobile phone 102B, or from other hand-held devices such as PDA 102E. Because of the limited capabilities of devices 102B and 102E, functionality is not as extensive as from a system that can run a full browser. Accordingly, in one embodiment, users are able to view their mail and data, but users don't have full editing capabilities in this embodiment. However, users can use mobile phones and PDAs to manage their data and the users can direct the movement of information to other devices.

In one embodiment, web-top manager 111 includes a plurality of remote applications, such as office applications that include, for example, a word processing application, a spreadsheet application, a database application, a graphics and drawing application, an e-mail application, a contacts manager application, a schedule application, and a presentation application. One office application package, suitable for use with this embodiment of the present invention, is the STAROFFICE Application Suite available from Sun Microsystems, Inc., 901 San Antonio Road, Palo Alto, Calif. (STAROFFICE is a trademark of Sun Microsystems, Inc.)

As explained more completely below, the user accesses and runs a user selected remote application using only a thin-client on the user's device with a lightweight component installed. To the user, it appears as if the remote application is installed on the user device. However, typically, both the data being processed and the remote application are on network portal system 100. In addition, network portal system 100 allows users to incorporate their own applications and data seamlessly, as well as to give the users access to information from external service providers. Network portal system 100 can be a user's sole entry into the world of information.

In one embodiment, access to external service providers is provided through portlets, where each portlet accessible by a user is represented on the display of the user device by an icon or perhaps a text name. For example, in FIG. 1B, a display 150 of user device 102A includes icons 120 to 122, each of which is associated with a different portlet. Through use of a dynamic content channel, e.g., a portlet, a highly customizable content page may be produced for any individual client system.

In one embodiment, when a portlet icon is selected on a user device, the content associated with the portlet is retrieved by network portal system 100 and automatically transformed by network portal system 100 into data that can be displayed by that user device. Thus, a particular user device is not limited to accessing content in a format identical to that associated with the user interface in use on the user device. Consequently, the user's ability to access a wide variety of content sources independent of the characteristics of the particular user device is further enhanced with the portlets of this invention.

Figure 1B:
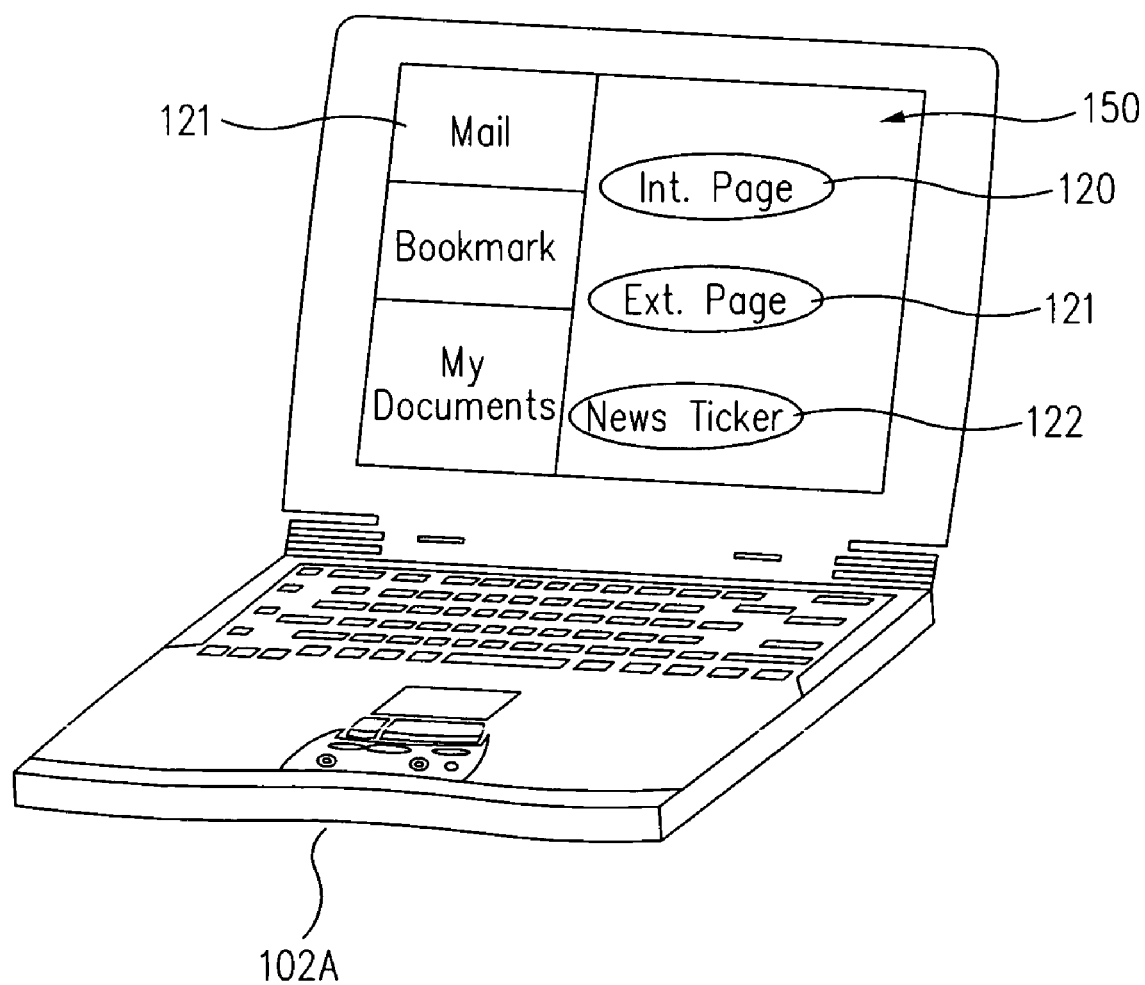
FIG. 1B is a user device with a display screen that shows portlets accessible by a user according to one embodiment of the present invention.

An individual user can personalize the user device, and hence network-portal system 100, by specifying which service providers from among the ones the organization has made available via portlets, the user wants to use. To put it another way, the user chooses which portlets the users wishes to be included on the desktop as illustrated in FIG. 1B. Hence, network portal system 100 eliminates prior art limitations on a single user system on a network accessing content on any desired provider system that is coupled to the network.

In one embodiment, the functionality described above is provided using a browser executing on a client device 102i (See FIG. 1A), e.g., any one of devices 102A, 102C, 102D and 102F. The browser communicates with web-top manager 111 via a network, e.g., enterprise network 103, Internet 106, or a combination of the two 103/106. A user of client device 102i causes the browser to transmit a request via the network to web-top manager 111. Typically, the request includes the type of document or service requested, the type of client device 102i that is making the request, the type of the browser executing on client device 102i, and a protocol that is typically part of a uniform resource locator (URL) included in the request.

Upon receipt of the request, web-top manager 111 processes the request. If the request is for content that is provided by one of universal content providers 101A to 101C that are registered with universal content broker 113, web-top manager 111 issues a call to universal content broker 113. If the content is available through a portlet, the request is passed to a portlet manager, which in one embodiment, as described more completely below, is a servlet executing on web-top manager 111.

In response to a call from web-top manager 111, universal content broker 113 returns a handle to the requested content to web-top manager 111. Web-top manager uses the handle in retrieving the content. However, before the content is returned to user device 102i, in one embodiment, the content is converted to a page or pages that can be displayed and/or processed by the thin-client on the user device.

As explained more completely below, web-top manager 111 includes a user interface, which is defined via different XML, HTML or WML templates and/or stylesheets. Web-top manager 111 selects a template, or stylesheet using the information transmitted in the request from client device 102i. The template, or stylesheet selected by web-top manager 111 is used to present content in the form required by client device 102i.

Hence, upon retrieving the requested content using the handle provided by UCB 113, web-top manager 111 loads, for example, a template and fills in all user specific content in the template using the the retrieved content. The completed template is transmitted to client device 102i for display. Alternatively, web-top manager 111 retrieves a stylesheet and uses the stylesheet to transform the content into a format that con be displayed on client device 102i.

This example assumed that the information in the retrieved content was in a format such that the information could be extracted and placed in the template or could be transformed using a stylesheet. In another embodiment, the retrieved content is processed by a dynamic data conversion service. The dynamic data conversion service generates a dynamic data filter that includes a chain of partial filter adapter components. The dynamic filter converts the original retrieved content from a first format into a second format such that the information can be extracted and placed in the template or transformed using a stylesheet. The generation of dynamic data filters facilitates processing a broad range of content with differing formats by network portal system 100.

The above example assumed that the client request was for content provided by a registered content provider or for content available via a portlet. Alternatively, the request could be to launch a remote application in web-top manager 111. In response to this request, web-top manager 111 prepares a template that includes, for example, an HTML page that includes a JAVA Bean and returns the page to the browser.

Upon execution of the JAVA Bean, the user has full access to the capabilities of the remote application that is executing on network portal system 100 just as if the complete application were executing on client device 102i. If the user requests that the remote application process specific content, e.g., a text document, or perhaps a spreadsheet, the request is sent by the application to universal content broker 113 that functions as described above.

Alternatively, the user may direct the remote application to access a spreadsheet calculator. Recall that as described above, network portal system 100 may be implemented in a distributed environment, in which the text processing application executes on one computer under a first operating system and the spreadsheet application executes on another computer under a second operating system. Alternatively, both applications may execute on the same computer, but the text processing application is written in one programming language and the spreadsheet application is written in a different programming language.

In either of these situations, the text processing application is executing within a first execution environment, and in response to the user request the text processing application issues a call to the spreadsheet calculator of the spreadsheet application that is executing within a second execution environment that is different from the first execution environment.

As used herein, an execution environment contains all objects, which have the same binary specification and which lie in the same process address space. The execution environment is specific for a computer programming language and for a compiler for that computer programming language. According to one embodiment of the present invention, the call from the text processing application is directed to a proxy in a bridge that converts the original call to a call to the desired service in the second execution environment. The proxy dispatches the converted call to the desired service in the second execution environment. Upon execution of the converted call in the second execution environment, the results are returned to the proxy in a bridge that in turn converts the results from the second execution environment to the first execution environment. The converted results are returned to the text processing application for use. A more detailed description of a bridge and proxy is provided in co-pending, commonly filed, and commonly assigned U.S. patent application Ser. No. 09/760,321, now abandoned, entitled "A Method and System for Dynamically Dispatching Function Calls from a First Execution Environment to a Second Execution Environment," of Markus Meyer, which is incorporated herein by reference in its entirety.

Hence, transparently to the user, the user has accessed functionality distributed within network portal system 100 using only what appears to the user as a single application executing on client device 102*i*. The ability to transparently access applications and services in different execution environments greatly increases the services and functionality that can be provided to a wide variety of client devices.

Thus, network portal system 100, in one embodiment, not only includes a dynamic data format conversion capability for content, but also a dynamic dispatch functionality for accessing services in different execution environments. These functionalities are optional, but when included in network portal system 100, the functionalities transparently expand the services and capabilities available to client device 102*i* that has only a browser installed.

Figure 2A:
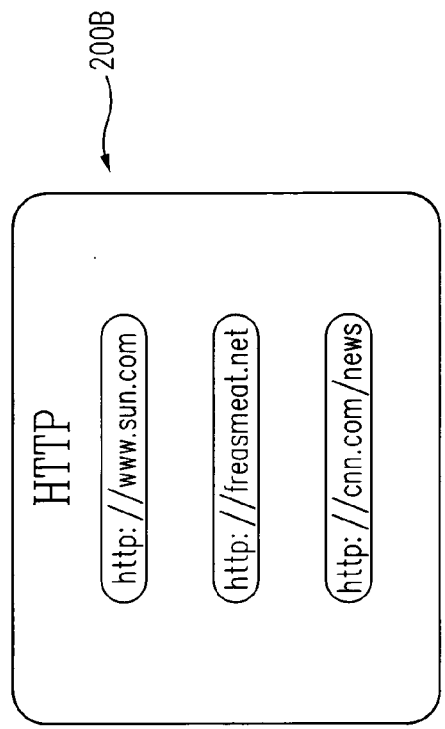
FIGS. 2A to 2c are prior art screen displays on a display screen of a user device.
Figure 2B:
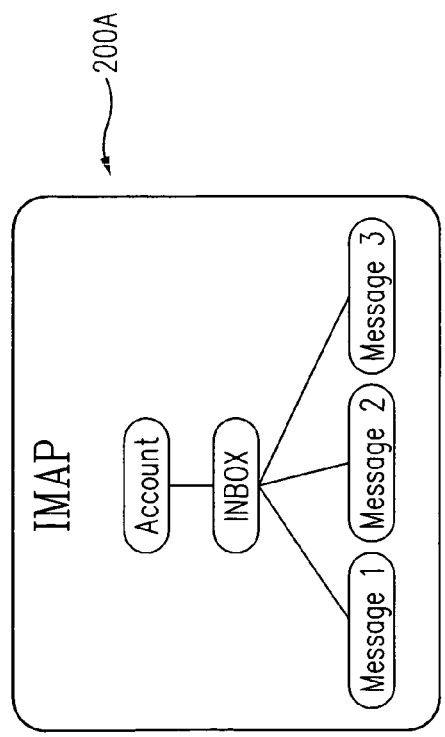
Figure 2C:
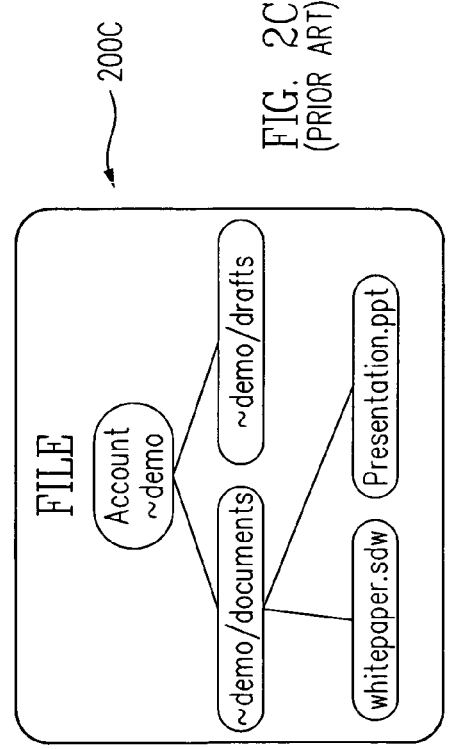
Figure 2D:
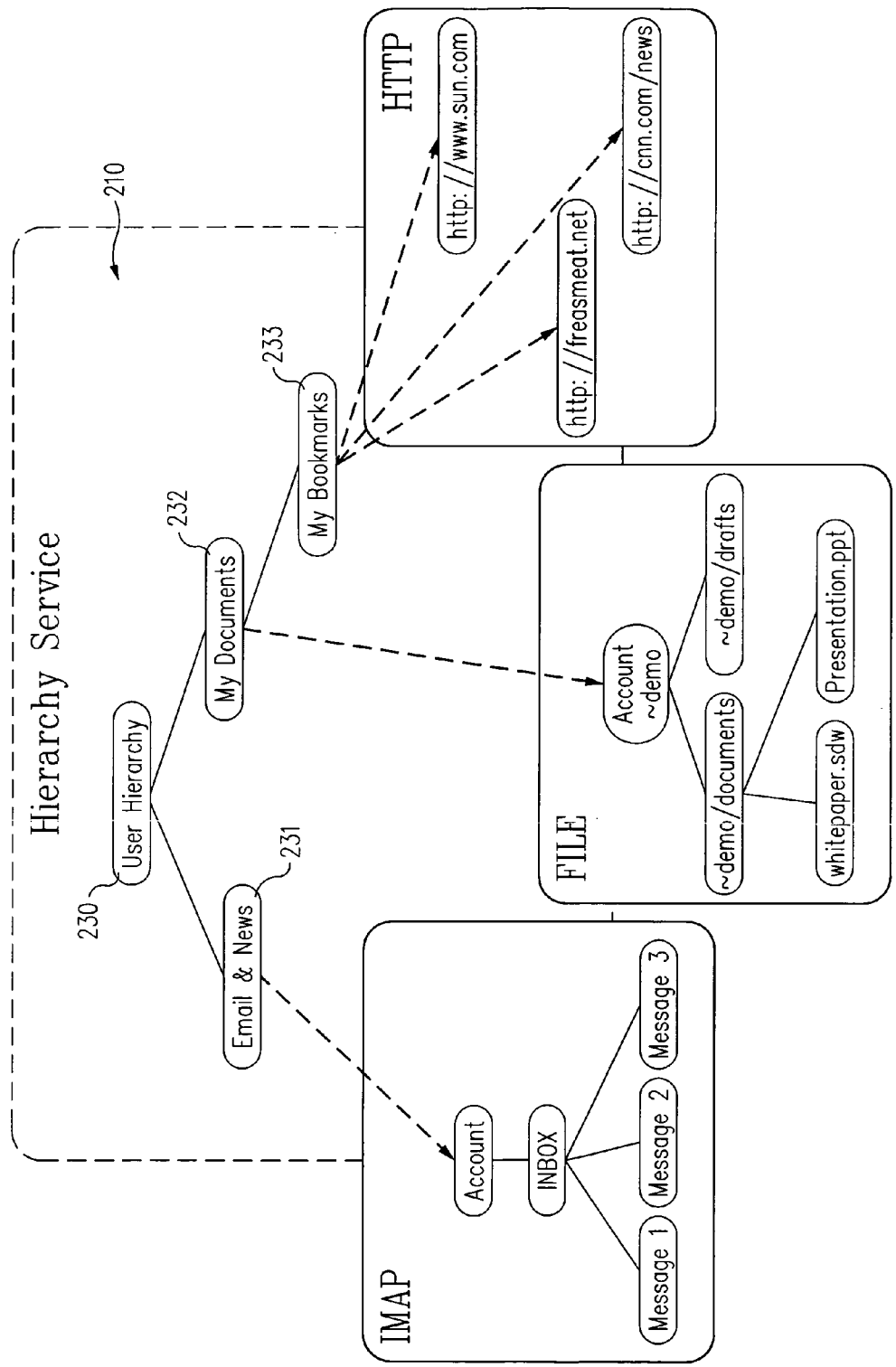
FIG. 2D is a display of the hierarchical interface created by a hierarchical content provider according to one embodiment of the present invention.

Another service provided by network portal system 100 is a hierarchy service, which in one embodiment is one of the universal content providers accessible via universal content broker 113. In the prior art as illustrated in FIGS. 2A, 2B, to 2C, each time the user wanted to access an e-mail message, HTTP links, or a stored file, the user had to access a different program element that in turn generated a display associated with that program element, e.g., displays 200A to 200C. However, when the user accesses an explorer within the browser on client device 102*i*, the hierarchy service in network portal system 100 returns a page that results in a virtual hierarchy 210 that is displayed as illustrated in FIG. 2D.

The hierarchy service organizes the user's data in an abstract manner whether the data is the user's directory, mail accounts, or bookmarks. As illustrated in FIG. 2D, the hierarchy service orders all user content in a virtual hierarchy 210, which is represented in the user interface on client device 102*i*. Virtual hierarchy 210 is browse-able and customizable, gives the user a homogenous view of the entire user's content on network portal system 100. In this embodiment, virtual hierarchy 210 includes a root node 230 and three other nodes 231 to 233. Initially, only root node 230 may be displayed and then when the user selects root node 230, nodes 231 to 233 are displayed. If the user then selects one of nodes 231 to 233, the user is presented with the hierarchy indicated by the broken arrow.

In addition, virtual nodes generated by the hierarchy service act as UCB content nodes. So the resulting hierarchy, sometimes referred to as a content tree, consisting of the virtual nodes and protocol specific nodes, as illustrated in FIG. 2D, can be processed in a transparent manner. This means, that a generic explorer or all kind of viewers can access the whole content tree without special knowledge about the underlying protocols or implementation details of the specific providers associated with the various virtual nodes.

Figure 3A:
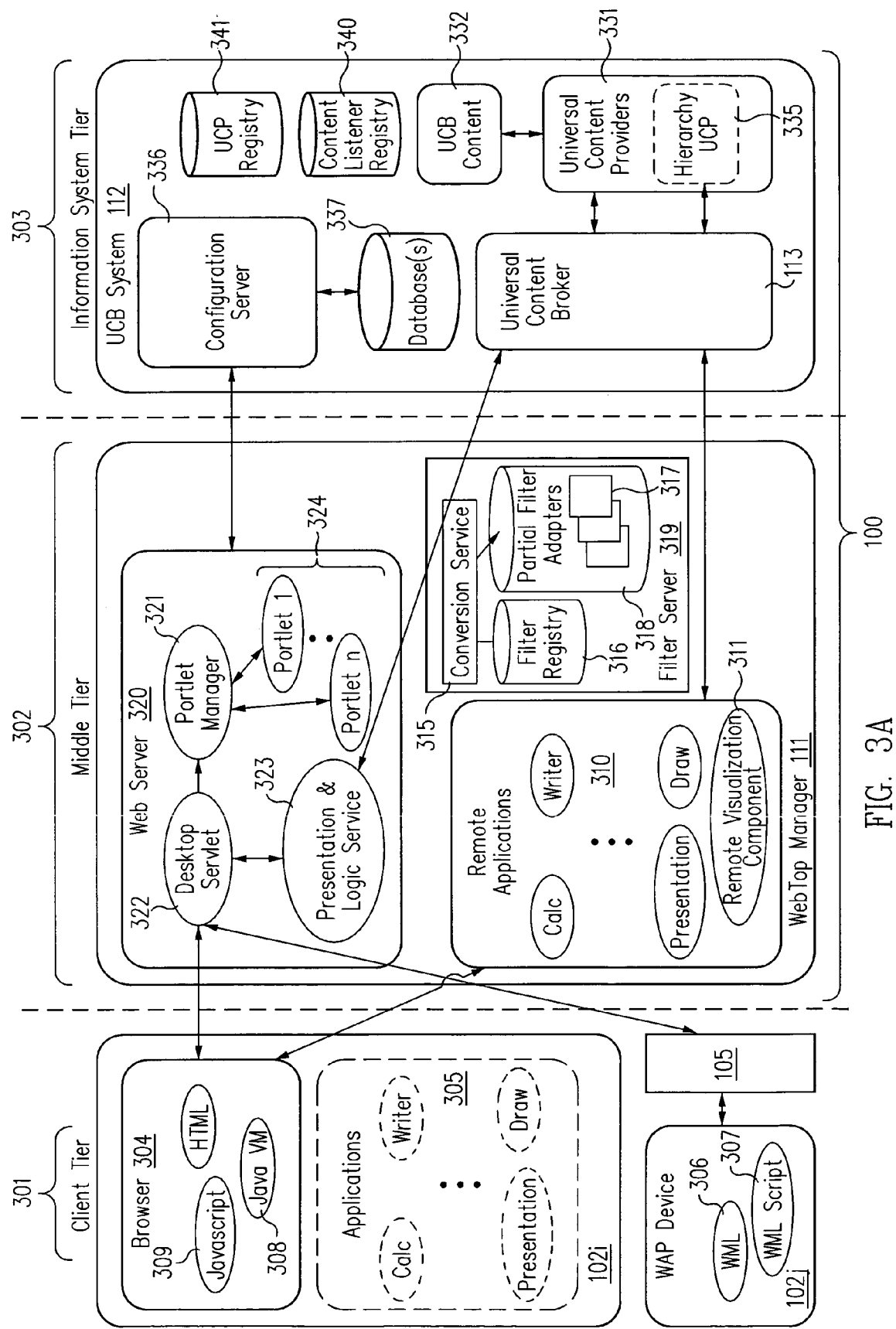
FIG. 3A is a more detailed diagram of the network portal system according to one embodiment of the present invention.

FIG. 3A is a high-level block diagram of one embodiment of network portal system 100, which provides office productivity services. Network portal system 100 is highly independent of client systems 102*i*, where i is A, C, D and F in FIG. 1, and 102*j* where j is B in FIG. 1, which are used to access services and/or content using network portal system 100. Support of several client devices with very different hardware and software capabilities mandates that the overall architecture and the core components of network portal system 100 are flexible enough to minimize the effort of integrating support for new client devices.

As used herein, content provider systems, servers, client systems, networks and similar terms are utilized with respect to computer systems and interconnections of both such systems and individual units, and may include both the hardware and software typically utilized in such systems. In this context, the term content denotes any information, which may be of any kind in any physical or logical format, which can be transmitted over a communication network. In particular, content may be any information that is stored in the form of electronic files, typically residing on a server, or content may be generated by execution of a particular application program.

Communication standards, i.e., protocols, which define the way of communication between two systems are used herein, in one embodiment, as content provider identifiers. An example, of a content provider identifier is a URL scheme that is described more completely below. A MIME type is an example of a definition of a type of content. In general, the content type determines the raw data format of the content. As explained more completely below, the content identifier is used to select a content provider that supplies, creates, or acts on content having a raw data format.

Network portal system 100, according to the embodiment illustrated in FIG. 3A, is divided into three tiers, e.g., a client tier 301, a middle tier 302, and an information system tier 303 that in turn are each divided into several subsystems. In this embodiment, client tier 301 includes a computer system 102*i* and a wireless application protocol (WAP) device 102*j*. Middle tier 302 is web-top manager 111. Information system tier 303 includes universal content broker system 112 that in turn includes a configuration server 336 with associated database(s) 337, and universal content broker 113 that utilizes a plurality of universal content providers 331 and universal content broker (UCB) content 332. In this embodiment, a hierarchy service 335 is one of universal content provider 331 and so is sometimes called hierarchy content provider 335.

Client Tier Overview

In general, all hardware and software resources, which reside on users, devices, are part of client tier 301. These resources may vary from a mobile phone 102B with WAP support, to an internet kiosk 102F with a HTML browser, to a desktop PC 102D with an installed word processor and locally stored documents. In FIG. 3A, the subsystems illustrated within client devices 102i and 102j are those that are typically used to interface with network portal system 100.

Client device 102i, in one embodiment, includes a browser 304 that utilizes the HyperText Markup Language (HTML) and a JAVA Virtual Machine (VM) 308 and executes JAVA scripts 309. Optionally, client device 102i can include one or more applications 305. As explained more completely below, one of the novel features of this invention is that a user can access, via browser 304, an application in remote applications 310 or any other service provided by network portal system 100.

Any components needed to interface with the remote application and/or service are downloaded dynamically to client device 102i, when the components are needed. The complexity of these downloaded components can differ extremely depending on the capabilities of client device 102i and the requirements of the remote application and/or requested service. The download component can be a simple WML page, a set of HTML pages, which interact by JAVA script calls, or a complex JAVA applet. In another embodiment, a virtual class library for the particular user device, or perhaps a complete application may be downloaded.

Herein, a thin client is a simple HTML page. To the extent possible, in one embodiment, network portal system 100 receives input requests and generates output responses using a thin client, because this minimize processing requirements on the client and minimizes the data quantity transferred over the network.

Herein, the use of the JAVA programming language, JAVA scripts, and HTML are illustrative only and are not intended to limit the invention to the specific embodiments described. In view of this disclosure, equivalent functionality can be generated using any desired programming language, for example, the C programming language, or the C++ programming language can be used to develop browser add-ins. In particular, it is anticipated that the extensible markup language (XML) will supplement or replace HTML.

WAP client device 102j includes a wireless markup language engine 306 that executes wireless markup language scripts 307. WAP client device 102j communicates with a gateway 105 that interfaces device 102j with web-top manager 111 in one embodiment.

Middle Tier Overview

As indicated above, in the embodiment of FIG. 3A, middle tier 302 is web-top manager 111. Web-top manager 111 includes a web server 320. Web server 320 includes a desktop servlet 322 coupled to a presentation and logic system 323 that provides a presentation and logic service, and optionally, a portlet manager 321 that interacts with a plurality of portlets 324 that in turn are each a servlet. The number of portlets included in web server 320 is optional and can vary from zero to any desired number. Herein, reference numeral 323 is used for both presentation and logic system and the presentation and logic service for convenience.

An important aspect in building a flexible, extendable and robust network portal system 100 is to bring in one or more abstraction layers between client tier 301 and information system tier 303 to reduce dependencies of core components in information system tier 303 to specialized front ends. This abstraction, in general, is done by presentation and logic service 323 in middle tier 302. As explained more completely below, presentation and logic service 323 provides functionality in an application oriented way and hides implementation details of information system tier 303. In the following description, two alterative embodiments of presentation and logic service 323 are described.

A first embodiment of presentation and logic service 323 uses a plurality of providers and adapters. The adapter forms a link with universal content broker 113 and universal content broker content 332 to retrieve data, and an adapter extracts information from the data and builds a page that can be returned for display to the user device.

A second embodiment of presentation and logic service 323 uses controller servlets, JAVA beans as models, and JAVASERVER PAGES objects as views. As explained more completely below, in this embodiment a JAVA bean forms a connection with universal content broker 113 to retrieve data. A servlet extracts the desired information from the data and inserts the information in a JAVASERVER PAGE object that in turn is used to generate a page that can be returned for display on user device 102i or 102j.

A second task of middle tier 302 is to provide access points for all kinds of clients in client tier 301, to manage user sessions for clients in client tier 301, and to provide specialized functionality to different kinds of clients in client tier 301. As explained more completely below, this specialized functionality is provided by middle tier 302 (i) supplying dynamically generated pages that can be displayed on the user device, e.g., HTML/WML/XML pages, (ii) linking requests from components in client tier 301 to actions on data objects, or (iii) hosting one of a plurality of remote applications 310, which are executed on a server machine for a client in client tier 301, but the user interface for the application is displayed on client device 102i.

Information System Tier Overview

As indicated above, the third tier, information system tier 303, includes configuration server 336 in universal content broker system 112. Information system tier 303 also includes universal content broker 113 that utilizes universal content providers 331 including hierarchy content provider 335 and universal content broker content 332.

In general, all types of data—users' documents and configuration data—are stored and managed in information system tier 303, which is a server-side tier. Information system tier 303 is the users' informational backbone, which, in the prior art, was typically housed in various databases in traditional legacy system architecture. (The users here are the clients in client tier 301 that were referred to above.) Network portal system 100 consolidates all resources under a single content manager, e.g., universal content broker 113, which allows a wide variety of data types to be accessed via a unified interface.

As described above, more than one data source can be used by or connected to network portal system 100. This means that data can be stored in local file system 544 (See FIG. 5), on an HTTP server 543, on a FTP server (not shown), in an e-mail account on IMAP server 542, or on a NFS server (not shown). One task of universal content broker 113 is to standardize the access to different data sources.

As explained more completely below, universal content broker 113 provides a range of functions for querying, modifying and creating data content. The use of different data sources is transparent for a portal user, i.e., the user of any user device coupled to network portal system 100. To facilitate the use of different data sources, hierarchy content provider 335 organizes the different sources in form of a hierarchical structure. For example, see FIG. 2D. A user can classify the data sources by using user-defined folders and then browse through the content using an explorer. With the explorer and the hierarchical presentation of all the user's information available through universal content broker 113, the user does not have to think about which protocol has been used or what the type is of the particular data in accessing the data. As indicated above, data is accessed by going through a standardized interface that includes the explorer capability.

Universal content broker 113 functions, in one embodiment, as a framework containing a range of elements and services for use with different data sources. Specifically, universal content broker 113 administers a plurality of universal content providers 331. Each universal content provider encapsulates the details of the different protocols and data sources available through that provider. In one embodiment, a set of default universal content providers 331 allows access through FILE, HTTP, FTP, IMAP, POP3 and SMTP protocols. A portal operator can implement additional content providers so that in-house information services can be integrated into network portal system 100. For example, this could be a connection to a SAP™ system.

The data content in UCB content 332 is encapsulated in content objects. The content objects implement, among other things, an interface for querying general information, as described more completely below. The interface can be used to call up different properties such as MIME type, URL, etc. Furthermore, each content object provides a series of commands for accessing the actual data by implementing other interfaces. The commands available in each individual content object depend on the data type. Commands such as an open command can be used in almost all content types, whereas a createFolder command would have little use in a pure text object.

In many cases, applications and components of network portal system 100 use common data. If one application modifies the properties of content in a common file, all the components using this data should be informed of the changes made. For this reason, content objects can register various listeners to the content object on content listeners registry 340. The listeners then inform the different applications when properties have been modified.

As described above, content objects can contain different kinds of data. For example, a content object can encapsulate a file, an e-mail, a basic HTML page or a system folder. To facilitate handling the various content types in a standard way, each content object, sometimes called content, implements a standard set of interfaces. These interfaces are described in detail below, but a brief summary of their function is given here.

The interfaces include functions for calling content type and any commands that can be run on the content. Typical examples are commands such as "open" or "delete". A developer can define further commands depending on the content type. For example, an "update" command can be used on a POP3 inbox. There is an additional function available for terminating a command.

The interfaces also provide functionality to register different listeners that pass on alterations made to data to interested applications in the form of events. This type of message can result from such events as deletion or simply by changing content properties. If the content object is a folder, additional events can be sent when new sub-content has been inserted or removed.

Each content object has a range of properties that can be read and re-set by an application. In one embodiment, content has to have certain properties, including title, MIME type and an id, for example. Furthermore, optional properties can be set if required. This could cover such information as the date the content was created or modified or the saving of passwords.

Content node hierarchies can be built for content objects such as an IMAP account or a file system as illustrated in FIG. 2D. In these situations, a parent-child relationship exists between the different content objects. To enable access not only to parent nodes but also to child nodes, the content objects implement additional interfaces that also allow new nodes to be created and inserted.

Universal content providers 331 make access possible to the different data sources in UCB content 332. Each content provider implements an interface, which facilitates access to data through a Uniform Resource Identifier (URI). This has the following structure (see RFC 2396):

<scheme>://<authority><path>?<query>

The structure describes the protocol used for accessing each of the data sources, sometimes called the URL scheme, or more generally protocol scheme, or content provider identifier. If an IMAP account source were used, the content provider identifier would be "imap", if a FTP server is used, then "ftp" would appear as the content provider identifier.

Universal content broker 113 administers universal content providers 331. As soon as a client requests particular content, in this embodiment, web server 320 addresses UCB 113 and passes on the corresponding URI. The UCB 113 analyzes the URI to determine the content provider identifier so that UCB can find the appropriate universal content provider on UCP registry 341. The task of loading the requested data is delegated to this provider. Neither, the user of user device 102*i* nor web server 320 needs to know specific details about the protocol or data source. The content provider carries out all of the necessary steps. The protocol or data source details are thus hidden from the client.

The requested data is loaded and transferred to the client, in this case web server 320, as a content object. The content object encapsulates the requested data. The client can now run commands on the content object, to load or edit the data, for example. Similarly the internal data structure is hidden from the client, which means that it is possible to treat data from different sources in the same fashion. Accessing an e-mail account is therefore no different to accessing a local file system.

As explained above, some prior art content types can have a hierarchical structure. See FIGS. 2A and 2B. This applies to content objects such as those created by a file provider or IMAP provider. Users can browse through the different content objects or insert new content nodes into the hierarchy or delete existing ones. With other providers, such as HTTP, there is no relationship between the different contents. Users must know the exact location (the URL) to be able to access specific content. In the prior art, accessing this type of data by browsing with an explorer was not possible.

However, as described above, hierarchy content provider 335 allows a user to classify any kind of content type in a virtual hierarchy as illustrated in FIG. 2D. Users can define custom folders, which themselves can contain folders or links to any content. Users can adapt this classification to match their requirements and taste. All of the settings made are stored in a persistent fashion and are, therefore, available when the user logs into network portal system 100 again.

Hierarchy content provider 335 provides portal users with a standard, expandable view of the different data in network portal system 100. The users can browse through the different contents with an explorer, without having to keep in mind which protocol is being used or what the content type is.

As described above, universal content broker 113 administers different content providers 331 in network portal system 100. In one embodiment, a UCB process, which is described more completely below, is created for each user on-demand on a server. In one embodiment, a daemon is used to start and end processes on the server. The daemon also builds connections between components on network portal system 100. In addition, the daemon could be used in conjunction with load balancing. In this case, the daemon acts as a contact for all server components, while client components contact a part of the load balancer to determine on which of a plurality of servers to start a requested process.

When started, universal content broker 113 uses the entries in configuration server 336 to determine which content provider (UCP) is available in the system for which protocol and then enters the corresponding details into an internal table, sometimes called a provider registry. If necessary, user-specific settings are taken into account, as in the case of a hierarchical classification of the various data sources.

Portal operators can implement their own content providers to provide additional protocols in the system or to integrate other information systems into network portal system 100. Universal content broker 113 is made aware of this information by the corresponding entries in configuration server 336.

As soon as a user wants to access a particular data source, the URI and corresponding configuration entries are analyzed to determine the appropriate content provider. As explained above universal content broker 113 delegates the requests to the appropriate provider. This then takes care of the actual running of the data access. In this situation, universal content broker 113 can be seen as the contact and middleman.

Figure 3B:
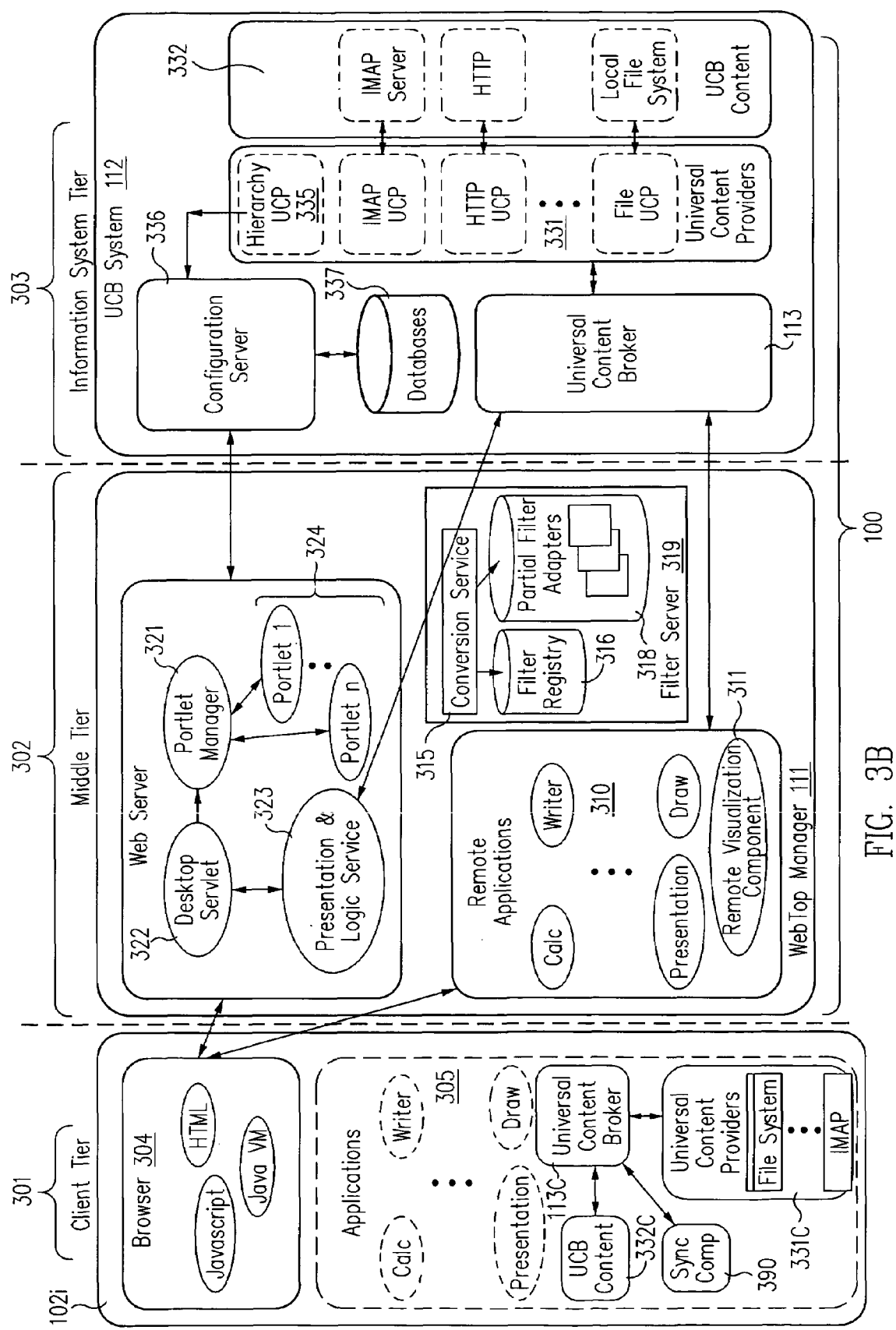
FIG. 3B is a diagram that illustrates a server universal content broker system and a client universal content broker system according to one embodiment of the present invention.

In one embodiment, data stored locally on a client can only be loaded through a web browser and so local data cannot be accessed by using universal content broker 113. As illustrated in FIG. 3B, to support both the loading and saving of local data, an additional universal content broker 113C maybe implemented on client device 102i. By utilizing a remote access universal content provider, client universal content broker 113C can be hinged onto server universal content broker 113 as an additional universal content provider. A file content provider could then be registered on the client universal content broker 113C, for example, so that the local file system can be accessed.

Alternatively, when the user is not connected to the network, the user can use client universal content broker 113C when using applications 305. When the user is connected to the network a single component 390, running on the client side synchronizes client universal content broker 113C with server universal content broker 113. Synchronizing component 390 synchronizes messages in user mailboxes, files that were edited on local machine 102i, and files that were, say, accessed from a browser and edited directly on network portal system 100. Synchronization of content also applies to multi-user operations, in which a number of people may be operating on various areas of the content. In this situation, collision prevention is also provided.

All of the settings in network portal system 100 are stored by configuration server 336. This includes user-specific, application-specific and device-dependent configurations. The central storing and standard structure facilitate system maintenance. Instead of monitoring the status of various configuration files, an administrator views and modifies the settings at a central location when necessary. This central storing also allows "Roaming Profiles". A user can log into network portal system 100 through different computers from any location, as described above. Irrespective of where a user is, the user always finds their usual work environment with the custom settings.

By using configuration server 336, different kinds of information are stored in an ordered manner so that the information can be accessed quickly. Thus configuration server 336 contains entries for the user accounts, which contain the user name, password, home directory, and similar information. Configuration server 336 also holds various entries used to initialize applications. Each component of network portal system 100 can store and load persistent data in configuration server 336. Entries for services that have been initially integrated into network portal system 100 are stored in the configuration server 336 as well.

All of the entries are stored in hierarchical form in key-value pairs. As explained more completely, below a configuration tree contains separate branches for this purpose, which can be used for different users or the various user devices. The configuration tree is described through a Document Object Model (DOM) based on XML (Extended Markup Language). Communication between configuration server 336 and the various components of network portal system 100 is provided via requests for entries or requests for modification of entries. In one embodiment, the data is exchanged using an XML-based protocol.

Alterations to the DOM tree are carried out by transactions, which include inserting new nodes or new key-value pairs describing user preferences. This also covers such things as modification of individual entries or deletion of an entire subtree as the entries are no longer needed. Configuration server 336 also contains different mechanisms for querying the status of transactions or registering different listeners that are notified when alterations are made to configuration service elements and that in turn notify the applications affected.

An Embodiment of Processes of Network Portal System 100

Figure 4:
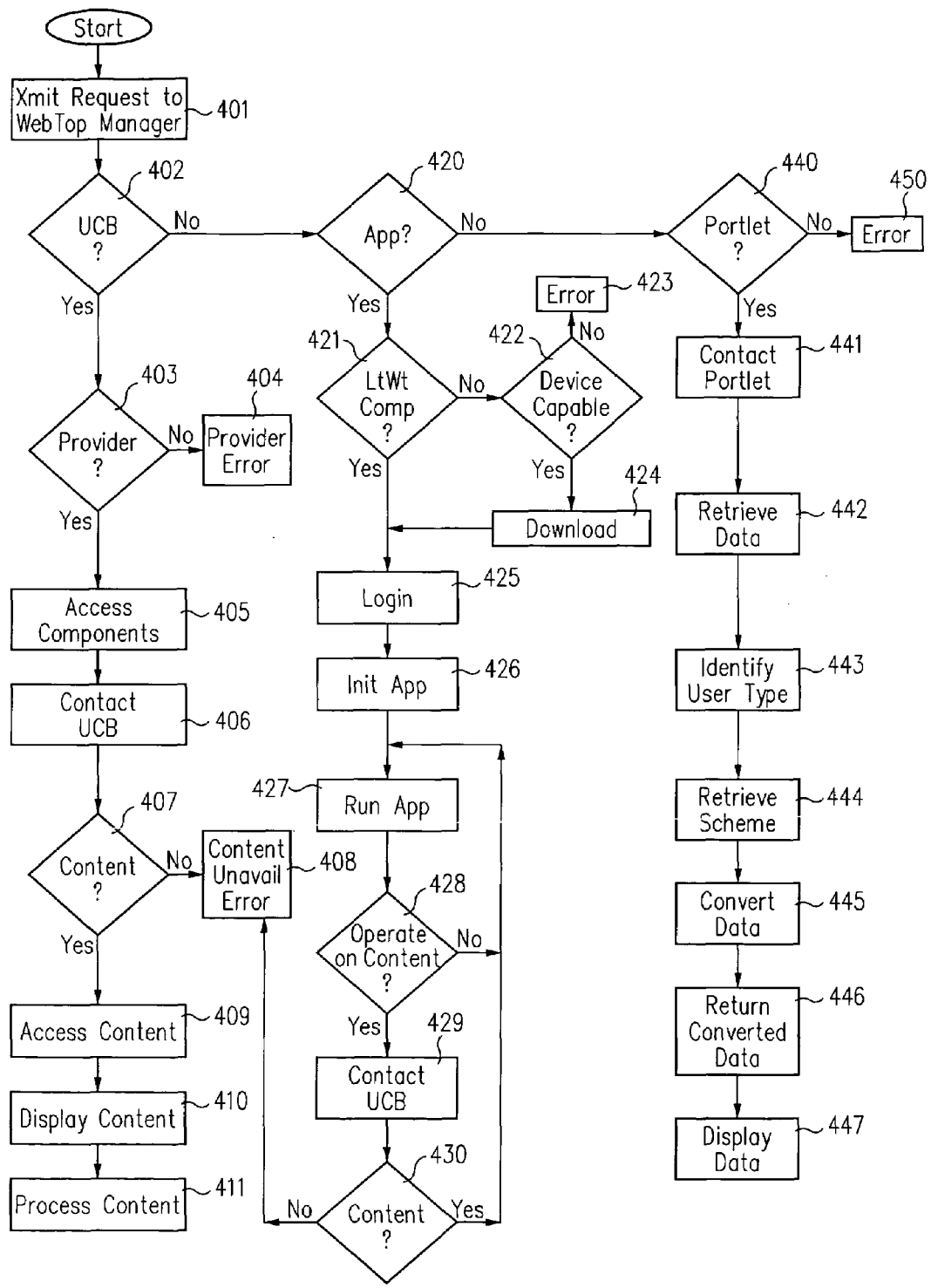
FIG. 4 is a process flow diagram for processes according to one embodiment of the present invention.

FIG. 4 is a high-level process flow diagram for one embodiment of network portal system 100. A user inputs a request via a browser 304 executing on client device 102i in transmit request to web-top manager operation 401. Information in the request identifies whether the request is for content available through universal content broker 113, for content available from an external provider, e.g., through one of plurality of portlets 324, or for a service in remote applications 310 that is supported by web-top manager 111.

The request from browser 304 is transmitted over a network to web-top manager 311 in transmit request to web-top manager operation 401. As described above, the transmitted request includes the type of document or service requested, the type of client device 102i that is making the request, the type of the browser executing on client device 102i, and the communication protocol that is typically part of a uniform resource locator (URL) included in the request.

In response to the request, web server 320, which in one embodiment is the Tomcat server supplied by The Apache Software Foundation, 1901 Munsey Drive, Forest Hill, Md. 21050-2747, U.S.A, determines how to process the request. It should be noted that web server 320 may require various user authentications before access to web server 320 itself, or before access to any information accessible via web server 320 is granted. The particular techniques used for such authentication as well as the various levels of authentication that may be used are not essential to this invention and so are not considered further.

Web server 320 determines whether the request is for universal content broker 113 in UCB Check operation 402. If the request if for universal content broker 113, check operation 402 transfers to provider check operation 403 and otherwise to application check operation 420.

In provider check operation 403, desktop servlet 322 uses presentation and logic service 323 to determine whether there are components available within service 323 to access universal content broker 113 for the type of information requested, e.g., for the MIME type of the information. For example, service 323 may access a user configuration file that was generated using configuration server 336 to determine whether components within service 323 have been instantiated for accessing universal content broker 113 for the type of information requested and for this user. If such components do not exist, in one embodiment, service 323 accesses a registry of factories to determine whether components can be instantiated for accessing the requested type of content, and if so uses the appropriate factory to instantiate the necessary components within service 323.

In either of these cases, there are components within service 323 for interacting with universal content broker 113 for the particular type of data requested and so check operation 403 transfers to access components operation 405, and otherwise transfers to return provider error operation 404. In return provider error operation 404, desktop servlet 322 generates an HTML page that is returned to client device 102i, which informs the user that the requested content is unavailable.

In access components operation 405, service 323 passes the request to the component within service 323 that supports the requested content. For example, assume that the user of client device 102i sent a request to network portal system 100 for the retrieval of content constituting a message on an IMAP server with an associated property. An example of a URL included in the request is: imap://user@mailserver/inbox;UID=3. For this URL, the content has an associated property value UID set to 3. Thus, desktop servlet 322 passes the request including this URL to the IMAP components in service 323 that process IMAP requests. The IMAP components in turn pass the request including the URL to universal content broker 113 in contact UCB operation 406.

In contact UCB operation 406, universal content broker 113 searches a registry of universal content providers 341 for the content provider associated with the URL. If a content provider for the requested content is found in a plurality of universal content providers 331, universal content broker 113 passes the request to the universal content provider that in turn retrieves the requested data, if necessary and returns a handle to the requested content in universal content broker content 332, and otherwise an error message is returned. Notice that the user device is not required to have software installed, or the hardware capability required to access the content via the particular protocol required.

These details are delegated to the universal content provider. To this point the only requirement on the user device is to generate a request that can be processed by web-top manager 111.

Content check operation 407 determines whether a handle or an error message was returned by universal content broker 113. If a handle to the requested data in UCB content 332 is returned processing transfers to access content operation 409 and otherwise processing transfers to content unavailable error operation 408. In error operation 408, the components within service 323 that are processing the user request generate a page that includes the error message and return that page to the user device for display.

In access content operation 409, the components within service 323 processing the request use the returned handle to obtain the raw data from UCB content 332. This data is in a format associated with the particular universal content provider. Accordingly, as explained more completely below, in operation 409, information is extracted from the raw data and placed, in this embodiment, in a template associated with the user device that issued the request.

In one embodiment, there is a set of HTML templates for browsers, a set of WML templates for WAP devices, and a third set of templates for hand held devices like PDAs. Within each of the three template sets, there is another set of content templates for each type of content, e.g., one set for an e-mail, another for an IMAP folder, and a third for a file system folder. Within each of content template sets, there is a template for each class of user device, based on user device capabilities.

The template selected from these sets, i.e., the template associated with the user device, is selected based upon information in the request from the user device, as explained more completely below. The content that is accessed is in a raw data format. Information is extracted from the content, as explained more completely below, and inserted in the template that represents a page that can be displayed on the user device, or alternatively that can be used to generate a page that can be displayed on the user device. In either case, service 323 returns a page to the user device upon completions of operation 409 that includes the requested content.

Upon receipt of the response to the issued request, the user device displays the page that was returned in display content operation 410. In some cases, the user can manipulate the displayed data, e.g., delete an e-mail message, and forward the content to an output device. To initiate such an action, in process content 411, the user device issues another request in the form of an HTTP POST request, and this request is processed via operations 402 to 410 as described above. As explained more completely below, the operations performed on UCB content are not limited to retrieving and saving content. Properties of content can also be changed, added, updated, or perhaps deleted through universal content broker 113 and the appropriate universal content provider.

The above description assumed that the request was directed to content associated with universal content broker 113. However, if this is not the case, the request is passed to application/service check operation 420. If a user of device 102i issued a request to use remote applications 310 over network 103/106 to web server 320. The transmission of the request over network 103/106 is performed according to a predetermined transmission protocol. In response to the request from user device 102i, web server 320 determines whether the request is for a service or application in remote applications 310 and if the request is for such a service or application, processing transfers to lightweight component available check operation 421 and otherwise to portlet check operation 440.

Lightweight component check operation 421 determines whether a lightweight remote visualization component 311 needed to run the requested service/application is installed on user device 102i. This can be done, for example, by accessing a user configuration file on web server 320, or alternatively by executing a process on web server 320 that accesses the user device and determines whether the lightweight component is installed. If the required lightweight remote visualization component is installed on user device 102i, check operation 421 transfers to login operation 425 and otherwise to device capability check operation 422.

Device capability check operation 422 determines whether user device 102i can execute and use the lightweight remote visualization component 311, e.g., is there a lightweight component 311 available for the general type of user device 102i, and is the operating system, processor, and memory of specific user device 102i sufficient to execute and support lightweight component 311. This information may be included in the initial request, a process on web server 320 may communicate with user device 102i to obtain the information, the information may be retrieved from configuration server 336, or alternatively, the request may include an identifier that is used to access some other database to determine the capabilities of user device 102i.

If user device 102i is capable of executing and supporting lightweight component 311, processing transfers to download component operation 424 and otherwise to return error operation 423. Return error operation 423 sends an appropriate error message to user device 102i to inform the user of the incompatibility between the requested service/application and user device 102i.

Download component operation 424 downloads, and installs if necessary, lightweight component 311 on user device 102i. Thus, prior to starting login operation 310, lightweight component 311 is available on user device 102i.

In response to the request to access a service/application in remote applications 310, in login operation 425, a connection is established over network 103/106 to a daemon executing on web server 320. The daemon returns a handle to a daemon service factory to the lightweight remote visualization component on user device 102i.

Upon receipt of the handle to the daemon service factory, the lightweight remote visualization component on user device 102i issues a request to the service factory to initiate execution of a login service on web server 320. Upon activation of the login service in login operation 425, the lightweight remote visualization component on user device 102i transmits a user identification, a password, and options for the service/application, i.e., a runtime environment component, in remote applications 310 to the login service. The login service on web server 320 in operation 425 validates the user login and transfers to initialize application operation 426.

While in the embodiment of FIG. 4, the daemon and login service are described with respect to accessing a service/application. In general, a daemon process and login service are used to initiate each service supplied by network portal system 100 and so typically are also included within other branches of FIG. 4.

A start application operation within operation 426 activates a service factory for remote applications 310, e.g., runtime environment components, on web server 320 and returns a handle to this service factory to the lightweight remote visualization component on user device 102i. Next, in a create user interface operation within initialize application operation 426, the lightweight remote visualization component on user device 102i issues a request to the runtime environment components service factory to start an infrastructure generation service.

In response to the request, the service factory, executing on web server 320, activates the infrastructure generation service, and returns a handle to this service to the lightweight remote visualization component on user device 102i. In a create visual infrastructure operation, the lightweight remote visualization component on user device 102i issues a request to start the infrastructure generation service, and passes a handle to a client factory to the service. The lightweight remote visualization component on user device 102i next issues a request to create a visual infrastructure on web server 320 for processing the visual portion of the user interface.

In response to the request from the lightweight remote visualization component on user device 102i, the infrastructure generation service first issues a request to the client factory on user device 102i to create a remote frame window, and then this service creates a corresponding server window object on web server 320. The server window object queries the remote frame window on user device 102i to determine the fonts, display parameters, etc. on user device 102i. Alternatively, the server window object can obtain identifier information from user device 102i and then use this identifier information to access a database that includes the display capabilities of device 102i via configuration server 336.

Upon completion of the queries, in a create environment infrastructure operation, the infrastructure generation service creates a frame object that controls the environment of the server window object and creates a direct connection between the frame object and lightweight remote visualization component on user device 102i. Operation 426 transfers to run application operation 427. At this point, a direct connection is established between user device 102i and the service/application in remote applications 310.

In run application operation 427, lightweight remote visualization component 311 sends a command to the frame object to load a particular document in the service/application. In response, the frame object initiates a request to UCB 113 for the document. Check operation 428 passes the request to contact UCB operation 429.

In general, operate on content check operation 428 determines whether the user has issued such an instruction to save, retrieve, or replace content, or to act on a property of the content. If an instruction to operate on content was not issued processing returns to run application operation 427, and otherwise to contact UCB operation 429. Those of skill in the art will appreciate that check operation 427 is not continually performed, but rather typically is performed by an event processor in response to a specific user input event.

In this case, operation 429 is similar to operation 406 that was described above. Operation 429 transfers to content check operation 430 that functions in a manner similar to operation 407. In content check operation 430, universal content broker 113 determines whether the operation requested in the instruction is permitted, e.g., is the content available through universal content broker 113, and if the content is available, is this user permitted to perform the operation requested. If the answer is no to either of these checks, processing transfers to return content error operation 408, which in turn notifies the user that the requested operation on the content cannot be performed. Otherwise, the application is provided access to the content and permitted to perform the operation on the content, which in this case is loading the document.

The user did not have to worry about the specific location at which the content was stored. To the user, the content appeared as if the content was on user device 102*i*. This provides the user with access to content independent of the location of the user, e.g., see the above example where the user was at a friend's home.

After the document is loaded, the service/application reads the loaded document, and generates a display layout that is sent to the server window object. In turn, the server window object sends the display layout to the remote frame window in the lightweight remote visualization component on user device 102*i*. The remote frame window generates commands to a device dependant graphic layer, e.g., the JAVA AWT that in turn generates the user interface on a display screen of user device 102*i*.

If user device 102*i* has limited input/output capability, the user may be able to only read the document, or perhaps direct the document to a local output device if the remote service/application includes such a capability, e.g., a capability to write to a local printer or to write to a fax printer. If a user device 102*i* includes multiple input/output devices, the user can utilize the full functionality of the service/application. For example, if the user utilizes a mouse to scroll down in the document, the scroll action is interpreted by the windowing environment on user device 102*i* and a scroll command is set by the windowing environment to the remote window frame of the lightweight remote visualization component on user device 102*i*.

The remote window frame, in turn, sends a scroll command over network 103/106 to the server window object on web server 320. The server window object processes the event received and generates an application event that in turn is processed by the service/application. In this example, the application does a re-layout based on the scrolling, and redraws the display in the server window object that in turn sends a redraw command to the remote frame window on user device 102*i*.

In one embodiment, the transmissions over network 103/106 between lightweight remote visualization component 311 and web server 320 are encrypted according to known technologies. Further, in another embodiment, digital signatures are used to provide certification of the request mechanism being established on the client for this runtime environment component services system.

The size of the lightweight remote visualization component on user device 102*i* does not increase with the number of accessed runtime environment components of the implementation server framework. This introduces the ability to offer runtime environment components, which expose only services designed for a special purpose and hide the complexity of the implementation framework. A more complete description of this embodiment of the using services/applications on network portal system 100 is described in copending, commonly filed, and commonly assigned U.S. patent application Ser. No. 09/759,786, entitled "METHOD AND SYSTEM FOR REMOTE CONTROL AND INTERACTION WITH A RUN TIME ENVIRONMENT COMPONENT," of Ralf Hofmann and Torsten Schulz, which is incorporated herein by reference in its entirety.

Hence, the lightweight remote visualization component on user device 102*i* maps visual display instructions from an application executing on web-top manager 111 to a platform dependent graphic layer that in turn generates a user interface on a display screen of the user device. The user interface for the remote application is similar to the user interface that the user would see if the application actually were executing locally on device 102*i*. The interfaces may not be identical if user device 102*i* has limited input/output capability.

Note that the only restrictions on client device 102*i* are that the device must have the capability to execute a browser, the capability to execute the lightweight remote visualization component, and the capability to provide the input operations required by the application or service. There is no requirement that client device have preinstalled specialized client/server software for each application or service that is available via web-top manager 111. Consequently, the requirement for updating the specialized client/server software on each client device each time a change is made to an application or service has been eliminated.

The above description assumed that the user requested an application or application service that was supported by web-top manager 111, or requested content supported by universal content broker 113. However, if the user did not request an application or an application service, or content associated with universal content broker 113, processing transferred from application check operation 420 to portlet check operation 440.

As explained above, a user initiates a request on a user device 102*i* by selecting a portlet identifier, e.g., an icon, for example, that represents a particular instance of data that is accessible via a particular portlet on web server 320. In this embodiment, an icon representing a portlet is only selectable for display on display screen 150 (FIG. 1B) if the data provided by the portlet may be presented by user device 102*i*. For example, if the user device does not support graphics, a portlet, which provides data with the MIME type image/jpeg, would not be available for selection for display on the display screen of user device 102*i*.

In one embodiment, this pre-selection of portlets offered to the user is made by a comparison of the MIME types supported by the user device and the MIME type of data for each of the portlets. For a more detailed description of one embodiment of a process used to select portlets that may be accessed by user device 102*i*, for example, see copending, commonly filed, and commonly assigned U.S. patent application Ser. No. 09/759,744, entitled "A COMPUTER-BASED PRESENTATION MANAGER AND METHOD FOR INDIVIDUAL USER-DEVICE DATA REPRESENTATION," of Ralf Hofmann, Torsten Schulz, Bernd Eilers, and Thomas Pfohe, which is incorporated herein by reference in its entirety.

Consequently, in the following description, when user device 102*i* submits a request for access to a portlet in operation 401, no subsequent checking is done to assure that the requested data can be displayed on the user device. However, in another embodiment, the user is allowed to send requests to all available portlets, and as each request is sent, if the request cannot be processed for whatever reason, an error message is returned to the user device.

The request transmitted in send request operation 401 includes at least a description of the requested data. Such a description may be, for example, the URL of the data. The request typically also includes the MIME type or types supported by the user device, e.g., wireless application protocol (WAP) for mobile phone 102*j*. The request may also include either or both of the identity of the user device and the identity of the user of the user device. In one embodiment, the request may further include a command, such as channel, load, save, or article. See U.S. patent application Ser. No. 09/759,744, entitled "A COMPUTER-BASED PRESENTATION MANAGER AND METHOD FOR INDIVIDUAL USER-DEVICE DATA REPRESENTATION," of Ralf Hofmann et al.

Portlet check operation 440 analyzes the request from user device 102*i*, sometimes referred to as the original request, to determine whether this request has to be processed by portlet manager 321. Check operation 440 can be implemented in various alternative ways. In one embodiment, deployment descriptors as defined in the JAVA 2 Enterprise Edition are used and checked in operation 440 to determine where to direct the user request. The *JAVA 2 Platform Enterprise Edition Specification*, v1.2, Sun Microsystems, Inc., Palo Alto, Calif. (1999) and the *JAVA Servlet Specification*, v2.2, Sun Microsystems, Inc. Palo Alto, Calif. (1999) are incorporated herein by reference to show the level of skill in the art. Based upon the deployment descriptors, if the request is a portlet processing transfers to contact portlet operation 441 and otherwise processing transfers to error operation 450 that returns a page with an illegal operation error to user device 102*i*.

Portlet manager 321 may be implemented in software within web server 320, or may be installed on a separate computer system, which is connected or connectable to web server 320. In one embodiment, portlet manager 321 is implemented as a servlet that executes on web server 320.

Typically, portlet manager 321 is not continually executing on web server 320, and so if a request is forwarded to portlet manager 321 in contact portlet operation 441, portlet manager 321 is started and then the request is forwarded to portlet manager 321 for processing.

Portlet manager 321 forwards the request to the appropriate portlet. The forwarding of the request to a specific portlet completes contact portlet operation 441. The portlet retrieves the data in retrieve data operation 442, and processing in portlet manager 321 transfers to a MIME check operation within identify user type operation 443. The request from the user device contains information about the presentation requirements of the requesting user device, or contains information about the identity of the user device, or contains both. If the request contains one or more MIME types processing transfers to a get MIME type from request operation within operation 443 and otherwise to an identity check operation within operation 443.

In the get MIME type from request operation, portlet manager 321 extracts a list of MIME types supported by the user device from the request including a preferred MIME type, if a preferred MIME type is specified. The get MIME type from request operation transfers to the identity check operation.

In the identity check operation, portlet manager 321 determines whether the request included identification information. If identity information is included, processing transfers to a get identity from request operation and otherwise to retrieve scheme operation 444. The get identity from request operation retrieves the device identification from the request and transfers to retrieve scheme operation 444.

In retrieve scheme operation 444, portlet manager 321 uses the information extracted from the request to retrieve a presentation scheme for the user device from a plurality of presentation schemes stored on storage unit accessible by web server 320. An example of a presentation scheme is an XSL style-sheet for converting the MIME type of the retrieved data to a MIME type that can be displayed by user device 102*i*. In one embodiment, the retrieved presentation scheme is loaded in a memory accessible by portlet manager 321. Retrieve scheme operation 444 transfers processing to convert data operation 445. A more detailed process flow diagram of one embodiment of retrieve scheme operation 444 is presented in U.S. patent application Ser. No. 09/759,744, entitled "A COMPUTER-BASED PRESENTATION MANAGER AND METHOD FOR INDIVIDUAL USER-DEVICE DATA REPRESENTATION," of Ralf Hofmann et al.

When the portlet completes the retrieval of the requested data in retrieve data operation 442, convert data operation 445 is initiated. Portlet manager 321 processes the retrieved data using the stored presentation scheme to generate new data that can be displayed on the user device. For example, if the retrieved information is a XML document, the XSL-stylesheet loaded in memory is used to do the transformation. If the retrieved information is e-mail data, a JAVA class is used to extract the data and insert the data for example into a HTML template.

Convert data operation 445 transfers to return converted data operation 446. In operation 446, portlet manager 321 returns the converted data in a HTTP response to web server 320. Web server 320 sends the HTTP response to the user device that sent the original request.

In display data operation 447, the user device processes the HTTP response, and displays the response to the original request on the user device.

In this example, it was assumed that convert data operation 445 was performed on the same computer running portlet manager 321. However, in another embodiment, retrieve scheme operation 444 and convert data operation 445 send the retrieved scheme and retrieved data respectively to another computer system connected to the user device, or the user device itself. In these cases, convert data operation 445 is performed on the another computer system, or the user device, and returned converted data operation 446 is performed only if operation 444 was executed on other than user device 102*i*.

In the above embodiment, it was assumed that portlet manager 321 was able to identify the type of presentation requirements for the requesting user device and retrieve a presentation scheme that converted the type of the requested data to a type that could be displayed on the user device. In another embodiment, a presentation scheme is not available to convert the retrieved data to a type of data that can be displayed on the user device. For example, the user requests a spreadsheet that has a data format specified by the manufacturer of the application that generated the spreadsheet. The presentation scheme available for the user device requires an input document in XML. Since the retrieved document in not in XML, the presentation scheme is not useful.

However, in this situation, portlet manager 321 issues a translation request to a filter server 319. In one embodiment, portlet manager 321 sends a request that includes the MIME type required as input to the presentation scheme for user device 102*i*, and an address of the requested document to filter server 319. This address can be to a memory where the document is stored after being retrieved by a portlet, or a URL to location of the document on the network. The only requirement is that filter server 319 is able to access the requested document.

In response to the request, filter server 319 builds a filter that can read the requested document, dynamically convert the read data using a partial filter adapter chain to the new format, and then write the converted data in the new format so that the data can be supplied to portlet manager 321. More specifically, in response to the request from portlet manager 321, filter server 319 via a conversion service 315, in one embodiment, causes a protocol reader to be instantiated and uses the protocol reader to access the requested document to determine the format of the requested data, i.e., the source document data format. With the source document data format and the target document data format, i.e., the MIME type received in the original request, filter server 319 builds a filter for converting the format of source document to the format of the target document.

In the embodiment of FIG. 3A, filter server 319 passes the request to a conversion service 315 that in turn accesses a filter registry 316 to generate a filter map of partial filter adapters that can be chained together to convert the format of the requested document to the MIME type specified in the request. Using the filter map, conversion service 315 calls a service to instantiate each partial filter adapter in the map using partial filter adapter library 318. Conversion service 315 calls another service to chain the partial filter adapters together using a chaining application programming interface of each partial filter adapter.

In this embodiment, filter server 319 via conversion service 315 constructs a data filter by gluing a protocol read and parser unit to an input end of the partial filter adapter chain and a bit stream printer and protocol writer to an output end of the chain. After construction of the data filter, conversion service 315 uses the data filter to process the requested document, e.g., the spreadsheet. The data filter generates data with a MIME type that can be input to the presentation scheme that is returned to portlet manager 321, which in turn processes the data as described above.

One important aspect of filter server 319 is that each partial filter adapter utilizes the same generic format independent interface to input the converted data. This allows any one partial filter adapter to be connected to another partial filter adapter without concern for the particular format of the data output by the first partial filter adapter.

In one embodiment, the data filter is used dynamically, which means that the complete data file is not stored in the intermediate formats. Rather, the output from a first partial filter adapter is input to a second partial filter adapter before all the data has been processed by the first partial filter adapter.

A more complete description of filter server 319, and each of the components therein is provided in commonly filed and commonly assigned U.S. patent application Ser. No. 09/759,742, entitled "A METHOD AND STRUCTURE FOR DYNAMIC CONVERSION OF DATA," of Ralf Hofmann and Michael Hönnig, which is incorporated herein by reference in it entirety. In another embodiment, filter server 319 provides information about the dynamic data filter to portlet manager 321, and portlet manager 321 stores a new presentation scheme that includes the dynamic data filter generated by filter server 319, or at least a handle to the dynamic filter, and the retrieved presentation scheme.

First Embodiment of Presentation and Logic Service 323

Figure 5:
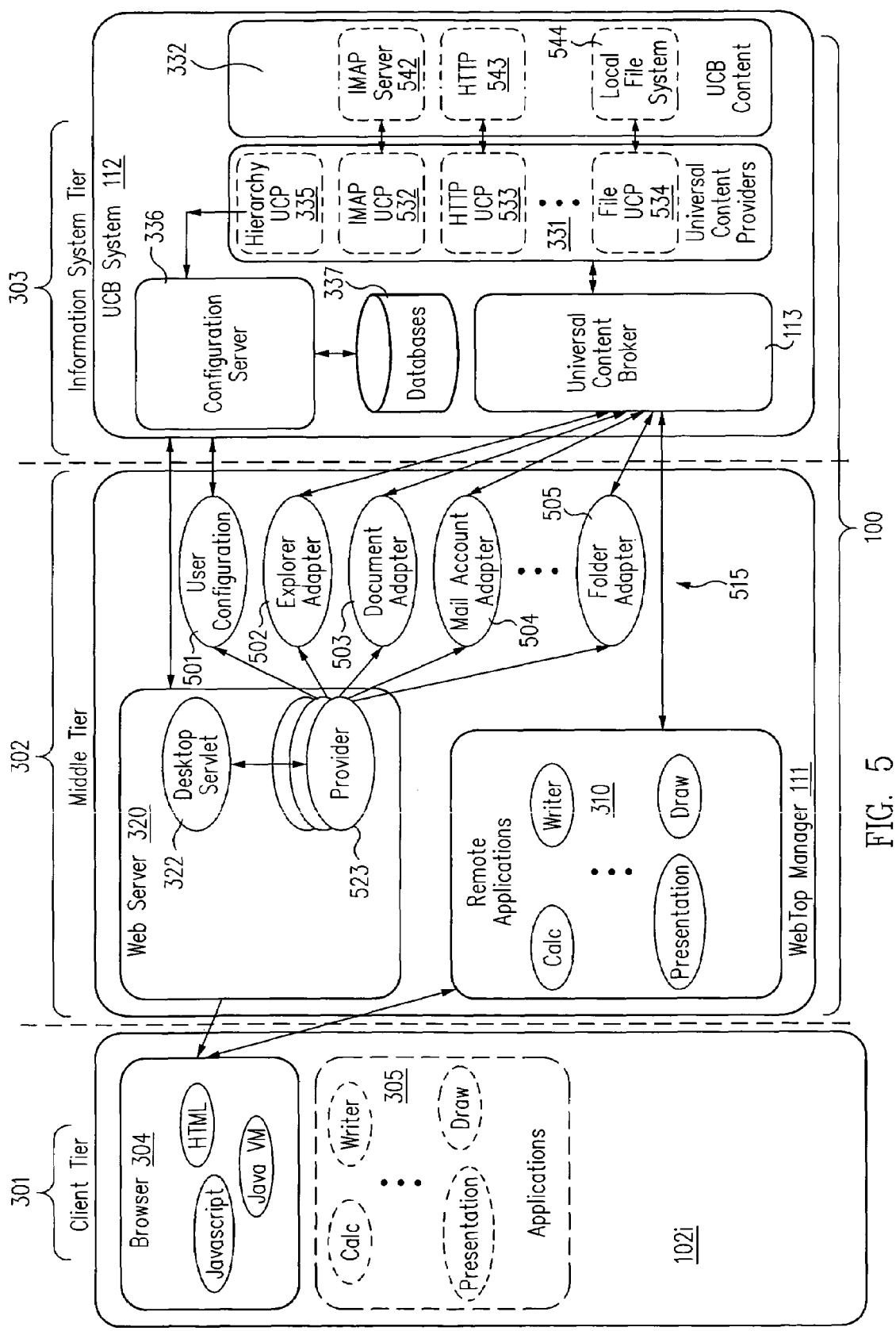
FIG. 5 is a more detailed illustration of a presentation and logic service according to one embodiment of the present invention.

As indicated above, in one embodiment of presentation and logic service 323, a plurality of providers 523 and a plurality of adapters 515 are used as illustrated in FIG. 5. Network portal system 100 in FIG. 5 includes all the services and components described above, but for clarity only the components needed to understand this embodiment of service 323 are illustrated. Also, it is assumed that the request is issued by user device 102i, but the request could also be issued by any of the user devices described herein.

In this embodiment, in provider check operation 403, desktop servlet 322 determines whether there is a provider object available to process the user request from operation 401. In this embodiment, a provider object, sometimes called a provider, is associated with a content provider in plurality of universal content providers 331. For a user to access content via a universal content provider and universal content broker 113, the user must have access to a provider object for that content. If the user already has accessed content using the universal content provider in this user session, desktop servlet 322 obtains the handle to the provider from user configuration 501.

Figure 6:
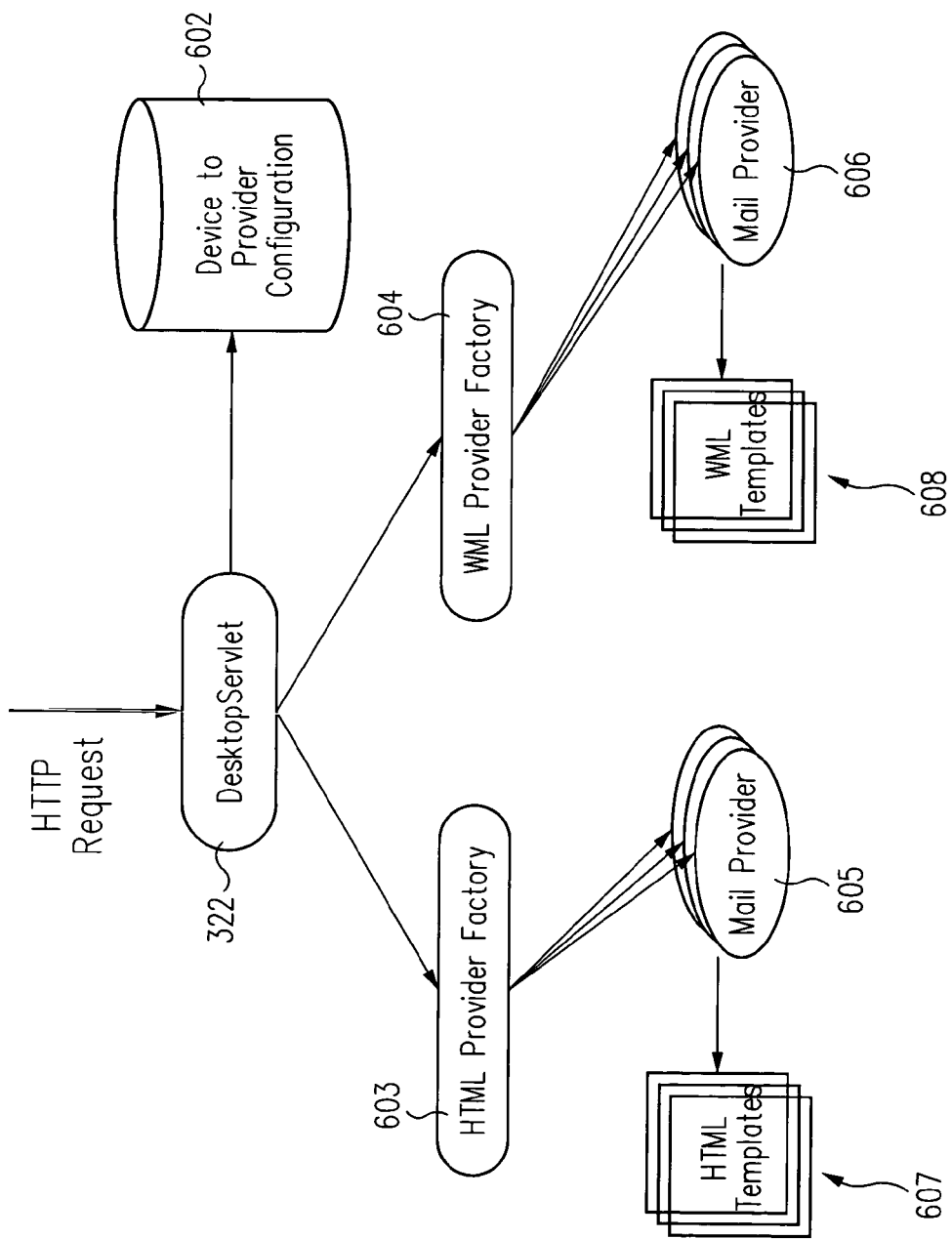
FIG. 6 is an illustration of the illustrative provider factories and templates for the presentation and logic service according to one embodiment of the present invention.

Alternatively, as illustrated in FIG. 6, desktop servlet 322, sometimes called a main servlet, accesses a device to provider configuration registry object 602, which in one embodiment is an XML file in which a provider factory for a particular content identifier and user device page type are registered. As illustrated in FIG. 6, in this embodiment, a HTML provider factory 603 and a WML provider factory 604 are registered in device to provider configuration registry 602. Accordingly, based upon the user device page type specified in the request, a provider factory object is instantiated, and in response to the request generates a provider for the content identifier type. In the example of FIG. 6, the content identifier type was IMAP and so a mail provider 605 was instantiated by factory 603 if the device page type was HTML. Mail provider 605 is linked to plurality of templates 607 that were described above. In the embodiment of FIG. 5, plurality of providers 523 includes a provider for explorer adapter 502, a provider for document adapter 503, a provider for mail account adapter 504, and a provider for folder adapter 505. A different content identifier, e.g., a different URL scheme, is associated with each of the providers.

The particular adapters available to a user are determined by the content available to the user in the user's instance of universal content broker 113. In particular, in one embodiment, plurality of adapters 515 are provided for a particular user by an authentication infrastructure, which maps the user's HTTP session on web server 320 to the users' instance of universal content broker 113, and creates plurality of adapters 515 that are bound to this instance of universal content broker 113. In one embodiment, plurality of adapters 515 is implemented using adapter classes that are instantiated and executed on the JAVA Virtual Machine in web server 320.

Each provider in plurality of providers 523 accesses the user's content for that provider, which is stored in information system tier 303, via the corresponding adapter. For example, assume that the user of client device 102i sent a request to network portal system 100 for the retrieval of content constituting a message on an IMAP server 542 with an associated property. An example of a URL included in the request is: imap://user@mailserver/inbox;UID=3. For this URL, the content has an associated property value UID set to 3. Thus, desktop servlet 322 passes the request including this URL to mail provider 605 in plurality of providers 523. Mail provider 605 in turn passes the request including the URL to mail account adapter 504.

Mail account adapter 504 passes the URL to universal content broker 113. Universal content broker 113 searches a registry of universal content providers 331 for the content provider associated with the URL. If a content provider for the requested content is found, e.g., IMAP UCP 532, universal content broker 113 returns to mail account adapter 504 a handle to the requested content in universal content broker content 332.

Figure 7:
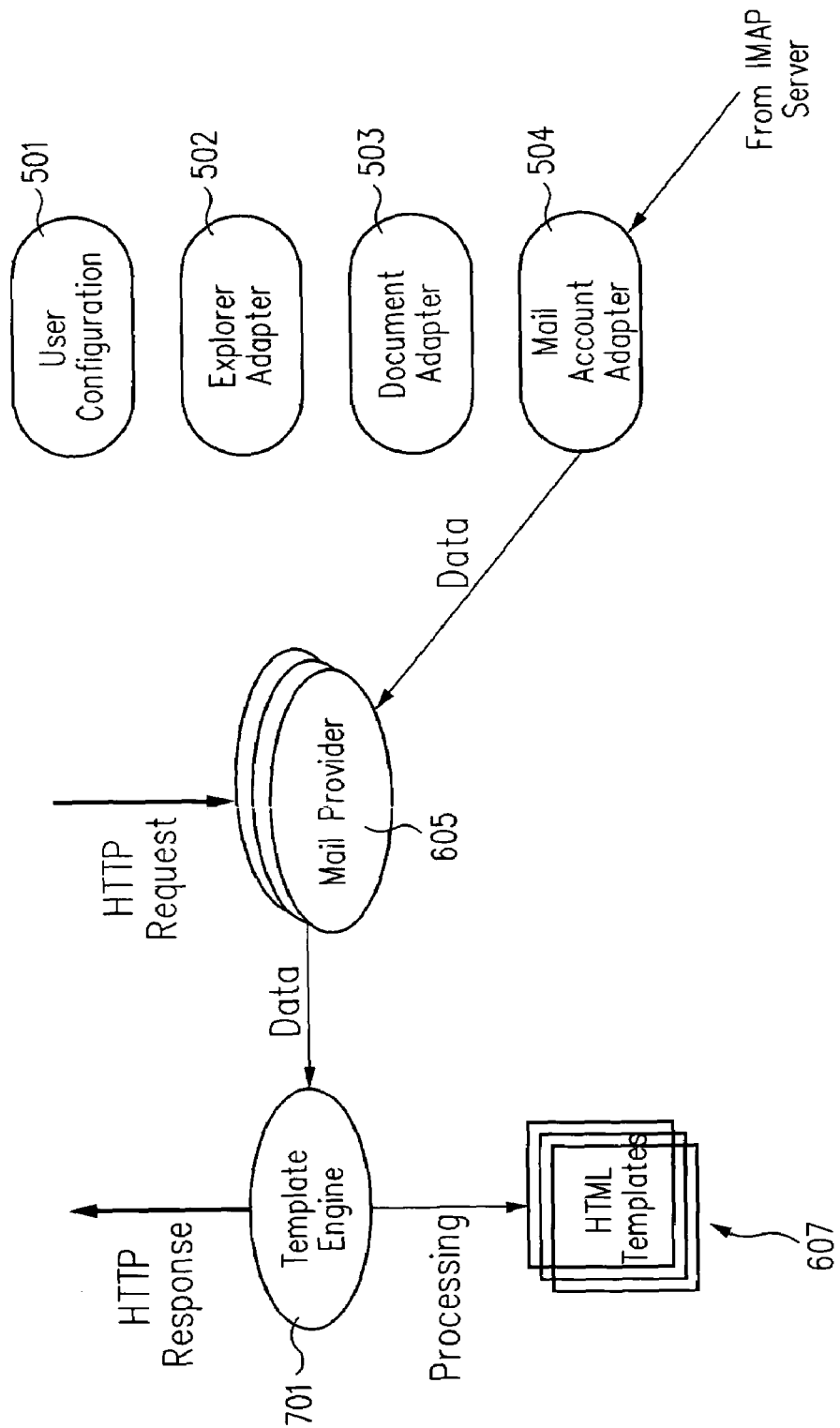
FIG. 7 is an illustration of data rendering for a user device in the presentation and logic service according to one embodiment of the present invention.

As illustrated in FIG. 7, mail account adapter 504 receives the requested content from IMAP server 542 via IMAP UCP 532. The information supplied to adapter 504 is in the form of raw data—e.g., only the name of a folder or a content type. Mail provider 605 determines how to display the information by means of templates 607, which are stored in middle tier 302. There is a set of HTML templates 607 for browsers, and a set of WML templates 608 for WAP devices. Within each set, there is a set of templates for each type of content, e.g., one set for an e-mail, another for an IMAP folder, and a third for a file system folder, for example. Within each of these sets, there is a template for each class of device, based on device capabilities.

Mail provider 605 selects the set of IMAP templates within HTML templates 607, and then selects a specific template for user device 102i using information in user configuration 501. In general, a provider uses a template engine 701 to process the selected template and replace the variables inside these templates, e.g., with the attributes of the current messages in the users inbox. In this example, mail provider 605 uses template engine 701. In one embodiment, template engine 701 is implemented using JAVA classes. The result of the process by template engine 701 is a HTML or WML stream (or whatever format is associated with the client device), which is send back to the client as response. This means that the mode of presentation of the user interface is completely described in the template and separated from the content and editing this template can easily customize the user interface.

Second Embodiment of Presentation and Logic Service 323

A large part of the functionality of network portal system 100 is provided as simple HTML/WML pages to user devices. These simple pages are dynamically generated by components on web server 320 and then displayed on client device 102i by web browser 304. There are numerous mechanisms available to web server 320 for converting application logic or generating HTML pages. Anyone of the following can be used: servlets, Java Server Pages (JSP pages), Common Gateway Interface programs, server-side JavaScript, Active Server Pages (ASP pages) or native applications. The components implemented in a JAVA environment can access other applications that have been implemented in C++, for example, by using the bridge and proxies described above.

In this embodiment, as described more completely below, presentation and logic service 323 uses JAVASERVER PAGES (JSPs) technology to dynamically generate HTML/WML pages that are sent as responses to client requests. (JAVASERVER PAGES is a trademark of Sun Microsystems, Inc.) JAVASERVER PAGES technology enables the separation of static page design and content from the application logic, which is encapsulated in portable, reusable JAVA components. For an example of the knowledge of one of skill in the art with respect to JAVASERVER PAGES technology, see *JAVASERVER PAGES Specification*, Version 1.1, Sun Microsystems, Inc., Palo Alto, Calif., (Nov. 30, 1999), which is incorporated herein by reference in its entirety.

In this embodiment, presentation and logic service 323 uses JAVA servlets 812 (See FIG. 8) to transform application logic, JSPs objects 811 to display the static portions of the HTML page, and JavaBeans objects 813 to link to the different content sources available through universal content broker 113. In this embodiment, two types of JSPs objects are used: templates and components. JSPs templates are used to organize and position common page elements and ensure consistency of design across all pages. JSPs components are used to complete a template and create a final JSP object that is used to generate a corresponding HTML/WML page as explained below.

As described above, every client request received by web-top manager 111 is accompanied by additional information such as the type of browser used (user agent) or the type of document requested (content type). Moreover, when the HTTP GET or POST methods are used for calling a specific page, additional freely selected parameters that specify user-defined commands are transferred as well.

On network portal system 100, these parameters are analyzed so that the requested information can be presented to client device 102i. In this embodiment of network portal system 100, this task is delegated to a profiling service server component 801, sometimes called profiling service 801. Profiling service 801 controls how a client request is answered. In this embodiment, HTTP is used as the default protocol for transferring HTML pages.

More specifically, as described above, a desktop servlet 322, sometimes called a main servlet, receives the request. The request is then passed on to profiling service 801, which analyzes the request. Profiling service 801 analyzes the details in the request together with other information, such as the properties of the device being used, and then decides which JSPs 811, servlets 812 or Beans 813 are to be employed to answer the request. As explained more completely below, in one embodiment a decision tree determines the process flow. The decision tree is described in a format based on XML, in one embodiment, and is stored in a profiling service configuration file 802.

Different conditions from the request are checked for agreement within the decision tree. The decision tree effectively is a concatenation of "if" instructions. If a condition is met, the branch associated with that condition is followed and the set action run. Actions are dependent on request parameters, request header parameters, device properties, and resource properties.

Device properties are the properties of client device 102i. Device properties refer to such things as display size on the device. These details are stored in configuration service 336 of network portal system 100 and in one embodiment are cached in profiling service configuration file 802 for easy access, by the components of profiling service 801, as required.

Resource properties are all the properties that are assigned to a requested document or more generally to a resource. This includes, for example the various document types (STAROFFICE documents—STAROFFICE Writer, STAROFFICE Calc or other document formats such as PDF as well as customized content types used for folders, for example).

Network portal system 100 is used with different browsers. A special add-in, e.g., lightweight remote visualization component 311 described above, is required in each browser so that documents can be edited. To enable the dynamic download of the correct add-in, the browser type first needs to be identified. These details are described by the request header parameters.

Furthermore, additional information may be supplied with each request to have custom commands executed. These additional details are termed as request parameters. To avoid transferring a large number of additional parameters with each request, parameters are stored as attributes in a HTTP session, in one embodiment. In this way it is unnecessary to send all the parameters with subsequent requests, instead the details of previous requests can be accessed.

Profiling service 801 uses this information to decide which template in templates 810 is to be used for answering the client request. Furthermore, service 801 ascertains which component, e.g., JSPs component, Servlets, Java Beans component or basic HTML elements, is to be used to complete the template. The result of this is a JSP object to which the request itself is forwarded. This JSP object creates a corresponding HTML page that is sent back to the web browser as an answer to the request.

The actual application logic is transformed by using servlets 812. To avoid having to program servlets for every single basic user action, some of the basic services are provided by main servlet 322. These include the checking of user input or the renaming folders or files.

In one embodiment, web server 320 is the Apache Tomcat server, as described above. The Tomcat server contains a servlet engine and a JSP engine that carries out the actual creation of HTML pages. In this embodiment, all of the components, i.e., JSP components, servlets, Beans components, Images, etc. are combined into a single web archive file.

Templates

Templates in web server 320 are used to organize the user interface in an easy manner. A standard frame for the presentation of HTML pages is created by defining a small number of templates. For example, a view of document storage could display all the documents of a selected folder on a particular part of a HTML page. Typically, a user is provided the possibility of switching between an icon view and a detailed tabular view of the document in the selected folder. The detail view displays not only the file name but also the size, document type, date created, etc. All other page elements remain the same as the icon view. This is where the use of templates is advantageous.

Figure 9:
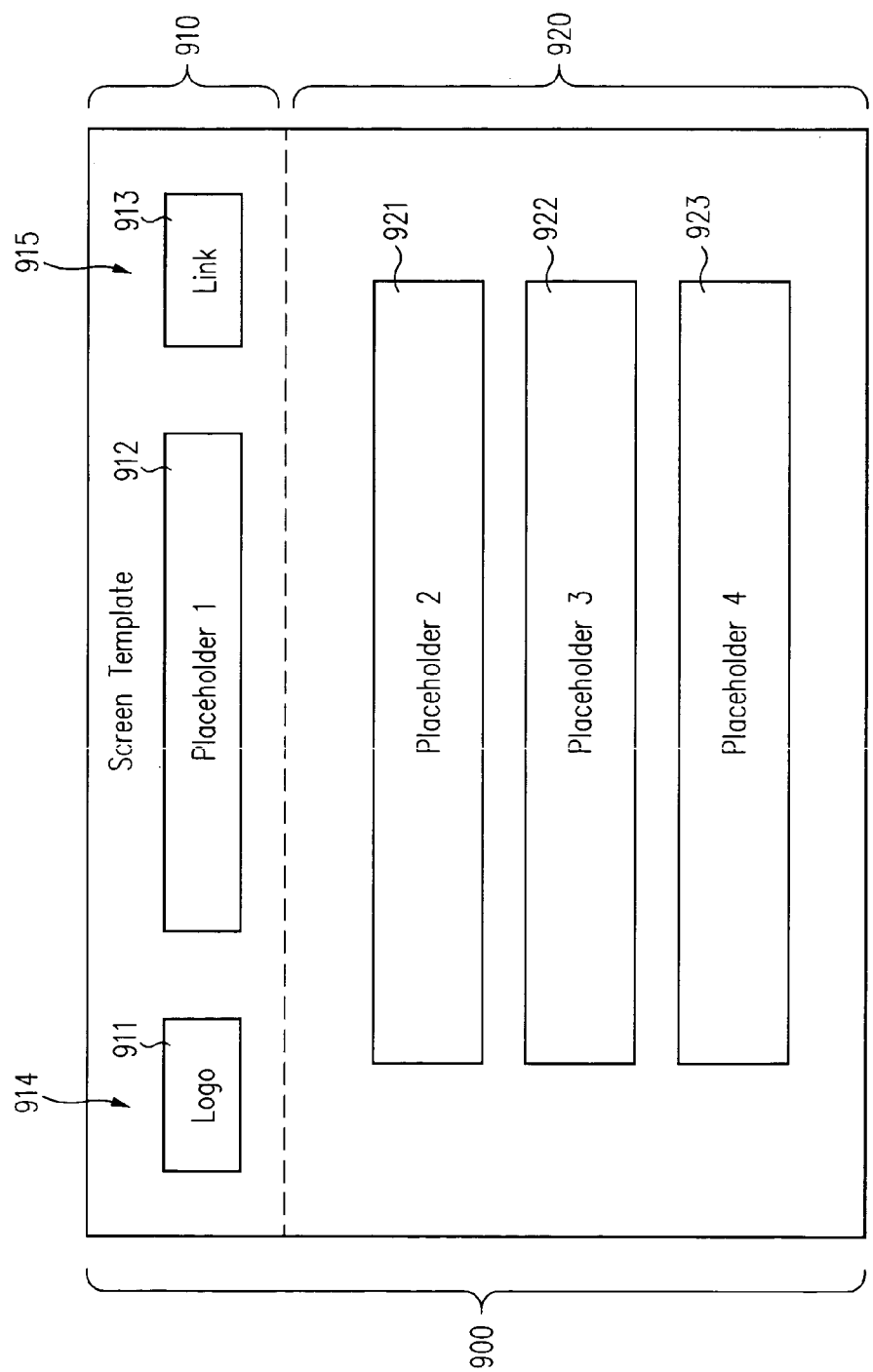
FIG. 9 is an illustrative of a default template used to generate a thin client according to another embodiment of the present invention.

In one embodiment, all pages returned to user device 102*i* are based on the same default template, with the exception of a login page. FIG. 9 illustrates one embodiment of a basic structure of a default screen template 900. Visually, template 900 is divided into a header area 910 and a body area 920. Header area 910, in one embodiment, has a dark background with a placeholder 912 framed by a logo area 911 on left side 914, and a link area 913 on right side 915. In this example, body area 920 has a light background and three placeholders 921, 922, and 923.

Figure 10:
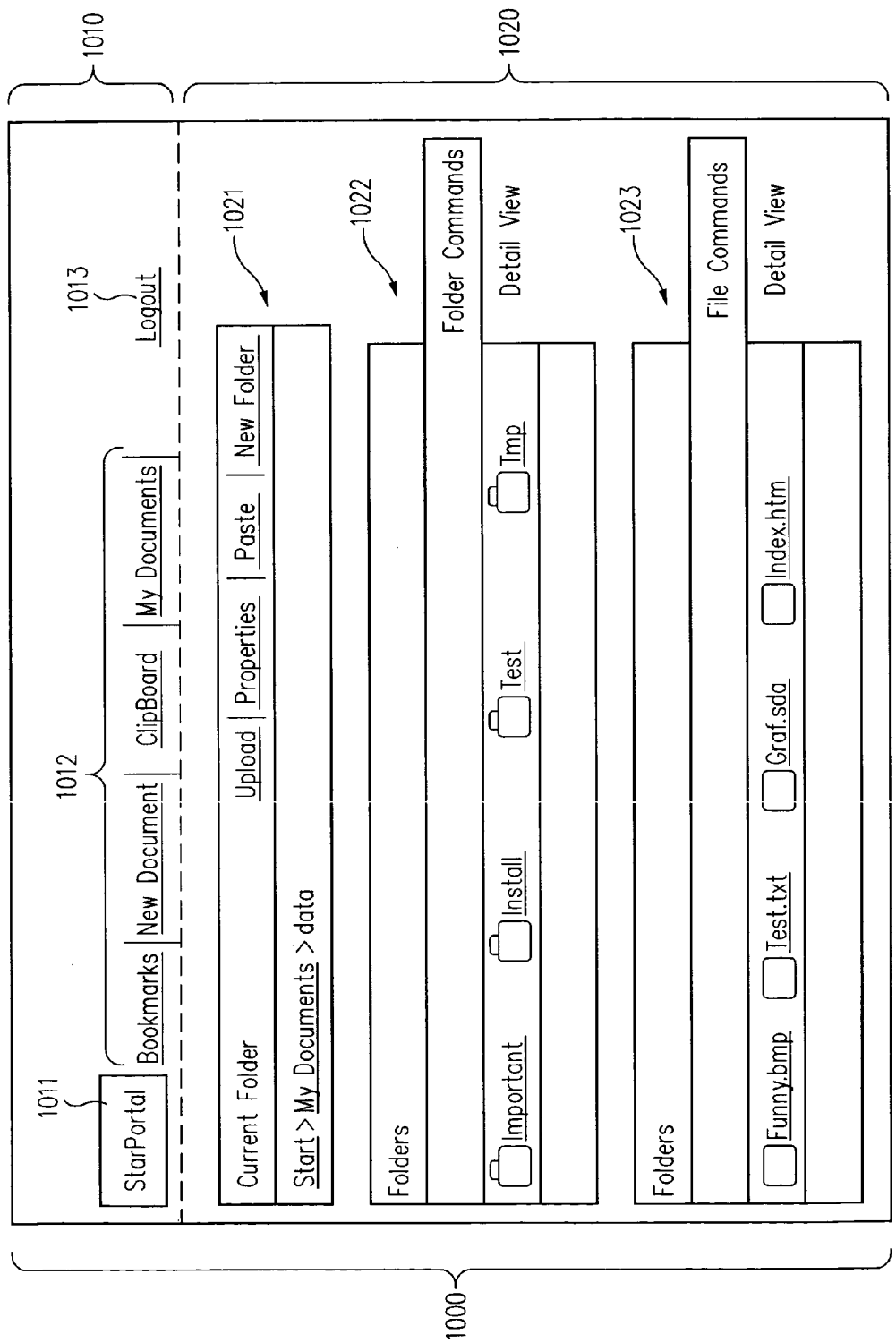
FIG. 10 is an example of a screen display generated using the template of FIG. 9 according to another embodiment of the present invention.

FIG. 10 is an example of a HTML page 1000 generated using template 900. HTML page 1000 is divided into a header area 1010 and a body area 1020. Header area 1010 includes a series of navigational aids (shortcuts) 1012 framed by a logo "StarPortal" 1011 and a logout link 1013, which, in one embodiment are hardcode in the template. In this example body area 1020 includes a Current Folder component 1021, a Folders component 1022, and a Files component 1022. Each of components 1021 to 1022 is essentially a JSP component that is included in lieu of its respective placeholder. Current Folder component 1021 shows the path of the current folder. Folders component presents 1022 an icon view of the existing folders that belong to the My Documents link. Files component 1023 lists the existing files in the currently selected folder (also as icons). While in this example, each placeholder has been replaced with a JSP component, not every placeholder in the JSP template has to be replaced before the final page is generated.

In one embodiment, most pages are functionally divided into two groups: pages that provide the option of folder and file management tasks, such as Bookmarks, New Documents, and My Documents pages, and pages that are the equivalent of menu commands and require user input such as New Folder, Rename, Mail etc. Table 1 is an example of the use of placeholders 912, 921, 922, and 923 for the page list in the first row of the table. Components that contain the Folders, Bookmarks, Files, and Items in Clipboard elements can alternate views between an icon view that lists the contents of the respective element, and a detailed tabular view that shows additional information about the content as well as a menu of commands.

TABLE 1

Placeholders and Replacements

| Default Template | Book-marks | New Documents | Clip-board | My Document | Com-mands |
|---|---|---|---|---|---|
| Placeholder 912 | Short-cuts | Short-cuts | Short-cuts | Short-cuts | Short-cuts |
| Placeholder 921 | Current Folder | Current Folder | Items in Clip-Board | Current Folder | Command Name |
| Placeholder 922 | Folders | Folders | — | Folders | — |
| Placeholder 923 | Book-marks | Book-marks | — | Files | — |

In one embodiment network portal system 100 includes at least three sets of screen templates: one set for every type of user device that is supported. Each set includes at least two templates: one for the login page and one for all other pages. In this embodiment, template WMLLoginTemplate.jsp, template PQACCPPTemplate, and template CCPPTemplate.jsp files control the client-side presentation of the network portal system Login page for WAP-, Palm VII-, and HTML-based clients, respectively. The basic design and organizational structure for all other pages are defined by template WMLTemplate.jsp, template PQATemplate.jsp, or template HTMLTemplate.jsp, depending on the client used. These templates mix JSP directives, expressions, and scriptlets with HTML.

FIG. 11 is an example of a portion of default HTML screen template HTMLTemplate.jsp, which is representative of the general structure of the templates. In view of the following description, those of skill in the art can modify the default HTML screen template for the other user devices mentioned. Near the top of the template in FIG. 11 is a set of JSP directives, followed by the HTML header definition and tag <body>, which defines the overall organizational structure of the final HTML page.

The JSP directives include a directive taglib and three page directives. Directive taglib lists the relative URL referring to the tag library descriptor file (taglib.tld) that defines custom tags, as well as the prefix attribute (Starportal) that is used in front of custom tag names, for example, starportal: insert. After defining the header in the normal way, the actual structure of the future HTML page is described in the body. Different components are inserted by using the tag <insert>. Regular HTML tags describe the positions of the inserted components on the page. In the example of FIG. 11, the different components are simply listed one under the other. The content to be shown by the different terms "CurrentFolder", "CurrentFolderCommands", "FolderViewHeader", etc. is decided by profiling service 801, as described more completely below. Depending on the actual client request, these could be other JSP pages or servlets.

Tables 2 and 3 list the placeholder names in the HTML default and HTML login templates and their respective values as defined by profiling service 801.

TABLE 2

HTMLTemplate.jsp Placeholder Names and Values

| Name | Value |
| --- | --- |
| Action | Varies |
| Title | Varies |
| Shortcuts | /html/HTMLShortcuts.jsp |
| CurrentFolder | Varies |
| FolderView | Varies |
| FileView | Varies |
| Error | /html/HTMLError.jsp |

TABLE 3

CCPPTemplate.jsp Placeholder Names and Values

| Name | Value |
| --- | --- |
| Action | Varies |
| Title | StarPortal Login |
| Shortcuts | Currently not used |
| CurrentFolder | /html/HTMLLogin.jsp |
| CurrentFolderCommmands | Currently not used |
| FolderView | Currently not used |
| FolderViewCommands | Currently not used |
| FileView | Currently not used |
| FileViewHeader | Currently not used |
| FileViewCommands | Currently not used |
| Error | /html/HTMLError.jsp |

The syntax for the value of a placeholder is defined as /folder/name.jsp, where /folder identifies the location of the respective JSP that is to be included relative to the root of the network portal system 100 installation; and /name.jsp identifies the name of the JSP.

As already explained, profiling service 801 finds the templates, JSP pages, servlets or Beans to be used by applying a decision tree. Profiling service 801 analyzes the client requests and decides, depending on the type of request, which JSP template file or servlet is to be used in response to the client request using the decision tree. In one embodiment, the decision tree is implemented as an XML-based decision tree (ScreenRegistry.xml), which defines a set of requirement types and initializes the selection made by the profiling service.

The decision on whether to use a particular JSP template or servlet depends, in this embodiment, on requirement types requestHeaderParameter, resourceProperty, and requestParameter.

Requirement type requestHeaderParameter defines the type of client browser ("user-agent"). This information is used to determine whether network portal system 100 is accessed by a WAP-, Palm VII-, or standard HTML-based user device. Depending on the user device, profiling service 801 selects a screen template that accommodates the differences in display size and functionality.

Requirement type resourceProperty refers to the properties of a requested resource. A resource may be defined as a STAROFFICE document ("ContentType"), other document type (such as a PDF or JPEG file), or folder. In general, access to documents is limited to clients that support advanced functionality such as displaying and editing documents.

Requirement type requestParameter refers to network portal system 100-defined commands ("cmd"), modules ("modules"), and submodules ("submodule") that are processed upon request.

Conceptually, in one embodiment, the decision tree is divided into three sections: Processing of WAP-based devices (See FIG. 12A); Processing of Palm VII devices (See FIG. 12B); and Processing of HTML-based devices (See FIG. 12C). Each section defines which requirements must be met for a certain template to be selected for that device. The process of analyzing and selecting a template is effectively a series of "if-then" statements. If a client request matches a certain requirement, then the decision tree initializes the use of the associated template and its components. In one embodiment, profiling service 801 compares request parameters with the respective requirement types in the following order:

1. Matching the client browser type information ("user-agent") with requirement type requestHeaderParameter;
2. Matching the properties of the requested resource with requirement type resourceProperty; and
3. Matching Network portal system 100-defined information with requirement type requestParameter.

FIGS. 12A to 12C are a pseudo code representation of one embodiment of the decision tree that implements the decision tree. FIGS. 13A and 13B are a portion of an actual XML decision tree.

In general, the decision tree follows the rules of a well-formed XML document. The decision tree includes a hierarchically organized data structure composed of connected nodes beginning with a root that is defined as file HTMLTemplate.jsp. Each subsequent tag <node> defines a set of attributes that is used to select and complete a JSP template that is defined by tag <screen> if a certain requirement is fulfilled.

Requirements are defined by tag <requirement>. which has three possible attributes: type, name, and value. This could be the querying of specific requirements on the document type (Resource Properties), browser type (Request Header Parameters) or device type (Device Parameters) and also the existence of certain commands (Request Parameters). If the condition is fulfilled by the client request, a branching off into the appropriate section takes place and the action contained there is executed. Otherwise the next condition (tag <node>) is used to continue.

Actions can contain further conditions or define specific templates (tag <screen>) for answering client requests. It can also be the case that the individual components of the templates (tag <component>) are determined.

In many cases the same condition appears in different branches of the decision tree. Substitutions can be defined for these cases. This substitution has been carried out, for example, for a FileView component in FIG. 13B. Depending on whether the parameter "viewTypeFiles" has a value of "iconView" or "detailView", different JSP pages are used for component FileView.

More specifically, whether profiling service 801 selects a template associated with a WAP-based, Palm VII, or HTML-based user device depends on the user-agent header information provided by the client request. For example, if the client is a Nokia Web-enabled phone, the user-agent header information matches the requirement for processing WAP devices. In the decision tree this corresponds to the following element:

```
<!- - processing WAP devices - ->
  <node>
    <requirement    type="requestHeaderParameter"
       name="user-agent" value="Nokia*" />
``` which is associated with the following template and components:

<screen template="/wml/WMLTemplate.jsp" class="wml">
. . .
</screen>

In this example, if the user accesses network portal system 100 from a Nokia phone, the decision tree initializes the use of template WMLTemplate.jsp, which is used instead of the default template HTMLTemplate.jsp template that is defined as the root of the XML file.

Alternatively, if the user uses a Palm VII device, the user-agent header information matches the following requirement type:

<!- - processing Palm VII devices - - >
<node>
<requirement type="requestHeaderParameter" name="user-agent" value="???PALM???*" /> which is associated with the following template:

<screen template="/pqa/PQATemplate.jsp" class="pqa">
. . .
</screen>

In this case, the decision tree initializes the use of template PQATemplate.jsp, which replaces the default template HTMLTemplate.jsp defined in the root of the decision tree.

By contrast, when the request is made by an HTML-based client, it is no longer necessary to match the request with a corresponding requirement type for processing HTML devices, because the request did not match any of the previous requirements of the type requestHeaderParameter, the request has to come from an HTML client.

Once the decision tree initializes the use of a device-based template, this template becomes the default for the current request, with the exception of the login request. When a login request is received, the currently used device-dependent default template file is replaced with the respective login template file. This is because the login requirement is listed in the decision tree as a child of the respective client browser requirement type as shown in the following pseudocode:

```
HTMLTemplate
  if(user-agent=WAP device)
    then(use template=WMLTemplate.jsp class="wml")
      if(requested page IS NOT login page)
        then(use template=WMLTemplate.jsp AND its
          associated components as required per request)
      elseif(requested page IS login page)
        then(use template=WMLLoginTemplate.jsp AND its
          associated components as required per request)
  elseif(user-agent=Palm VII device)
    then(use template=PQATemplate.jsp class="pqa")
      if(requested page IS NOT login page)
        then(use template=PQATemplate.jsp AND its
          associated components as required per request)
      elseif(requested page IS login page)
        then(use template=PQACCPPTemplate.jsp AND its
          associated components as required per request)
```

If the client is identified as an HTML-based device, the decision tree initializes the use of the template HTMLTemplate.jsp defined as the root of the document. In the case of a login request, the decision tree initializes the use of template CCPPTemplate.jsp, because the login requirement type is defined as a parent within the existing tree structure as shown above.

Once a template has been initialized for use, the template still needs to be completed; that is, instead of its placeholder elements, additional components (JSP) need to be included as required per user request. The respective placeholders for the Shortcuts, Current Folder, Folders, and Files components are defined as illustrated in FIG. 11 following tag insert. As explained above, each component is represented by a placeholder, i.e., componentName="placeholder name", that is defined by tag insert. The ultimate value of each component is defined in the decision tree. (See FIGS. 13A and 13B.)

In this example, the values of placeholders Shortcuts and Current Folder in template 1100 (FIG. 11) are defined in the decision tree in node 1310 at the top of FIG. 13B as JSP files that are included in template 100 when a user clicks link My Documents. In the case of placeholders FolderView and FileView in template 1100, however, the value is defined in node 1310 as a substitute: $FOLDERVIEW and $FILEVIEW. Substitutes are a convenient way for defining alternate values that appear in various contexts. The value of these substitutes are defined in FIG. 13B as elements 1311 and 1312, respectively.

The ultimate value of each substitute depends on the client request parameters. For example, if the value of the client request parameter viewTypeFolders is defined as iconview, the value of placeholder FolderView is defined as HTMLFolderView.jsp. Likewise, if the value of the client request parameter is defined as detailView, the value of placeholder FolderView is defined as HTMLFolderTableview.jsp. In all instances, the decision tree determines, which JSP file (or component) is included into the template so that the web server 320 can execute the resultant JSP page to generate the requested content of the network portal system page.

Figure 14:
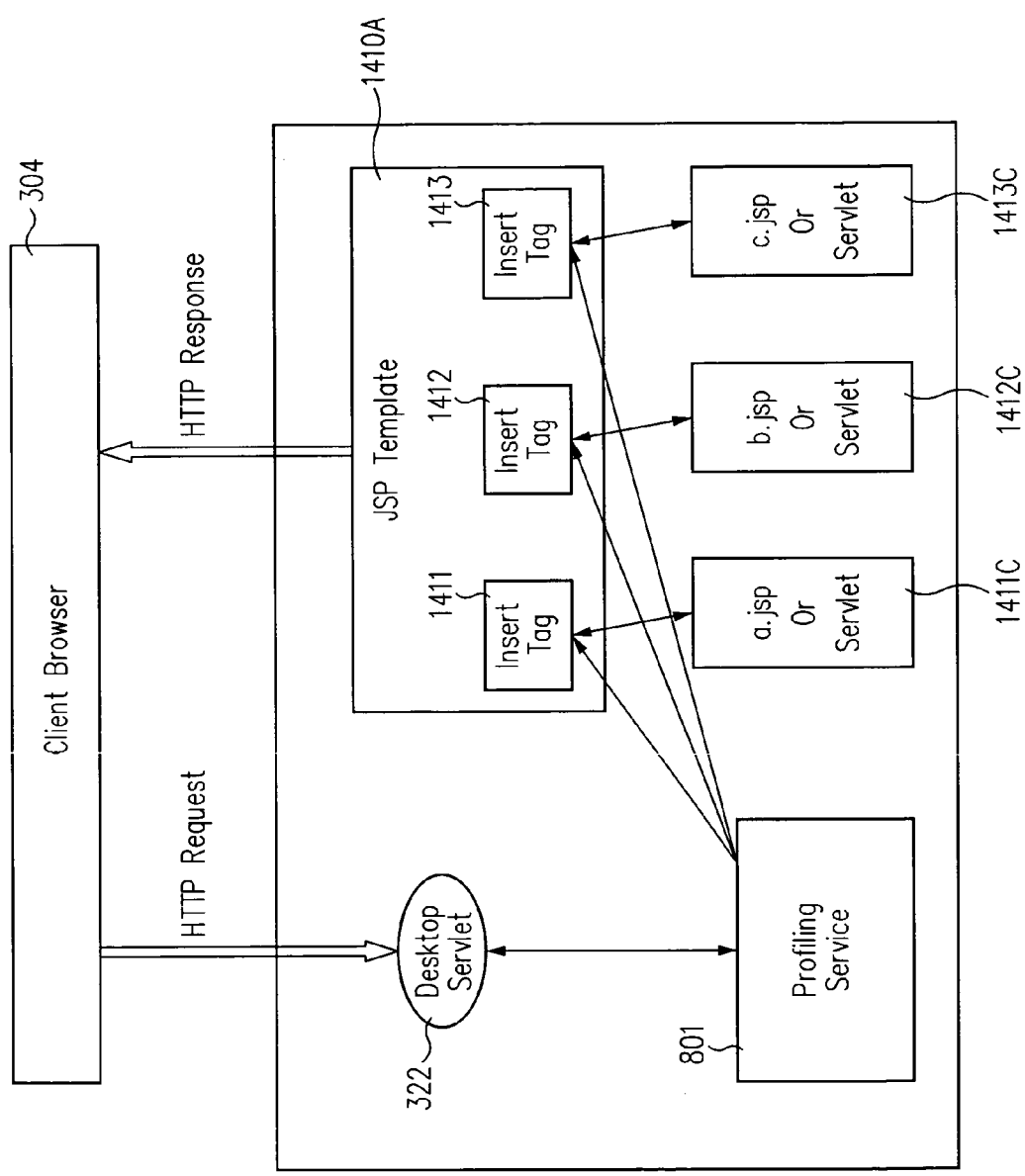
FIG. 14 is an illustration of the process in completing a display template according to another embodiment of the present invention.

FIG. 14 the process in completing a JSP template once template 1410A has been selected by profiling service 801. As described, the decision tree determines which server pages/servlets 1411A to 1411C are inserted at the corresponding insert tags 1411 to 1413 respectively.

An Embodiment of Configuration Server 336

Prior to considering the components for one embodiment of configuration server 336, the information stored and handled by configuration server 336 is described. The entries stored on configuration server 336, in one embodiment are classified in two large groups, user profiles and application profiles. User profiles describe all the user-dependent settings, which are not dependent on a particular application, but are specific to a domain to which a user belongs. These can be such entries as name and address of the portal user or details about user accounts. For example, a user profile can include any or all of:

User login information such as userid, passwords/certificates for certain applications, etc.;

User environment that includes hardware/software (type of portal device in use or available peripherals on client device or OS on laptop) settings, printer settings, language preference, etc.;

Network and server settings such as which Proxy server, name server, IMAP server, Calendar server to use, ISP, PPP, DNS, DHCP settings, etc.;

User policies regarding personal data and resources, who can access them, what type of access, etc.;

User policies regarding application choice and configuration per client device available;

Personal settings: bookmarks, alias definition, Vacation configuration for e-mail, delegation or proxy accounts for certain tasks, etc.; and User application preference from a group of similar types of available applications (Outlook Express rather than Netscape Messenger or StarMail), application settings (the applications that must be deployed upon login), etc.

Application profiles describe application components such as user interface components, libraries, data store schemas, etc. Application profiles also contain application default parameter values. For example, an application profile can include any or all of:

Version, server/URL where application should be deployed from (note that different versions of same application may be available through portal), libraries/DLLs used, dependencies, etc.;

Vendor, distribution channel, License information;

User interface related information such as XSL stylesheets per client device supported, XML/DTDs describing default values for configuration information; and Default application profiles including default environment variable settings, default printer, default background/foreground colors, etc.

In one embodiment, all of the application profile data is defined through XML/DTDs/Schemas.

Configuration server 336 is not restricted to these two groupings. Configuration server 336 typically also includes entries for system configurations, policies and/or device-specific settings. This means various user roles with different access rights to system resources can be defined. In one embodiment, it is also possible to store user device-specific data such as display size.

Figure 15:
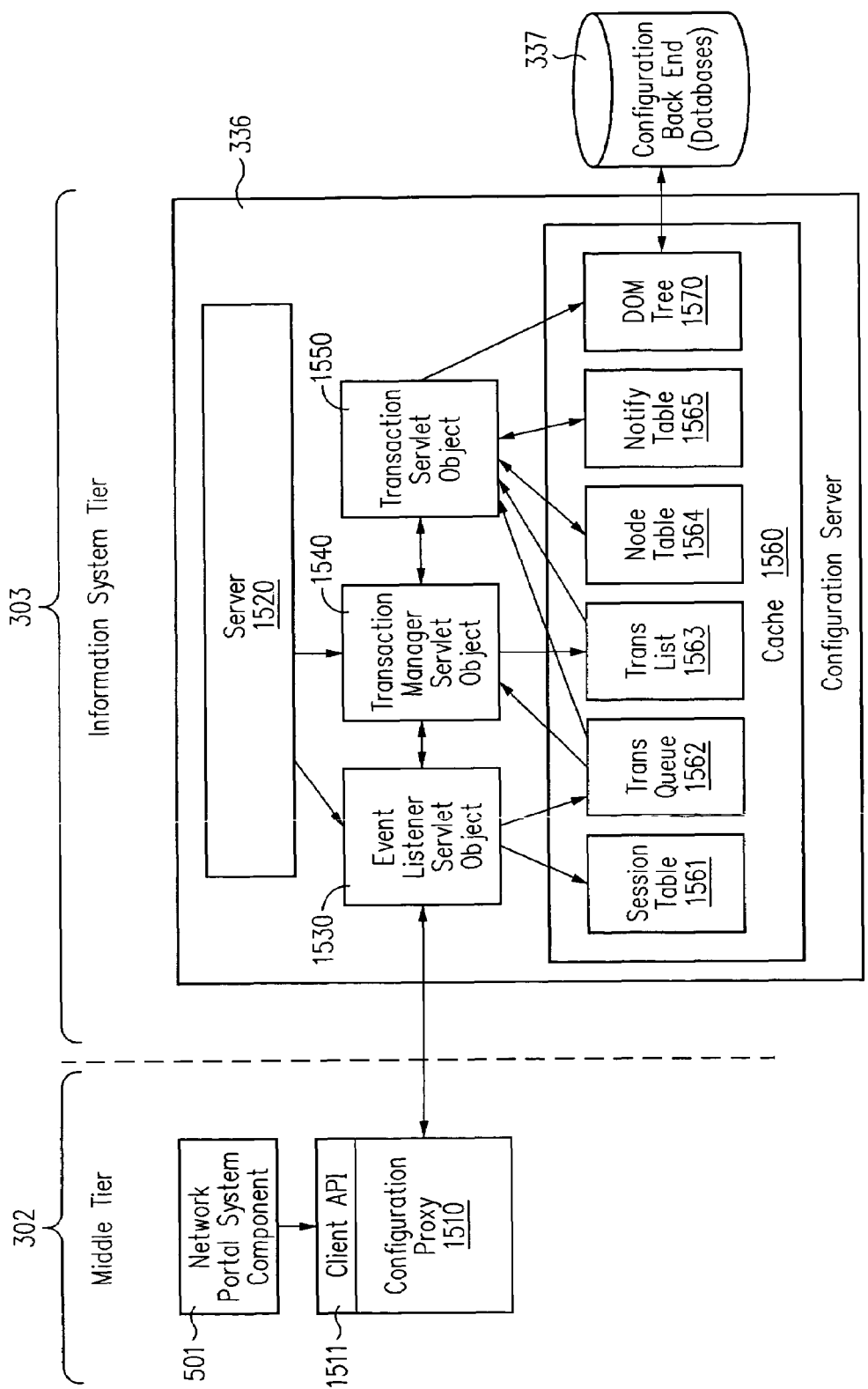
FIG. 15 is a detailed block diagram of a configuration server according to another embodiment of the present invention.

FIG. 15 is a more detailed block diagram of one embodiment of configuration server 336. A component of network portal system 1501, e.g., a UCB component such as hierarchy content provider 335, or one of remote applications 310, accesses configuration server 336 through a configuration proxy 1510 that is shown executing in FIG. 15 on web-top manager 111. However, if for example, configuration proxy 1510 is associated with hierarchy content provider 335, configuration proxy 1510 may be in information tier 303. Typically, configuration proxy 1510 is in the same execution environment as component 1501 using proxy 1510 to access configuration server 336. One embodiment of client API 1511 of configuration proxy 1510 is described below.

As explained more completely below, configuration server 336 in response to the access by proxy 1510 communicates with a configuration back end 337 to load the data in a configuration tree or to store persistent modifications. For example, UCB components or one of remote applications 310 can load entries from configuration server 336. In this case, configuration proxy 1510 does not start as a separate process, but as a shared library directly in the corresponding UCB component or remote application. This enables direct communication between the components and configuration proxy 1510. While in FIG. 15, a single component 1501 and a single proxy 1510 are illustrated, typically each component has its own proxy and so several proxies communicate with configuration server 336. Therefore, the following description is illustrative only and is not intended to limit the invention to the specific embodiment described.

In this embodiment, configuration proxy 1510 provides seamless access to configuration data for client component 1501. Configuration proxy 1510 gets data from configuration server 336 on behalf of its clients, and caches the data in a DOM tree in proxy 1510 for optimal use. The same data may be accessed and modified by more than one client applications/components, e.g. network portal system components, at the same time. Therefore, proxy 1510 has responsibility to synchronize and merge data changes by different clients and to notify all clients accessing that data about data changes. All modifications are initially carried out on the DOM tree stored in proxy 1510. Proxy 1510 reports collective changes to server 336 that in turn makes actual changes to DOM tree 1570 that is described more completely below.

Prior to considering the operation of the various components of server 336 in FIG. 15, the data layout used in configuration server 336 is described to facilitate the understanding of the description of the operation of the various components. To keep track of the configuration data modifications by the various proxies, the configuration data, in this embodiment, is stored in a single DOM tree 1570 in cache 1560 of configuration server 336.

Figure 16A:
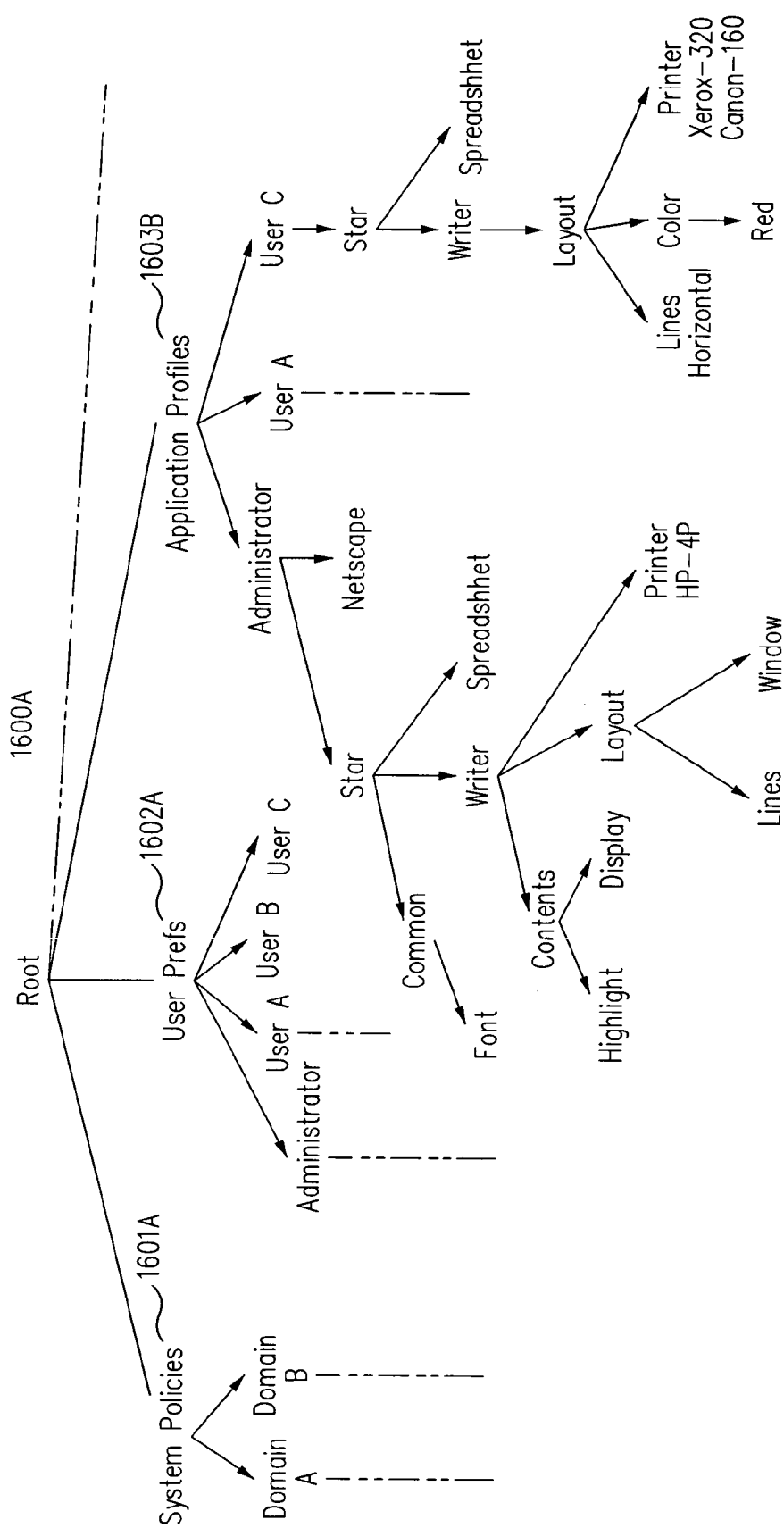
FIGS. 16A and 16B are two examples of DOM trees found in the configuration server according to another embodiment of the present invention.
Figure 16B:
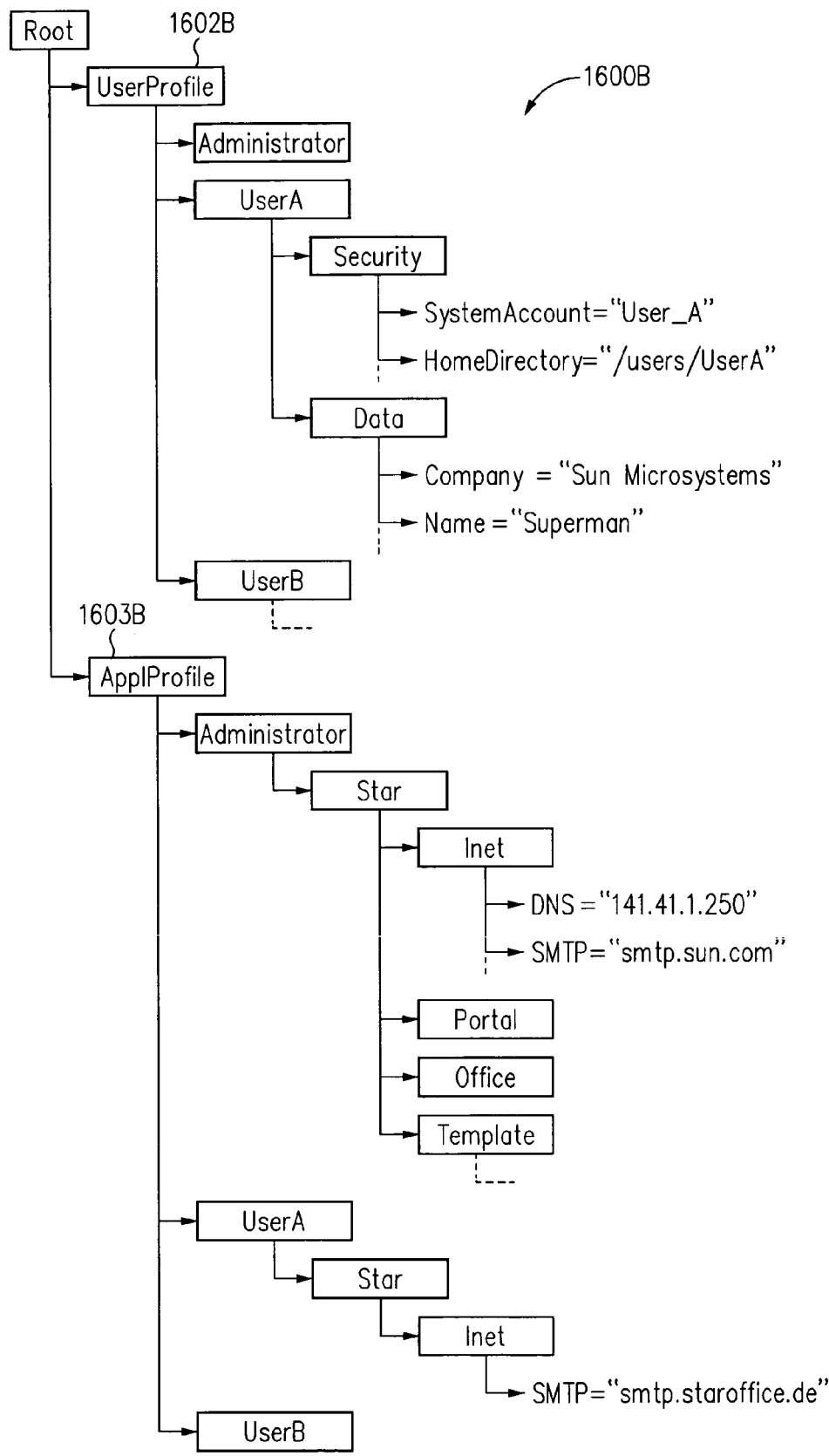

FIGS. 16A and 16B are examples of configuration tree structures 1600A and 1600B, respectively stored in cache 1560 as DOM tree 1570. In this embodiment, only the leaves of DOM tree 1570 can hold data. The inner nodes are used to show hierarchical relationships. Data can be of a simple type, such as integers, Boolean, strings, doubles or data can be of a user-defined type through templates, as described below. Binary data also can be stored in one embodiment. Configuration server 336 also supports the use of containers such as lists and sets.

A template is used for more complex data types in the configuration tree. Templates describe the structure of part of the configuration tree. The configuration tree itself can appear repeatedly in various parts of the configuration service. The information about a portal user covers details such as first and last name, company name, address, telephone number, fax number, etc. It would be cumbersome if the corresponding nodes had to be created again for each new user. Instead, the structure of the user details is summarized as one template. This is stored in a specific location in configuration server 336. An administrator or an administration tool can refer to this template when a new user is created. Configuration server 336 carries out the actual setting up of the appropriate entries.

Templates simplify and standardize large quantities of data. If data structures are repeated, templates are used for summarizing complex structures and facilitating configuration service administration. A template can hold any type of data and is in itself a definition of new data type. Templates are often used in conjunction with sets.

Figure 17:
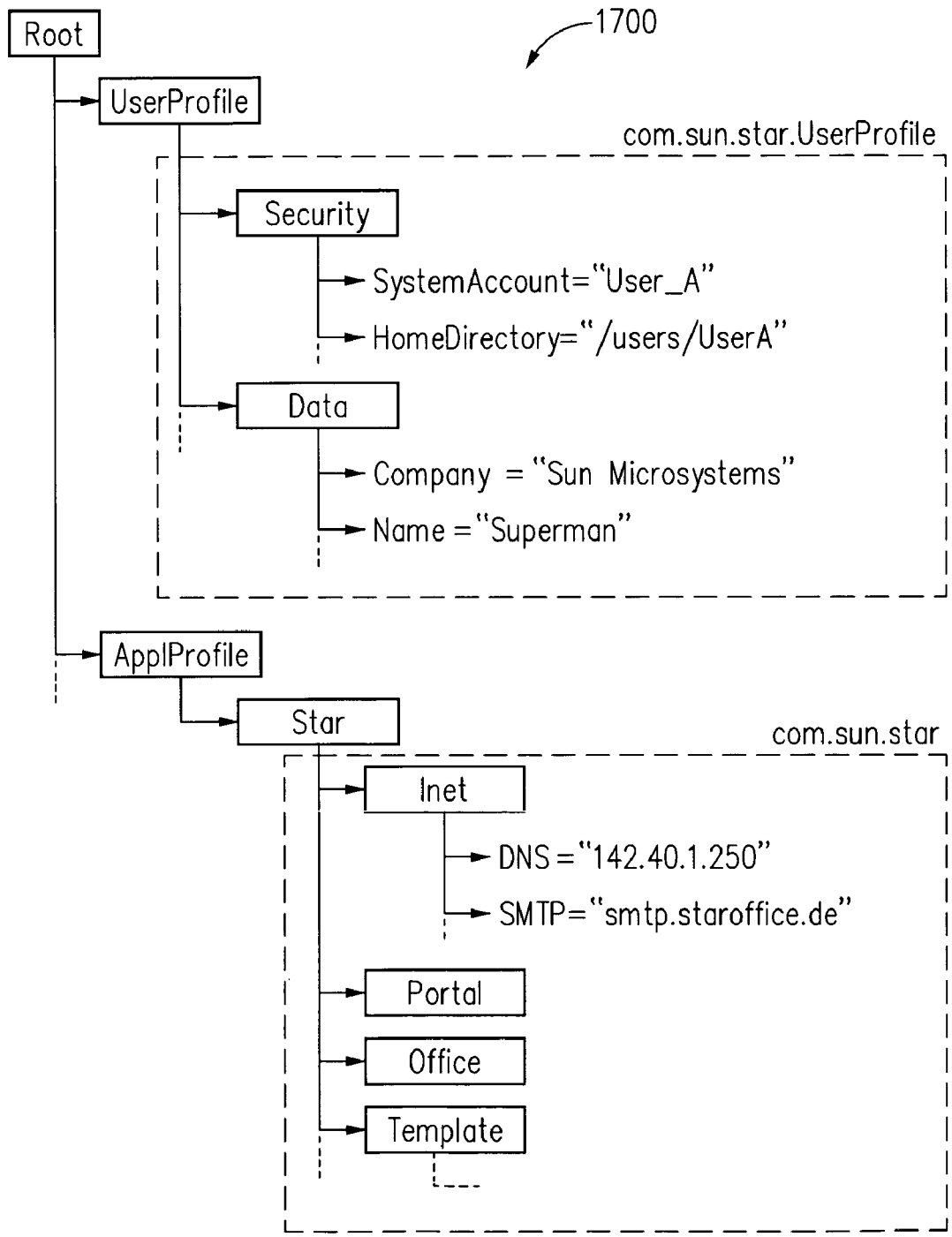
FIG. 17 is an example of a merged configuration tree of a user according to another embodiment of the present invention.

The data of the different portal users is confidential. A user must not have any access to settings or data belonging to other users. In addition, network portal system component 1501 does not need to know the complexity of the data stored in DOM tree 1570. For these reasons, as soon as a user contacts configuration server 336 via proxy 1510, a custom user-specific configuration tree view, called a merged configuration tree, is built and stored by proxy 1510. The merged configuration tree contains the data the user can access. FIG. 17 shows a merged configuration tree 1700 for user A in configuration tree 1600B (FIG. 16B).

In many cases settings stored in DOM tree 1570 are identical for all users. An example of this is Internet settings, which are normally identical for all users of network portal system 100. It would be very time consuming if identical values had to be manually entered and stored for each user. Configuration server 336 has the capability of merging parts of trees, e.g., merged nodes between a particular branch's Administrator branch and the user's branch.

Hence, an administrator can define default values m for the different nodes that are included in the merged trees. These nodes are then stored in special branches of the configuration service under "Administrator". When the user-specific configuration is constructed, the nodes of that user and the administrator are merged and returned to proxy 1510.

This merge process can be imagined as a layering of one part-tree on top of another. The user tree is laid on top of the administrator tree. Specific user settings overwrite the default settings made in the administrator tree and only those settings get added to the user subtree. For example, in FIG. 17, the administrator default setting for SMTP access is overwritten by the setting made by User A. All of the other settings made by the administrator remain unchanged.

In another embodiment, more than two layers of data are used. For example, different layers could be defined, which are represented by different trees of the same structure. These layers could then contain various settings, e.g. for specific user groups or devices.

In one embodiment, to access the individual entries in the configuration tree, the entire path from the root to the required node is entered. For example, to access node SMTP in FIG. 17 the path "Root/ApplicationProfile/Star/Inet/SMTP" is used. An administrator can also issue scheme ids to facilitate access to specific entries. These scheme ids address a particular part of a particular tree. In FIG. 17 the tree under "Root/ApplicationProfile/Star" has been given the scheme id "com.sun.star". Therefore, the entry for the SMTP server of User A can also be accessed through "com.sun.star/Inet/SMTP". The name of the user is accessible in a similar way by using "com.sun.star.UserProfile/Data/Name".

Figure 18:
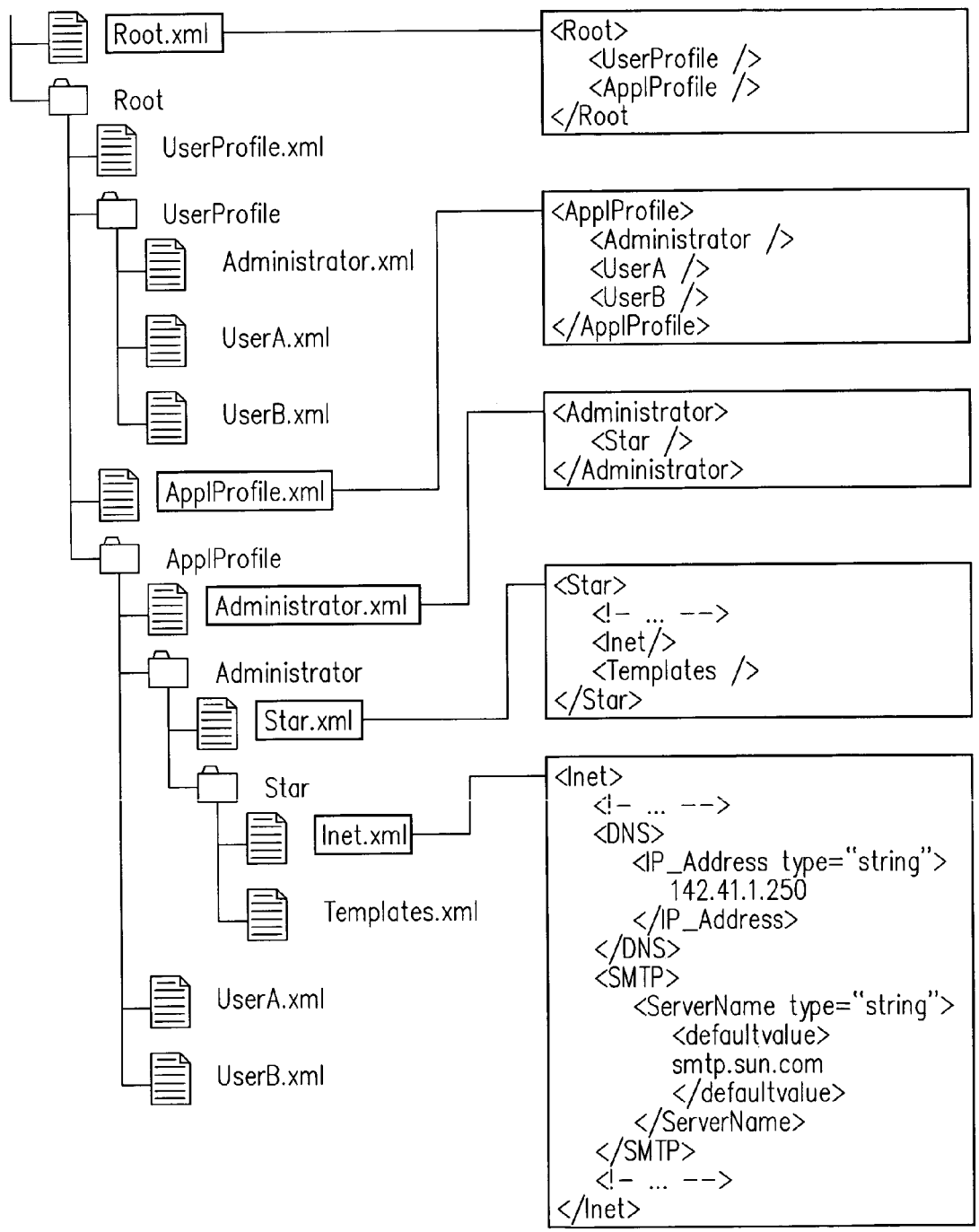
FIG. 18 is an example of the file structure used to store the data in FIG. 16B according to another embodiment of the present invention.

The data in DOM tree 1570 is stored on configuration back end 337. A file-based system acts as the configuration back end 337 in one embodiment. FIG. 18 shows how the structure of configuration tree 1660B (FIG. 16) has been applied to a series of XML files and a corresponding directory structure. A corresponding XML file usually describes each node. The description of the subordinate trees is found in a folder named accordingly.

Thus, only nodes ApplProfile and UserProfile are found below the root node. This structure is described in file Root.xml.

The descriptions of the subordinate trees are found in folder Root. Files ApplProfile.xml and UserProfile.xml define the structure of these trees. The division into XML files and corresponding folders provides a clearer representation of configuration tree 1600B. It is also possible to store the description of an entire part-tree in a single XML file. However, the data that logically correlates is typically stored in a single XML file. For example, the tree for the Internet settings is described in a single XML file Inet.xml.

The files for the user-specific settings take a special role. The entire tree is stored in a single file, e.g., file UserA.xml. This may become very complex, depending on how many default settings the user overwrites.

Administrators normally do not have to concern themselves with user files. If settings are to be stored in the configuration for additional components, only the required structure description has to be inserted in the appropriate administrator branch or directory. User data is then updated automatically via configuration server 336. The various XML files are stored on a storage medium of configuration back end 337.

Alternatively, a database such as a relational database management system and/or an LDAP database could be used in configuration back end 337. In this case, it would also be possible to employ several configuration servers for load balancing purposes. If a database is used, configuration server 336 includes XSL stylesheets, or perhaps uses dynamic data filters as described above, to convert the data as it is retrieved from the database into XML data, and to convert the data from XML data to data that can be stored by the database.

Since user information may be already available in LDAP databases or address book services, in one embodiment of configuration server 336, tools are provided to import such data from external sources.

Typically, an administrator would extract user data from a LDAP database into a flat file and use the tool to convert LDAP entries into VCARD format that is output into a flat file again. Address book entries can be exported into VCARD format and saved into a flat file. This file containing VCARDs is then given to the import tool, which extracts the information from the VCARDs and creates configuration user records.

Returning to FIG. 15, and the management of configuration data by configuration server 336, server 1520 is a container class that instantiates event listener 1530 and transaction manager 1530. Server 1520 also creates tables, described below, in cache 1560. After initializing itself, server 1520 creates a DOM tree 1570 in cache 1560 and populates DOM tree 1570 with system policies from configuration back end 337. Server 1520 also reads in the master XML file, e.g., file Root.xml (FIG. 17), that describes the top level DOM tree structure below which individual application profiles, User preferences, etc. are added. Thus, initially DOM tree 1570 only contains nodes ApplProfile and UserProfile.

To initiate connection with configuration server 336, user configuration provides information to identify the user in a call to transaction openSession. This is the first transaction that must be requested to authenticate the user and establish a connection oriented session, a TCP session in one embodiment, that persists through multiple transactions. In this embodiment, the value of input parameter UserInfo passed in the call to transaction openSession is the user name. In another embodiment, login parameters are included in the transaction call.

In configuration server 336, a listener 1530 listens for incoming connections and transaction requests. For every connection request, listener 1530 creates a TCP socket that provides connection-based communication between proxy 1510 and server 336. Each per-client TCP socket receives transaction requests from a proxy, in this embodiment. When a transaction request is received, this thread creates a transaction identifier, and parses the header of a transaction envelope (See FIGS. 19A to 19E) to find out what transaction is requested. The thread adds an entry about the transaction into a transaction queue table 1562 in cache 1560 that includes the transaction identifier, the session identifier, the transaction name, and a pointer to the XML-envelope. In this embodiment, transaction queue table 1562 contains all the pending transactions from all sessions. All incoming transactions are queued in table 1562

With respect to the call to transaction OpenSession, listener 1530 processes this transaction directly. After authenticating the user, if supported, listener 1530 creates a unique session identifier and adds an entry including the session identification, user info, and socket info, to a session table 1561 in cache 1560. From now on, transactions coming through this connection are associated with this session identifier and belong to this session. If a client (or monitoring Administrator console) needs to get the status of the session, the client must specify this session identifier. Hence, the session identifier is returned to proxy 1510. Note that there may be more than one proxy session for the same user.

Session table 1561 keeps track of the current sessions served by configuration server 336 and contains all session related information. Table 1561 is used to get client connection information when transaction responses must be returned.

After opening the session, proxy 1510 makes one or more requests to transaction openNode to get configuration data. The call to transaction openNode tells server 336 a node should be brought into DOM tree 1570. The call may ask that a given node and all its subNodes be brought in, or the call may ask to bring in a limited number of levels of subNodes. In this embodiment, the input parameters in the call to transaction openNode are nodePath, numLevels and username. The transaction returns parameters nodeId and subNode.

In one embodiment, input parameter nodePath specifies the uniform resource identifier (URI) of the node to be brought into DOM tree 1570. An input parameter numLevels specifies how deep the tree brought into DOM tree 1570 should be. A value of zero indicates all the sub levels should be brought into DOM tree 1570. Input parameter username is an optional parameter and, in one embodiment, is allowed to be specified only by a user "Administrator" to access other users' nodes.

When event listener 1530 receives the call to transaction openNode, event listener 1530 adds an entry to transaction queue 1562. Transaction manager 1540 has the responsibility of dispatching transactions, and monitoring unresolved transactions. Transaction manager 1540 works off transaction queue 1562 and does the work through a number of concurrent threads. For every transaction request, transaction manager 1540 adds an entry into transaction list table 1563 in cache 1560 and creates an instance of transaction 1550. In this embodiment, transaction list table 1563 includes the transaction identifier, the session identifier, the transaction name, and the transaction status.

Transaction 1550 runs in a separate thread. In this embodiment, every server transaction 1550 is defined by a separate class that derives from this class. The transaction parses the transaction envelope's body and extracts the transaction's parameters. The transaction then runs itself. When the transaction has finished processing, the transaction removes its entry from transaction list table 1563 and returns the response using the same transaction envelope with changes in the header and the body.

In transaction openNode, the transaction first makes sure that the requesting user is an Administrator if the optional input parameter username is given. If the user is not an administrator, an error is generated and the transaction is not processed further.

If input parameter username is not given, or the user is an administrator, the transaction checks if the given node already exists in DOM tree 1570. This means that the node must exist in the Administrator branch as well as the current user branch. Under some circumstances, the node may exist in Administrator branch but not in the user branch (different user session has already brought in the tree). If so, the node needs to be brought into the user's tree for the current session. If the transaction does not find an entry node table 1564, transaction 1550 gets the node from configuration back end 337 and adds the node to DOM tree 1570. For an XML-flat file database as illustrated in FIG. 18, this may involve opening a number of XML files and creating entries for then in node table 1564. For each XML file opened to satisfy this request, the transaction adds an entry to node table 1564 in cache 1560.

Upon completion of the transaction a node identifier is returned and otherwise an error message is returned.

In this embodiment, the node identifier of the nodes that contain the requested node are reused, this ensures that a node in node table 1564 is not contained by any other node in node table 1564. Therefore, when a node is closed the node being closed is not the parent of any other node in the table.

Thus, in response to a call to transaction openNode, server 336 returned a unique node identifier that identifies the subtree this request has opened, or another proxy already opened in a different session. From now on, this node identifier must be used for valid transactions on that node. All transactions working on data under this node must specify the node identifier returned by this transaction.

Proxy 1510 may make more than one openNode request for the disjoined nodes that proxy 1510 needs. Proxy 1510 may even make duplicate requests for the same node without causing any confusion. Depending on the data-store used, this node may be brought in through one or more XML files/Database or LDAP queries. In one embodiment, once the node is populated inside DOM tree 1570 in server cache 1560, system policies and/or user profiles are checked for a given user to confirm that user has privilege to access the specified data before the data is passed to the client.

Proxy 1510 calls transaction openNode with a limited number of levels when the number of children existing under a node is needed, e.g., an Administrator may want to know how many users are registered or list all the users, or a user may want to know what IMAP folders are created for/by him/her.

One open node request can map to one or more LDAP and/or RDBMS queries (spanning a number of tables) internally or it may map to one or more XML files and LDAP entries. Once this configuration is done, the portal components do not have to have any embedded SQL queries or LDAP queries in their code. In fact, the applications do not need to know from which database the data is coming. The components access the data using the configuration server transactions Each registered server transaction has a corresponding transaction class and methods that collect or update the data from XML files/LDAP/RDBMS using internal queries. Transaction manager 1540 creates these transactions. Data returned to proxy 1510 has a XML format (input stream containing DOM subNode). Therefore, proxy 1510 uses a XML DOM API to access this data.

In this embodiment, class DOMtree is responsible for managing DOM tree 1570 and manipulating DOM tree 1570 according to transactions received. Transactions use this class's methods to look up data in DOM tree 1570 and to update/addto/delete nodes in DOM tree 1570.

All tables 1561 to 1565 in cache 1560 are managed through corresponding classes that derive from a class LinkedList. There is only one table of each type in server cache 1560 and each table contains information about all the clients/proxies that are currently logged into configuration server 336.

Notification table 1565, sometimes called notify table 1565, contains all the notification requests made by various proxies/clients. Table 1565 is consulted after each of the following transactions addNode, updateNode, and deleteNode have finished processing to check if notifications should be issued. When the client receives the notification, it also receives the snapshot of the node with changes. In this embodiment, each entry in table 1565 includes a session identifier, a node path, and client application information.

Other transactions supported by this embodiment of the invention include transactions closeSession, openRawNode, closeNode, updateNode, addZode, deleteNode, getStatus, cancelTransaction, requestNotify, cancelNotify, and addUser. Each of these transactions on server 336 is described below. The transactions described herein are illustrative only and are not intended to limit the invention to either the particular transactions described or to the embodiments of the transactions described.

A session on configuration server 336 is closed under different circumstances. For example, (a) proxy 1510 wants to disconnect from server 336; (b) proxy 1510 crashes, or the machine on which proxy 1510 is executing crashes/shuts down, or proxy 1510 becomes very sluggish to the point that proxy 1510 can not even send close session request and the connection is lost; (c) proxy 1510 aborts suddenly due to network problems; or (d) configuration server 336 crashes or the server machine crashes; or configuration server 336 must be shutdown under emergency circumstances.

In all except the last case (d) where the problem is with configuration server 336, transaction closeSession performs the following operations. Transaction closeSession looks for current session's entries in the notification table 1565 and removes them. This transaction then removes all transactions except transactions updateNode, addNode and deleteNode from transaction queue table 1562 and transaction list table 1563. Transaction closeSession waits until currently processing and pending transactions updateNode, addNode, and deleteNode are finished, i.e., until those entries do not exist in the tables. Transaction closeSession, after waiting, uses transaction closeNode to close the nodes opened by the current session. Next, this transaction looks for current session's entries in node table 1564 and removes them. Finally, this transaction removes the session entry from session table 1561.

In case (d), server 336 tries to finish the above-mentioned transactions or store them in a local file. Otherwise, server 336 tries to send notifications about the unfinished transactions. In case (a), the client or proxy requests transaction closeSession, while in cases (b) to (d), listener 1530 initiates this transaction.

There are no input parameters in the request to transaction closeSession, if the request is initiated by the proxy wishing to disconnect. An input parameter sessionId contains the session identifier for the session to be closed, if an Administrator console generates the request for administrative purposes. A value "ALL" is sent if Administrator console is shutting down network portal system 100 or configuration server 336 for any reason. User's privileges are checked before processing the transaction. This transaction returns a status identifier and status information.

When a client, typically an administrator console, needs to access DOM tree 1570 as is without the merged tree view, transaction openRawNode is requested. This transaction is very similar to transaction openNode, but opens the node given without attempting any data merging. Note, that this node is READ_ONLY.

In this embodiment, the input parameters in the call to transaction openRawNode are nodePath, and numLevels. The transaction returns parameters nodeId and subNode. Input parameter nodePath is a URI. The value of input parameter numLevels is the same as defined above.

Transaction openRawNode first checks if the given node already exists in DOM Tree 1570. This means that the node must exist in the Administrator branch as well as the current user branch. Under some circumstances, the node may exist in the Administrator branch but not in the current user branch (different user session has already brought in the tree). An entry is added to a Raw Node Table. If this transaction does not find an entry in the node table 1564, the transaction gets the node from back end 337 and adds the node to DOM tree 1570. The transaction returns either the node identifier or an error message.

Proxy 1510 requests transaction closeNode to indicate to server 336 that proxy 1510 has finished using this data and server 336 can purge the data from cache 1560. In this embodiment, the input parameters in the call to transaction closeNode are nodeId. The transaction returns parameters statusId and statusinfo. Input parameter nodeId is the node identifier of the node to be closed.

This transaction first checks in node table 1564 to determine if the node identifier is valid, and if it is valid continues processing. Next, the transaction checks in transaction queue table 1562 and transaction list table 1563 to determine whether transactions addNode, updateNode, or deleteNode are pending for this node and if so waits until the transactions are finished. Next, this transaction looks in node table 1564 for nodes that have the same user name and if there are none, closes the user tree. The transaction then checks in node table 1564 for entries with the same node path, or entries that contain the node path exist. If this check is false, the transaction removes the entry from node table 1564 and from DOM tree 1570. If more than one session had open the node, the entry for the current session is removed from node table 1564, and a success response is returned.

Transaction getNode is similar to transaction openNode except transaction getNode expects the requested node is already present in DOM tree 1570 in server cache 1560. Typically, transaction getNode is used to refresh a node or subNode of the original node requested using transaction openNode, e.g., proxy 1510 had to discard part of its cache that contained the node received through earlier request to transaction openNode.

In this embodiment, the input parameters to transaction getNode are nodePath, numLevels, and username. Input parameter nodePath is a URI, input parameter numLevels is the same as described above for transaction openNode, and input parameter username is an optional parameter that, in one embodiment, is specified only by the Administrator to access other users' nodes. Parameter nodeId is returned by transaction getNode for use in future transaction references. In particular, requests to transactions updateNode, addNode, deleteNode must specify this node identifier make sure that the node is opened and available in cache 1560. Also returned by this transaction is node subNode, which is the actual merged subNode received from DOM tree 1570 in cache 1560.

Transaction updateNode is used to a accomplish number of different types of changes. This transaction is used to:
  (a) Override default values from the Administrator tree. This effectively adds or updates (if the node already exists in User's branch) the user node with the new overridden value.
  (b) Reset the overridden value back to the default value. Effectively, the subNode from the User's subtree is deleted.
  (c) Update the default value in the Administrator's subtree, if the administrator is requesting to change the default values.
  (d) Add a new value to the list of values in the user's subtree.

(e) Update values of already existing nodes.

In this embodiment, the input parameters in the request to transaction updateNode are nodeId, nodePath, dom_node and username. Parameter nodeId specifies a subNode in DOM tree 1570 that was opened using transaction openNode. Parameter nodeId refers to the subtree of which a smaller subtree is being modified. Parameter nodePath is the parent node under which the changes reside. Typically, parameter nodePath represents the smallest node that contains the changes. This does not necessarily have to be same node path as parameter nodePath given in transaction openNode. In fact, in most case this is a subNode of that node Path. Parameter dom_node is a stream representing a merged DOM tree subNode. Parameter username is an optional parameter and is specified only by the user Administrator to update other users' nodes.

Transaction updateNode returns parameters status and subNode. Parameter status indicates success or failure. If the status is failure, parameter subNode is the current value of the given subNode on server 336, and otherwise the value of parameter status is zero.

In one embodiment, in the execution of transaction updateNode, the following operations are performed:
1. If Username parameter is given (Administrator is asking for data belonging to different user), the user is authenticated as being an Administrator, and if authentication fails, sends error response.
2. Checks in node table 1564 if parameter nodeId is valid, and if not sends an error response.
3. Updates node on DOM Tree 1570 and if successful, sets parameter status to zero and if not sets parameter status to the current value of the node for parameter nodePath in DOM tree 1570.
4. Checks in the notification table 1565 to determine which sessions need to be notified about the changes, and sends those notifications. While doing this, checks to determine if the node path updated is the target node or subNode of the node paths in notify table 1565, and if true, sends notification to those sessions.
5. Returns output parameters.

Using transaction addNode, a node (containing levels of subnodes) can be added to DOM tree 1570. Typically, transaction addNode is used to add user application preferences, which specify overriding the application's default values. In one embodiment, transaction addNode can be used only for leaf nodes.

In this embodiment, the input parameters in the request to transaction addNode are nodeId, nodePath, dom_node and username. Parameter nodeId is the node identifier assigned during transaction openNode, and inside which the new node is to be added. Parameter nodePath is the parent node path under which the given node is to be added. Parameter dom_node is the DOM tree subNode that is to be added. Parameter username is an optional parameter and that in one embodiment is allowed to be specified only by the user Administrator to modify other users' nodes. Transaction addNode returns parameters status that indicates success or failure.

Transaction deleteNode deletes a given node and its subnodes from configuration backend 337. Execution of this transaction follows the same pattern as described previously for transaction closeNode except the specified node is physically deleted. Also this transaction makes sure that deleting the given node does not make the data incompatible with its DTD.

In this embodiment, the input parameters in the request to transaction deleteNode are nodeId, nodePath, and username. Parameter nodeId is the node identifier assigned during transaction openNode, and inside which the node is to be deleted. Parameter nodePath is the node path of the node to be deselected. Parameter username is an optional parameter, as described above. Transaction deleteNode returns parameter status that indicates success or failure.

Using transaction getStatus, proxy 1510 can ask about the status of its transactions; or an administrative console can request status of all the transactions on configuration server 336. In this embodiment, the input parameter in the request to transaction getStatus is either serverId or ALL. Parameter serverId is the identifier returned in an acknowledgment of the request for the transaction for which the status is now being requested. In this embodiment, either the server identifier is the transaction identifier, or there is a correlation between the server identifier and the transaction identifier. If parameter ALL is input, transaction getStatus gets the status of all the transactions for a given session.

If a client or proxy would like to cancel a transaction or all transactions on a particular node or all the pending transactions, transaction cancelTransaction is issued. In this embodiment, the input parameter in the request to transaction cancelTransaction is either serverId or ALL. If serverId is input, the transaction associated with the serverId is canceled. If parameter ALL is input, transaction cancelTransaction cancels all the transactions for a given session. This transaction returns a status of success or failure.

If component 1501 wishes to be notified about any changes in a subtree of DOM tree 1570, component 1501 can register via proxy 1510 for such notifications by requesting transaction requestNotify. Whenever changes happen on server 336, server 336 analyzes notify table 1563 to check which proxy or proxies should be notified. In this embodiment, the input parameters for transaction requestNotify are VectorNodes and Clientcomponent. Parameter VectorNodes is a list of node paths for which the proxy, or client components want to receive change notifications. The node paths must be part of already opened DOM tree 1570. Parameter Clientcomponent is needed only if proxy 1510 wants to be told later by server 336 which component had made the notification request and therefore should be notified. This transaction returns a status of success or failure.

In one embodiment, the execution of transaction requestNotify results in the following operations:
1. For each node path given in the input list, a check is made to determine if the same session has requested notification for the same node earlier, i.e., checks if for same the session identifier and node path, an entry already exists in notify table 1565, and if so, returns with success status.
2. If an entry doesn't exist in table 1565, an entry is added to notify table 1565.
3. Sends a success response.

A proxy that has registered for the notifications can also cancel the notifications using transaction cancelNotify. In this embodiment, the input parameters for transaction cancelNotify is parameter VectorNodes, which was defined above.

In one embodiment, in the execution of transaction cancelNotify, the following operations are performed:
1. If the nodePath is ALL, all notification entries belonging to the current session are removed from notification table 1565. Otherwise, for each nodePath in the input vector, the transaction checks to see if there is an entry in notification table 1565 for the given nodePath and sessionId, and if so, that entry is removed from table 1565.

2. Sends a success response.

As the name indicates, transaction addUser is used to add new users to configuration server 336. This transaction creates user entries in top-level xml files and user files under appropriate directories.

In this embodiment, the input parameters in the request to transaction are nodeId, userId, and dom_node. Parameter nodeId Identifies a subNode in a DOM tree that was opened using transaction openNode earlier and inside which the new node should be added. Parameter userID is a unique user identifier by which the user account is identified within configuration server 336. Parameter dom_node is the DOM subNode that must be added by this operation. Thus, transaction returns a status of success or failure.

While processing the above transactions, any errors are logged, in addition to returning the errors to appropriate proxy, the client session in an error log in server's local disk. In one embodiment, this Error log contains following information:

Transaction Name;
transID;
Username;
errorID // default is 0; and
error message.

In the above description, envelopes were described. FIGS. 19A to 19E are illustrations of one embodiment of XML-based envelopes that can be used herein. Each envelope includes a header and a body, if the body is needed. Each header includes a transaction type, a transaction name, a client identifier that is assigned by proxy 1510, and a server identifier that is assigned by server 336. In one embodiment, the server identifier is the transaction identifier described above. For envelopes sent from a proxy to the server, the body includes input parameter data types and values. For envelopes sent from the server to the proxy, the body includes output parameter data types and values.

FIG. 19A illustrates one embodiment of an envelope that proxy 1510 uses to send a transaction request to server 336. FIG. 19B illustrates one embodiment of an envelope that server 336 uses to send an acknowledgement of a transaction request from proxy 1510. FIG. 19C illustrates one embodiment of an envelope that server 336 uses to send a response to a transaction request from proxy 1510. FIG. 19D illustrates one embodiment of an envelope that server 336 uses to send an error notification in response to a transaction request from proxy 1510. FIG. 19E illustrates one embodiment of an envelope that server 336 uses to send notification of a transaction to a different proxy.

One Embodiment of Client API 1511 of Proxy 1510

As described above configuration data is organized in a hierarchical tree structure in proxy 1510. Entries in the tree structure are addressed by name. The structure of the tree is determined by a strongly typed schema. The schema is installed into configuration database 337.

Tree nodes are either value nodes, which contain a single value or a list of values from a limited set of basic types; collection nodes, which contain a collection of child node of various types; or container nodes, which contain a variable number of entries, all of the same type. These entries may all be values or all composite. In the first case all values have the same basic type, in the latter case all the subtrees have the same structure. The names of container entries are specified when they are created.

Therefore, client API 1511 supports:
navigating a tree structure;
reading and updating values in the tree structure; and
accessing attributes of tree nodes, as far as they are needed for client operation.

In this embodiment, client API 1511 also supports:
fast access—both read and write—, even in an environment where server 336 is remote and the same configuration is shared by multiple clients;
notifications about configuration changes (both local and server-initiated);
explicit synchronization of selected parts of the configuration to enable offline client operation; and
use of specialized settings on a per-document basis that are stored within the documents.

In addition, in one embodiment, client API 1511 supports:
a caching implementation;
transaction-like batching of updates;
compound notifications for batch updates; and
notification for updates of an entire subtree of the configuration.

In one embodiment, frequently changing configuration values are marked 'non-bound'. These values are excluded from remote notification. This applies, for example, to settings that components generate implicitly to remember their current state (such as window positions).

Changes originating via client API 1511 only affect a single user. Proxy 1510 needs to immediately advise server 336 of such changes only if there are multiple client processes acting on behalf of that user. Changes to shared configuration values or the schema must be applied to the DOM tree 1570 using an interface that implements the transactions described above.

The following description of interfaces and services is one example of a client API that performs the functions described. This description is illustrative only and is not intended to limit the invention to the specific embodiments described.

The configuration tree stored by proxy 1510 is a recursive hierarchical tree structure, where entries are identified by names relative to their parent (and by a composite name globally). Stepwise navigation through the hierarchy is allowed by interface XNameAccess. The reverse navigation is possible using interface XChild and the (local) name can be recovered via interface XNamed.

Interface XNameAccess is used to access the named objects within a container. Interface XNameAccess inherits from interfaces XElementAccess and includes methods getByName, getElementNames, and hasByName.

Method getByName returns the object with the name specified by parameter aName. Method getByName throws exception NoSuchElementException if an element with the specified name does not exist. This method throws an exception WrappedTargetException, if the implementation has internal reasons for exceptions.

Method getElementNames returns a sequence of all element names in this container. The order of the names is not specified. Method hasByName returns true if the container contains the input name and otherwise false.

TABLE 4

Interface XNameAccess

Interface XNameAccess:
    com::sun::star::container::XElementAccess
{
  [const] any getByName( [in] string aName )
    raises(
      com::sun::star::container::NoSuchElementException,
      com::sun::star::lang::WrappedTargetException );

TABLE 4-continued

Interface XNameAccess

```
    [const] sequence<string> getElementNames( );
    [const] boolean hasByName( [in] string aName );
};
```

Interface XElementAccess and the other interfaces and classed used by Interface XElementAccess as well as exceptions NoSuchElementException and WrappedTargetException are presented and described in cofiled and commonly assigned U.S. patent application Ser. No. 09/759,786, entitled "METHOD AND SYSTEM FOR REMOTE CONTROL AND INTERACTION WITH A RUN TIME ENVIRONMENT COMPONENT," of Ralf Hofmann and Torsten Schulz, and that description in its entirety is incorporated herein by reference, and in particular Tables 2, 3, 12 and 36 to 52 and the description thereof.

Interface XChild provides access to the parent of the object. This interface normally is only supported if the objects all have exactly one dedicated parent container. Interface XChild inherits from interface XInterface. Method getParent grants access to the object containing this content, e.g., returns the parent to this object. Method setParent sets the parent to this object, and throws exception NoSupportException if the object does not allow change to the parent. Exception NoSupportException inherits from exception Exception.

TABLE 5

Interface XChild

```
interface XChild: com::sun::star::uno::XInterface
{
[const] com::sun::star::uno::XInterface getParent( );
void setParent( [in] com::sun::star::uno::XInterface
    Parent )
        raises( com::sun::star::lang::NoSupportException
        );
}
```

Interface XNamed specifies the name of the object. The name is generally unique in the container of the object. Interface XNamed inherits from interface XInterface. Method getName returns the programmatic name of the object. Method setName sets the programmatic name of the object to the value of input parameter aName.

TABLE 6

Interface XNamed

```
interface XNamed: com::sun::star::uno::XInterface
{
[const] string getName( );
[oneway] void setName( [in] string aName );
};
```

Interface XHierarchicalNameAccess allows direct access to a child node that is deeper in the hierarchy. An object of a specific level in the hierarchy is addressed by giving its fully qualified name, e.g. "stardiv.uno.XInterface". Interface XHierarchicalNameAccess inherits from interface XInterface. Method getByHierarchicalName returns the object with the specified name and throws exception NoSuchElementException if an object with the specified name does not exist. Method hasByHierarchicalName returns TRUE, if an object with the specified name is in the container, and false otherwise.

TABLE 7

Interface XHierarchicalNameAccess

```
interface XHierarchicalNameAccess:
            com::sun::star::uno::XInterface
{
[const] any getByHierarchicalName( [in] string aName )
    raises(
        com::sun::star::container::NoSuchElementException
    );
[const] boolean hasByHierarchicalName( [in] string
    aName );
};
```

The fully specified name of an object is available through interface XHierarchicalName, which offers a single method getHierarchicalName( ) that returns the fully qualified hierarchical name of the object. Interface XHierarchicalName inherits from interface XInterface.

To support scripting access, names are currently required to be unique regardless of case. On the other hand some interfaces may be case-sensitive. This difference is resolved through implementing interface XExactName. Interface XExactName provides a method getExactName for converting an approximate name to an existing name. Interface XExactName inherits from interface XInterface.

Objects providing write access extend interface XNameAccess and interface XNameReplace, and add support for interface XContainer. Container nodes offering write access implement interface XNameContainer.

Interface XNameReplace is a generic interface for supporting the replacement of names. Interface XNameReplace inherits from interface XNameAcess. Method replaceByName replaces the element with the specified name. Parameter aName specifies the name of the element. Parameter aElement specifies the object to be inserted in the container. This method throws exception IllegalArgumentException if the element object does not support the interfaces, services or other conditions, which are specified by the service of this container implementation. This method throws exception NoSuchElementException if an element under this name does not exist.

TABLE 8

Interface XNameReplace

```
interface XNameReplace:
            com::sun::star::container::XNameAccess
{
void replaceByName( [in] string aName, [in] any
    aElement ) raises(
        com::sun::star::lang::IllegalArgumentException,
        com::sun::star::container::NoSuchElementException,
        com::sun::star::lang::WrappedTargetException );
};
```

Interface XNameContainer is a generic interface for supporting the insertion and removal of named elements. Interface XNameContainer inherits from interface XNameReplace. Method insertByName inserts the element at the specified name. Parameter aName specifies the name of the element. Parameter aElement specifies the object to be inserted in the container. This method throws exception IllegalArgumentException if the element object does not support the interfaces, services or other conditions, which are specified by the service of this container implementation. This method throws exception ElementExistException if an element under the name exists. Exception stardiv::uno::lang::WrappedTargetException is thrown if the implementation has internal reasons for exceptions.

TABLE 9

INTERFACE XNameContainer

```
interface XNameContainer:
        com::sun::star::container::XNameReplace
{
void insertByName( [in] string aName, [in] any aElement
        ) raises(
            com::sun::star::lang::IllegalArgumentException,
            com::sun::star::container::ElementExistException,
            com::sun::star::lang::WrappedTargetException );
}
```

Nodes with Attributes and State

Some attributes from the configuration schema need to be available to client components. These include access control (read-only), whether an entry is optional (may-be-null), and whether an entry is eligible for (remote) notification (bound). These are straightforwardly mapped to values (READONLY, MAYBEVOID, BOUND) from PropertyAttribute bit mask constants. Other attributes present there could be applicable as well (MAYBEDEFAULT will usually be set).

TABLE 10

Constants PropertyAttribute

```
constants PropertyAttribute
{
const short MAYBEVOID = 1;
const short BOUND = 2;
const short CONSTRAINED = 4;
const short TRANSIENT = 8;
const short READONLY = 16;
const short MAYBEAMBIGUOUS = 32;
const short MAYBEDEFAULT = 64;
const short REMOVEABLE = 128;
};
```

Similarly the DIRECT_VALUE vs. DEFAULT_VALUE distinction from enumeration PropertyState applies to configuration nodes. Enumeration PropertyState lists the states that a property value can have. The state consists of two aspects: whether a value is available or void, and whether the value is stored in the property set itself, or is a default or ambiguous. State DIRECT_VALUE indicates the value of the property is stored in the PropertySet itself. The property value must be available and of the specified type. State DEFAULT_VALUE indicates that the value of the property is available from a master.

TABLE 11

Enumeration PropertyState

```
enum PropertyState
{
    DIRECT_VALUE,
    DEFAULT_VALUE,
    AMBIGUOUS_VALUE
}
```

Leveraging this mapping, a collection node provides richer access to its members by implementing interfaces XPropertySet and XPropertyState. Schema information for a collection node is then available through interface XPropertySetInfo.

Interface XPropertySet provides information about and access to the properties from an implementation. There are three types of properties: bound properties; constrained properties; and free properties. Changes of bound properties are obtained by interface XPropertyChangeListener. Changes of constrained properties are vetoed with interface XPropertyVetoListener. Method getPropertySetInfo returns the interface XPropertySetInfo, which describes all properties of the object, which supplies this interface. Method setPropertyValue sets the value of the property with the specified name. If it is a bound property the value will be changed before the change events is fired. If it is a constrained property a vetoable event is fired before the property value can be changed. Method getPropertyValue returns the value of the property with the specified name. Method addPropertyChangeListener adds an interface XPropertyChangeListener to the specified property. An empty name (" ") registers the listener to all bound properties. If the property is not bound, the behavior is not specified. Method removePropertyChangeListener removes an interface XPropertyChangeListener from the listener list. This method is a "noop" if the listener is not registered. Method addVetoableChangeListener adds an interface XVetoableChangeListener to the specified property with the name PropertyName. An empty name (" ") registers the listener to all constrained properties. If the property is not constrained, the behavior is not specified. Method removeVetoableChangeListener removes an interface XVetoableChangeListener from the listener list. This method is a "noop" if the listener is not registered.

TABLE 12

INTERFACE XPropertySet

```
interface XPropertySet: com::sun::star::uno::XInterface
[const] com::sun::star::beans::XPropertySetInfo
    getPropertySetInfo ( );
void setPropertyValue( [in] string aPropertyName, [in]
    any aValue )
raises(
    com::sun::star::beans::UnknownPropertyException,
    com::sun::star::beans::PropertyVetoException,
    com::sun::star::lang::IllegalArgumentException,
    com::sun::star::lang::WrappedTargetException );
[const] any getPropertyValue( [in] string PropertyName
    )
    raises(
        com::sun::star::beans::UnknownPropertyException,
        com::sun::star::lang::WrappedTargetException );
void addPropertyChangeListener( [in] string
    aPropertyName, [in]
    com::sun::star::beans::XPropertyChangeListener
    xListener )
    raises(
        com::sun::star::beans::UnknownPropertyException,
        com::sun::star::lang::WrappedTargetException );
void removePropertyChangeListener( [in] string
    aPropertyName, [in]
    com::sun::star::beans::XPropertyChangeListener
    aListener )
    raises(
        com::sun::star::beans::UnknownPropertyException,
        com::sun::star::lang::WrappedTargetException );
```

TABLE 12-continued

INTERFACE XPropertySet

```
    void addVetoableChangeListener( [in] string
        PropertyName, [in]
        com::sun::star::beans::XVetoableChangeListener
        aListener )
        raises(
        com::sun::star::beans::UnknownPropertyException,
        com::sun::star::lang::WrappedTargetException );
    void removeVetoableChangeListener( [in] string
        PropertyName, [in]
        com::sun::star::beans::XVetoableChangeListener
        aListener )
        raises(
        com::sun::star::beans::UnknownPropertyException,
        com::sun::star::lang::WrappedTargetException );
```

Interface XPropertyState makes it possible to query information about the state of one or more properties. The state contains the information if a value is available or void and if the value is stored in the object itself, or if a default value is to be used and if the value cannot be determined, due to ambiguity. Interface XPropertyState inherits from interface XInterface. Method getPropertyState returns the state of the property. Method getPropertyStates returns a sequence of the states of the properties, which are specified by their names. The order of the states is correlated to the order of the given property names. Method setPropertyToDefault sets the property to default value. The value depends on the implementation of this interface. For a bound property, the value must be changed before the change events are fired. For a constrained property, the vetoable event must be fired before the property value is changed. Method getPropertyDefault returns the default value of the property with name PropertyName. If no default exists, is not known, or is void, the return type is void.

TABLE 13

Interface XPropertyState

```
    interface XPropertyState:
        com::sun::star::uno::XInterface
    {
    com::sun::star::beans::PropertyState getPropertyState(
        [in] string PropertyName )
        raises(
        com::sun::star::beans::UnknownPropertyException );
    sequence<com::sun::star::beans::PropertyState>
        getPropertyStates ( [in] sequence<string>
        aPropertyName )
        raises(
        com::sun::star::beans::UnknownPropertyException );
    void setPropertyToDefault( [in] string PropertyName )
        raises(
        com::sun::star::beans::UnknownPropertyException );
    [const] any getPropertyDefault( [in] string
        aPropertyName )
        raises(
        com::sun::star::beans::UnknownPropertyException,
        com::sun::star::lang::WrappedTargetException );
```

Interface XPropertySetInfo specifies a set of properties. The specification only describes the properties, it does not contain any values. Interface XPropertySetInfo inherits from interface XInterface. Method getProperties returns a sequence with all property descriptors, which are specified within this interface XPropertySetInfo. Method getPropertyByName returns the property with the specified name from the object. Method hasPropertyByName returns TRUE if a property with the specified name exists and otherwise FALSE is returned.

TABLE 14

Interface XPropertySetInfo

```
    interface XPropertySetInfo:
        com::sun::star::uno::XInterface
    {
      [const] sequence<com::sun::star::beans::Property>
        getProperties ( );
      [const] com::sun::star::beans::Property
        getPropertyByName( [in] string aName )
        raises(
        com::sun::star::beans::UnknownPropertyException );
      [const] boolean hasPropertyByName ( [in] string Name );
    }
```

The relation of the property set interfaces just described to the hierarchical container described above is characterized by the equality:

node.getPropertyValue(name)=node.getByName(name)

Other interfaces may also be supported in API 1511. Interface XMultiPropertySet is usually available. Interfaces XPropertyAccess or XFastPropertySet are possible extensions. Interface XFastPropertySet, if present, provides handles that are unique within the whole registry (or at least the whole subset in use). Typically, the property sets must not be dynamic, so these interfaces are not available on container nodes. On objects providing only read-only access the property set information will still reflect the access rights granted by the schema, but methods setPropertyValue( ), setPropertyToDefault( ), etc. throw an appropriate exception.

Interface XMultiPropertySet provides access to multiple properties. Interface XMultiPropertySet inherits from interface XInterface. Method getPropertySetInfo returns the interface XPropertySetInfo, which describes all properties of the object to which this interface belongs. NULL is returned if the object cannot or will not provide information about the properties. Method setPropertyValues sets the values to the properties with the specified names. The values of the properties must change before the bound events are fired. The values of the constrained properties should change after the vetoable events are fired and after if no exception occurs. Unknown properties are ignored. Method getPropertyValues returns a sequence of all values of the properties, which are specified by their names. The order of the values in the returned sequence will be the same as the order of the names in the argument. Method addPropertiesChangeListener adds an interface XPropertiesChangeListener to the specified property with the specified names. The implementation can ignore the names of the properties and fire the event on all properties. Method removePropertiesChangeListener removes an interface XPropertiesChangeListener from the listener list. This method is a noop if the listener is not registered. Method firePropertiesChangeEvent fires a sequence of Property Change Events to the specified listener.

TABLE 15

Interface XMultiPropertySet

```
interface XMultiPropertySet:
    com::sun::uno::XInterface
{
[const] com::sun::star::beans::XPropertySetInfo
    getPropertySetInfo ( );
void setPropertyValues( [in] sequence<string>
    PropertyNames, [in] sequence<any> Values )
    raises(
    com::sun::star::beans::PropertyVetoException,
    com::sun::star::lang::IllegalArgumentException,
    com::sun::star::lang::WrappedTargetException );
[const] sequence<any> getPropertyValues( [in]
    sequence<string> aPropertyNames );
[oneway] void addPropertiesChangeListener( [in]
    sequence<string> aPropertyNames, [in]
    com::sun::star::beans::XPropertiesChangeListener
    xListener );
[oneway] void removePropertiesChangeListener( [in]
    com::sun::star::beans::XPropertiesChangeListener
    Listener );
[oneway] void firePropertiesChangeEvent( [in]
    sequence<string> aPropertyNames, [in]
    com::sun::star::beans::XPropertiesChangeListener
    xListener );
}
```

Interface XPropertyAccess makes it possible to access all multiple property values and to set them at once. In most cases this interface is in addition to interface XPropertySet. Interface XPropertyAccess is especially useful for remote communication because this interface lessens the number of calls for getting property values. This is especially important because these calls are necessarily synchronous. Another advantage of this interface is that conflicts are avoided if property value restrictions depend on the value of other properties Interface XPropertyAccess inherits from interface XInterface. Method getPropertyvalues returns a sequence of all property values within the object in a single call. Method setPropertyValues sets the values of given properties. All properties, which are not contained in the sequence, are left unchanged.

TABLE 16

Interface XPropertyAccess

```
interface XPropertyAccess:
    com::sun::star::uno::XInterface
{
[const] sequence<com::sun::star::beans::PropertyValue>
    getPropertyValues ( );
void setPropertyValues( [in]
    sequence<com::sun::star::beans::PropertyValue>
    aProps )
    raises(
    com::sun::star::beans::UnknownPropertyException,
    com::sun::star::beans::PropertyVetoException,
    com::sun::star::lang::IllegalArgumentException,
    com::sun::star::lang::WrappedTargetException );
}
```

As indicated above, interface XFastPropertySet provides a fast way of accessing and changing property values. This interface is an extension to interface XPropertySet. Methods getFastPropertyValue and setFastPropertyValue use handles to access the property values instead of character strings.

TABLE 17

Interface XFastPropertySet

```
interface XFastPropertySet:
    com::sun::star::uno::XInterface
{
void setFastPropertyValue( [in] long nHandle, [in] any
    aValue )
    raises(
    com::sun::star::beans::UnknownPropertyException,
    com::sun::star::beans::PropertyVetoException,
    com::sun::star::lang::IllegalArgumentException,
    com::sun::star::lang::WrappedTargetException );
[const] any getFastPropertyvalue( [in] long nHandle )
    raises(
    com::sun::star::beans::UnknownPropertyException,
    com::sun::star::lang::WrappedTargetException )
}
```

Batch Changes and Notifications Support by API 1511

Component 1501 can obtain objects that provide write access to configuration tree. These objects collect the changes made and transfer the changes to proxy 1511 all at one time. An object that collects changes, which are eventually committed offers interface XChangesBatch. Interface XChangesBatch inherits from interface XInterface. Method commitChanges commits locally accumulated changes to become persistent and makes the changes available to other clients that access the configuration tree. Interface XChangesBatch also offers methods to query the accumulated changes, e.g., methods hasPendingChanges and getPendingChanges.

Method getChanges( ) in interface XChangesSet provides access to a set or sequence of change descriptions and a context. Change descriptions are just structures having accessor (path to changed item), new Value and old Value. The context specifies the common root of all changes. A set of change descriptions obtained by interface XChangesSet obtained from an object supporting interface XChangesBatch, have the source object as root. Other services may have different specifications.

Any accessor object also offers compound notifications through interface XChangesNotifier. A batch of changes originating from either a local method XChangesBatch::commitChanges( ) or a remote synchronization broadcast a Changes Event to interface XChangesListeners. A changes event again contains a set of interface XChangesSet change descriptions. An interface XChangesListener registered for a composite registry node, is notified of any change in the subtree.

For completeness, the property set and container event interfaces are also supported (e.g. for clients interested in only a single registry entry).

Additional Interfaces of API 1511

The initial access point for configuration server is a service ConfigurationProvider. Service ConfigurationProvider implements interfaces to control the connection to configuration server 336 and to allow explicitly synchronizing a local registry copy for offline operation. Service ConfigurationProvider also offers an interface XConfigurationProvider, which has factory methods createConfigurationAccess( ) and createConfigurationUpdate( ) to obtain a Name Hierarchy object for a configuration subtree with or without write access. Service ConfigurationProvider also may offer an interface to provide hints to a caching implementation, which configuration entries will soon be needed and therefore should be preloaded. Finally, service ConfigurationProvider includes interfaces for importing and exporting a registry subtree as XML.

Object Model for API 1511

As mentioned above, access to configuration server 336 is started through one-instance service ConfigurationProvider. This object holds the master copy of the registry for component 1501. This object coordinates overlapping requests and maintain a pooled notification link to server 336. Through interface XConfigurationProvider interface, client components can obtain accessor objects for either read-only or writing access. The object model can be illustrated using the MVC pattern: service ConfigurationProvider serves as the global model; A service ConfigurationAccess provides a view onto a specific part this model. A service ConfigurationUpdate obtained from service ConfigurationProvider, provides a derived model (for a specific part of the registry) for use by a controller. If additional clients need to observe this local model before it is integrated into the master registry, they can attach to the service ConfigurationUpdate or its descendents.

Read-only vs. Write Access

An instance of the read-only service ConfigurationAccess provides a direct view on a subtree of the 'master' registry. Service ConfigurationAccess implements services NameHierarchy for navigating the subtree and reading values. Where appropriate the Property Set interfaces are available to query more schema-related information. The event interfaces mentioned above, are available on service ConfigurationAccess. The event interfaces can be used to receive notifications about changes either local or from a remote server.

Navigation to a descendant element obtains an instance of service ConfigurationAccess for the subtree that also directly reads the master registry. To make changes to the registry, an instance of service ConfigurationUpdate must be obtained. This service offers the same interfaces as service ConfigurationAccess, augmented by additional interfaces for write access.

This object behaves like a local copy, detached from the 'master' registry in proxy 1511. This object collects changes made through this object and descendant objects obtained from it. This object implements interface XChangesBatch, which must be used to integrate the accumulated Changes Set into the master registry tree in proxy 1511.

Navigation to descendant objects therefore provides update access, but updates initially affect only the ChangesSet of the original ConfigurationUpdate object.

Event handlers registered on such an object are notified of changes immediately. This means that such changes are not persistent if they are not committed in the end.

On an instance of service ConfigurationUpdate, the Property Set interfaces permit changes to value or state of a property. Also, interface XNameReplace may be used to substitute a whole subtree. For (extensible) container nodes interface XNameContainer permits addition or removal of entries. As only complete subtrees having the appropriate structure for an entry may be added or substituted, a container node also supports a factory interface that allows creation of such a subtree, initialized to suitable defaults. In one embodiment, this factory interface is an interface XSingleServiceFactory.

Forced use of interface XChangesBatch ensures that clients support caching implementations and remote notification mechanisms to operate efficiently.

An explicit preferences user interface keeps service ConfigurationUpdate open until committing or aborting the update on close. Clients that frequently update non-shared settings may just operate on their local copy, commiting changes only rarely (maybe at session close). Clients that only need read-only access can always operate on current data.

Commiting changes through XChangesBatch partially supports transaction semantics. They are atomic and isolated in the sense that other local clients see only either old or new values. Registered observers are notified of the changes during this change. Committing updates through different ConfigurationUpdates serializes these updates. A collection of changes originating from the server behaves similarly.

APIs for Use With One Embodiment of UCB 113

An overview of the framework for implementing one embodiment of information tier 303 in network portal system 100 is presented using interface definition language files. Via these interfaces, the following operations can be achieved: content is provided; content is obtained from content providers; content is defined; properties of content are set, updated, read, deleted; components are notified about changes in content. The interfaces may be implemented in software and/or hardware components. Moreover, computer code implementing the interfaces can be contained in a computer program product. Also, interfaces described elsewhere in this detailed description could also be used as appropriate.

Content Providing.

Network portal system 100 provides services to register and maintain implementations of content provider systems. Content provider systems are classified according to what uniform resource locator (URL) schemes they implement. For Web sites, the scheme is HTTP. For IMAP or FTP sites, the scheme is (respectively) imap or ftp.

Thus, given a URL, the scheme may be obtained. If a content provider system is registered with the corresponding URL scheme then content may be obtained for the URL.

The main network portal service that manages universal content providers 331 is a service UniversalContentBroker, which is a one-instance service, and which is universal content broker 113. In one embodiment, as presented below, service UniversalContentBroker implements four interfaces: 1) an interface XContentProvider; 2) an interface XContentProviderManager; 3) an interface XContentIdentifierFactory; and an interface XComponent, each of which is described more completely below. In the following description, the name of the interface is indicative of the type of the interface, e.g. interface XContentProvider is an interface used to provide content.

TABLE 18

Service UniversalContentBroker

```
service UniversalContentBroker
{
interface com::sun::star::lang::XComponent;
interface com::sun::star::ucb::XContentProvider;
interface com::sun::star::ucb::XContentProviderManager;
interface
   com::sun::star::ucb::XContentIdentifierFactory;
};
```

Interface XComponent must be implemented to make it possible to resolve cyclic object references. Cyclic object references may occur if content provider implementations hold references to universal content broker 113. Universal content broker 113 itself always holds the references to content providers in universal content providers 113. If universal content broker 113 is released, method dispose in interface XComponent must be called at universal content broker 113. The implementation of method dispose calls method disposing in interface XEventListener, on the registered listeners, i.e., the universal content providers 331 registered with universal content broker 113, and releases the appropriate object references. On the other hand, the implementation of method disposing in interface XEventListener must release the appropriate references, as described more completely below.

Interface XcontentProvider provides access to all content, independent of the kind of content, provided by registered content providers in universal content providers 331. Interface XContentProviderManager provides access to a set of content providers registered with universal content broker 113. Interface XContentIdentifierFactory creates content identifiers. Interface XContentIdentifier implements methods for maintaining a URL.

TABLE 19

Interface XCOMPONENT

```
interface XEventListener;
interface XComponent: com::sun::star::uno::XInterface
{
void dispose ( );
void addEventListener( [in] XEventListener xListener );
void removeEventListener( [in] XEventListener aListener
   );
};
```

Interface XComponent inherits from Interface XInterface. An owner of an object calls method dispose in interface XComponent to dispose of the object. Only the owner of the object calls method dispose if the object should be destroyed. All objects and components must release the references to the objects. If the object is a broadcaster, all listeners are removed and method XEventListener::disposing( ) is called on all listeners.

Due to the importance of the concept of method XComponent::dispose( ), a figurative example is provided. Imagine there was a hole in the floor and some people around it were holding a box (our component). Everyone who holds the box for a longer time than just temporarily (i.e. to put something in or get something out) has to watch a light bulb, which is attached to the box (listening to event XEventListener:: disposing( )). Now, when the owner of the box switched the light on (calling method XComponent::dispose( )), everybody holding the box had to take their hands off (clear the interface handles). If and only if everyone did that, did the box fall (getting deleted). However, only the owner is allowed to switch the light on! After method dispose is called, the instance has to throw exception DisposedException for all non-event-method calls and event-method calls have to be ignored.

The following is an example of one embodiment. void dispose( )
{
// make a copy
Listener [ ] aTmpListeners=MyListeners.clone( );
// clear all listeners (against recursion)
MyListeners.clear( );
// call all listeners EventObject aEvt=new EventObject( );
aEvt.xSource=this;
for(i=0; i &lt;aTmpListeners.length; i++)
aTmpListeners[i].disposing(aEvt);
}

Method addEventListener in interface XComponent adds an event listener to the listener list for the object. The broadcaster fires the disposing method of this listener if method XComponent::dispose( ) is called. Conversely, method removeEventListener removes an event listener from the listener list for the object.

Interface XEventListener is a tagging interface that all event listener interfaces must extend. Interface XEventListener inherits from interface XInterface. Method disposing is called when an event broadcaster is about to be disposed. All listeners and all other objects, which reference the broadcaster, should release the references

TABLE 20

INTERFACE XEventListener

```
interface XEventListener:
   com::sun::star::uno::XInterface
{
void disposing( [in] com::sun::star::lang::EventObject
   Source );
};
```

Structure EventObject specifies the base for all event objects and identifies the source of the event, i.e., the object that fired the event.

TABLE 21

Structure EventObject

```
struct EventObject
{
com::sun::star::uno::XInterface Source;
};
```

Interface XInterface is the base interface for other interfaces and provides lifetime control by reference counting. Interface XInterface also provides the possibility of querying for other interfaces of the same logical object. Logical object in this case means the interfaces that actually can be supported by internal, i.e., aggregated, physical objects.

Method queryInterface in interface XInterface queries for a new interface, specified by the Type, to an existing object. Method acquire increases a reference counter by one, while method release decreases the reference counter by one. When the reference counter reaches a value of zero, the object is deleted.

TABLE 22

INTERFACE XInterface

```
interface XInterface
{
any queryInterface( [in] type aType );
[oneway] void acquire( );
[oneway] void release( );
};
```

The real lifetime of an object is controlled by references kept on interfaces of the object. There are two distinct meanings in keeping a reference to an interface: the first meaning is to own the object, and the second meaning is to know the object.

To prevent cyclic references from resulting in failure to destroy an object, references of interfaces to the object are allowed only (i) by the owner, (ii) if the reference is very temporary, or (iii) you are registered as an Event Listener at that object and cleared the reference when method disposing is called.

Service UniversalContentBroker implements interface XContentProvider. Interface XContentProvider inherits from interface XInterface. Through interface XContentProvider, a content provider in universal content providers 331 may generate new content for all URL schemes for which the content provider is registered with universal content broker 113, and a client does not have to query all content providers to determine which content provider should be used. Content is generated for universal content broker 113 via method queryContent, which takes an identifier of type interface XContentIdentifier, which is described more completely below, and returns the content if the given identifier matches the content provided by the implementation of interface XContentProvider. If the given identifier does not match an identifier for content provided by the implementation of this interface, exception IllegalIdentifierException is thrown.

TABLE 23

INTERFACE XCONTENTPROVIDER

```
interface XContentProvider:
        com::sun::star::uno::XInterface
{
com::sun::star::ucb::XContent queryContent(
   [in] com::sun::star::ucb::XContentIdentifier
       Identifier )
       raises (
       com::sun::star::ucb::IllegalIdentifierException
       );
long compareContentIds(
[in] com::sun::star::ucb::XContentIdentifier Id1,
[in] com::sun::star::ucb::XContentIdentifier Id2 );
};
```

Method compareContentIds in interface XContentProvider is used for several reasons. It may be necessary to check the object identity of UCB contents, e.g., if a software system manages the HTTP cache as a list of interfaces XContent (Interface XContent is described below) and one URL is requested from this cache, it is necessary to identify the right reference within this list, if the reference is present there. This can't be done by comparing the string representation of interface XContentIdentifier because the same content can be referenced by different URLs. The provider is the only one, who can perform this identity check in the right semantic way. For example:

id1:=
ucb.createContentIdentifier("http://my.domain")
   id2:=
ucb.createContentIdentifier ("http://167.345.12.1")
   if(id1.getContentIdentifier( )==
id2.getContentIdentifier( ))
   is never be true, and is a meaningless comparison
   if (ucb.compareContentIds(id1, id2)
   could be true, this tests the object identity.

One Embodiment of Exception

IllegalIdentifierException is presented in Table 24. This exception is thrown to indicate an illegal content identifier

```
        id1 :=
ucb.createContentIdentifier("http://my.domain")
        id2 :=
ucb.createContentIdentifier("http://167.345.12.1")
        if(id1.getContentIdentifier( ) ==
id2.getContentIdentifier( ))
            is never be true, and is a meaningless comparison
            if (ucb.compareContentIds(id1, id2)
```

Exception IllegalIdentifierException in interface XContentProvider inherits from exception Exception in Table 25. Exeception Exception is the basic exception and all exceptions are derived from this exception. Message specifies a detailed message of the exception or an empty string if the callee does not describe the exception. Context is an object that describes the reason for the exception. Context may be NULL if the callee does not describe the exception

TABLE 25

Exception Exception

```
exception Exception
{
    string Message;
    com::sun::star::uno::XInterface Context;
};
```

Content provider objects implementing interface XContentProvider may register and de-register with universal content broker 113 with corresponding URL schemes using interface XContentProviderManager.

Method Input parameter Provider is the content provider to register. Input parameter Scheme is the URL scheme for the content provider. If input parameter ReplaceExisting is true, a provider possibly registered for the given scheme is replaced. The replaced provider is not deregistered automatically. If the superseding provider gets deregistered, the superseded one becomes active again. If input parameter ReplaceExisting is false, the input content provider is not registered, if another provider is already registered for the given URL scheme. If a content provider object attempts to register a URL scheme that already is registered with universal content broker 113, method registerContentProvider throws an exception DuplicateProviderException, which is further defined in Table 28.

TABLE 26

Interface XContentProviderManager

```
interface XContentProviderManager:
        com::sun::star::uno::XInterface
{
sun::star::ucb::XContentProvider
        registerContentProvider( [in]
        com::sun::star::ucb::XContentProvider Provider,
        [in] string Scheme, [in] boolean ReplaceExisting )
        raises(
        com::sun::star::ucb::DuplicateProviderException );
[oneway] void deregisterContentProvider(
[in] com::sun::star::ucb::XContentProvider Provider,
[in] string Scheme );
sequence<com::sun::star::ucb::ContentProviderInfo>
        queryContentProviders( );
```

TABLE 26-continued

| Interface XContentProviderManager |
|---|
| com::sun::star::ucb::XContentProvider<br>    queryContentProvider( [in] string Scheme );<br>}; |

The whole list of registered content providers may be obtained with their corresponding schemes via method queryContentProviders in interface XContentProviderManager. Also, interface XContentProviderManager makes it possible to query which registered content provider supports a particular URL scheme.

As used herein a sequence is a pointer to a structure which has the following members:void * pElements; long nElements; long nRefCount. The pElements are a memory area that contains nElements elements.

Structure ContentProviderInfo in Table 27 contains a reference to the content provider itself and the URL scheme for which the content provider is registered.

TABLE 27

| STRUCTURE ContentProviderInfo |
|---|
| struct ContentProviderInfo<br>{<br>com::sun::star::ucb::XContentProvider ContentProvider;<br>string Scheme;<br>}; |

Exception DuplicateProviderException inherits from exception Exception. Exception DuplicateProviderException is thrown to indicate that a content provider with the same identifier already was registered with a content provider manager.

TABLE 28

| Exception DuplicateProviderException |
|---|
| exception DuplicateProviderException:<br>    com::sun::star::uno::Exception<br>{<br>}; |

Interface XContentIdentifierFactory takes a uniform resource identifier, e.g., a URL, for content and returns a content identifier for that content. Interface XContentIdentifierFactory inherits from interface XInterface.

TABLE 29

| Interface XContentIdentifierFactory |
|---|
| interface XContentIdentifierFactory:<br>    com::sun::star::uno::XInterface<br>{<br>com::sun::star::ucb::XContentIdentifier<br>    createContentIdentifier( [in] string ContentId );<br>}; |

Interface XContentIdentifier also inherits from interface XInterface. Method getContentIdentifier of interface XContentIdentifier returns a content identifier string that is a valid uniform resource identifier. See for example, RFC 2396, which is incorporated herein by reference as an example of the level of skill with respect to uniform resource identifiers. If a content provider implements some existent URI scheme, e.g., a content provider offering access to a file system would implement the 'file' scheme, and a content provider offering access to IMAP servers would implement the 'imap' scheme, the content identifier strings should use that scheme. If on the other hand a content provider offers access to content for which no appropriate URI scheme exists, a vendor-specific URL scheme starting with 'vnd.' must be created. The URL scheme associated with a content provider may be retrieved using method getContentProviderScheme. This string is calculated from the content identifier string and must be lower-case, in one embodiment. The string returned is the URL scheme the content provider is registered for. For example, a provider for FTP contents uses ftp-URL's as content identifiers. The content provider scheme, sometimes called URL scheme, for all contents provided by that provider is "ftp".

TABLE 30

| Interface XContentIdentifier |
|---|
| interface XContentIdentifier:<br>    com::sun::star::uno::XInterface<br>{<br>string getContentIdentifier( );<br>string getContentProviderScheme( );<br>}; |

Interface XContentCreator is a creator for new (persistent) contents, like file system folders). The following is a pseudo code example of creation of a new (persistent) content:

newObject=creator.createNewContent( . . . )

initialize the new object (i.e. newObject.Property1=. . . )

The new content executes the command insert that commits the data and makes the new content persistent. Interface XContentCreator inherits from interface XInterface. Method queryCreatableContentsInfo returns a list with information about the creatable contents. Method createNewContent creates new content of a given type.

TABLE 31

| Interface XContentCreator |
|---|
| interface XContentCreator:<br>    com::sun::star::uno::XInterface<br>{<br>sequence<com::sun::star::ucb::ContentInfo><br>    queryCreatableContentsInfo( );<br>com::sun::star::ucb::XContent createNewContent (<br>[in] com::sun::star::ucb::ContentInfo Info );<br>}; |

Structure ContentInfo is defined in TABLE 32. This is a structure for information about contents. Type is a type identifier string for the content, i.e., a MIME type. Attributes is any flags providing additional information about the implementation of interface XContentCreator.

TABLE 32

| Structure ContentInfo |
|---|
| struct ContentInfo<br>{<br>string Type;<br>long Attributes;<br>}; |

Getting Content From a Provider System.

Content is provided by implementing the interfaces described above. In this example, the runtime environment provides a function getGlobalServiceManager that can be used in instantiate service UniversalContentBroker. Next object identifierFactory implements interface XContentIdentifierFactory, and object provider implements interface XContentProvider. As described above, a content identifier is obtained by giving a URL to the content to method createContentIdentifier of interface XContentIdentifierFactory. A content object is created by passing the content identifier to method queryContent of interface XContentProvider.

TABLE 33

Example of Creating Content using UCB interfaces.

```
globalManager := getGlobalServiceManager ( )
ucb :=
    globalManager.createInstance ("com.sun.star.ucb.Uni
    versalContentBroker")
identifierFactory :=
    ucb.queryInterface ("com.sun.star.ucb.XContentIdent
    ifierFactory")
provider :=
    ucb.queryInterface ("com.sun.star.ucb.XContentProvi
    der")
identifier := identifierFactory.
    createContentIdentifier ("ftp://rimmer/pub")
content := provider.queryContent (identifier)
```

Content Objects.

A content provider provides content objects that implement a set of interfaces that define: the type of content; notification of when content changes state; how content may be created from this content; what children this content has; what commands may be performed on the content; and what properties may be obtained. Note that not all aspects of the above may be defined. It will obviously depend on the type of content created.

Interface XContent specifies a content with a type and an identifier, which is able to manage listeners for special content events. Method getIdentifier returns an identifier for the content, while method getContentType returns a content type string, i.e., a MIME type. In addition, clients of the content may add themselves as listeners on the content using method addContentEventListener and can remove themselves as listeners by using method removeContentEventListener.

TABLE 34

Interface XCONTENT

```
interface XContent: com::sun::star::Uno::XInterface
{
com::sun::star::ucb::XContentIdentifier
    getIdentifier ( );
string getContentType ( );
[oneway] void addContentEventListener( [in]
    com::sun::star::ucb::XContentEventListener
    Listener );
[oneway] void removeContentEventListener( [in]
    com::sun::star::ucb::XContentEventListener
    Listener ) ;
};
```

When action on content is performed, registered clients are notified by the content calling interface XContentEventListener that inherits from interface XEventListener. Notification occurs when content is inserted, removed, deleted, changes, or matches search criteria.

Content is inserted, for example, when a child is inserted into the content. For example, if a directory folder is opened its content may be inserted asynchronously into the folder. A client responsible for the display of this content may then update its view according to the new content.

When content is removed but not deleted, a removed event is broadcast. An example of this may occur if child content is moved to a different parent.

A deleted event is broadcast to all listeners when the content is physically destroyed. The content no longer persists.

An exchanged event is broadcast to all listeners when the content has changed its identity. For example if a directory folder has changed its name.

Method contentEvent is called with structure ContentEvent whenever content wishes to notify the registered listeners for the content of a change or changes.

TABLE 35

Interface XContentEventListener

```
interface XContentEventListener:
    com::sun::star::lang::XEventListener
{
void contentEvent( [in] ContentEvent evt );
};
```

One embodiment of structure ContentEvent that inherits from structure EventObject is presented below. An action member is filled as follows:

ContentAction::INSERTED—The inserted child content.

ContentAction::REMOVED—The removed child content.

ContentAction::DELETED—The deleted content.

ContentAction::EXCHANGED—The exchanged content.

A content identifier member must be filled according to the action field, e.g., the id of the parent into which a child was inserted. This member must be filled as follows:

ContentAction::INSERTED—Id of the parent of the inserted content.

ContentAction::REMOVED—Id of the parent of the removed content.

ContentAction::DELETED—Id of the deleted content.

ContentAction::EXCHANGED—Previous(!) id of the exchanged content.

TABLE 36

Structure ContentEvent

```
struct ContentEvent:
com::sun::star::lang::EventObject
{
long Action;
XContent Content;
XContentIdentifier Id;
};
```

A content object that has children can implement interface XIndexAccess that inherits from interface XElementAccess. These interfaces define a general set of APIs to access collections. Interface XIndexAccess may be used for content to return children that are also content. The type any returned from method getByIndex might be cast according to interface XContent if it is valid to do so. Thereby a directory or folder content may return its children in this way.

Interface XIndexAccess provides access to the elements of a collection through an index. This interface should only be used if the data structure, itself, is indexed. Method getCount returns the number of elements in the content object. Method getByIndex returns the element at the specified index. This method throws exception IndexOutOfBoundsException if the index is not valid; or exception WrappedTargetException if the implementation has internal reasons for exceptions.

TABLE 37

Interface XIndexAccess

```
interface XIndexAccess:
    com::sun::star::container::XElementAccess
{
[const] long getCount ( );
[const] any getByIndex( [in] long Index )
raises(
    com::sun::star::lang::IndexOutOfBoundsException,
    com::sun::star::lang::WrappedTargetException );
};
```

Interface XElementAccess is the base interface of all collection interfaces and inherits from interface XInterface. Method getElementType returns the type of the elements. A void return means that it is a multi-type container and cannot determine the exact types with this interface. Method hasElements returns true if the content object contain elements, and otherwise false. Interface XIdlClass and the other interfaces used by it are included at the end of the detailed description for completeness.

TABLE 38

Interface XElementAccess

```
interface XElementAccess:
    com::sun::star::uno::XInterface
{
[const] TYPE_XIDLCLASS getElementType ( );
[const] boolean hasElements ( );
};
```

Exception IndexOutOfBounds is thrown to indicate that a container has been accessed with an illegal index. The index is either negative or greater than or equal to the count of the elements.

TABLE 39

Exception IndexOutOfBounds

```
exception IndexOutOfBoundsException:
    com::sun::star::uno::Exception
{
};
```

Exception WrappedTargetException is a checked exception that wraps an exception thrown by the original target. Normally this exception is declared for generic methods.

TABLE 40

Exception WrappedTargetException

```
exception WrappedTargetException:
    com::sun::star::uno::Exception
{
    any TargetException;
};
```

In this embodiment, two interfaces are used to execute commands on content objects. Interface XCommandTaskProcessor is used if asynchronous operations are desired, while interface XCommandProcessor is simpler and does not support asynchronous operations.

Interface XCommandTaskProcessor creates tasks for commands to be executed by the implementation of this interface and provides access to information about supported commands. This interface inherits from interface XInterface. Method createCommandTask creates a task for executing a command. Input parameter TheCommand is the command to execute. Input parameter ResultAcceptor is the object used to notify/set partial/whole result set. This may be an empty interface, if the task does not produce results. Parameter Environment is the execution environment. This method returns the command task. Method getCommandsInfo returns an interface providing access to information about the commands supported by the implementation of this interface.

TABLE 41

Interface XCommandTaskProcessor

```
interface XCommandTaskProcessor:
    com::sun::star::uno::XInterface
{
com::sun::star::ucb::XCommandTask createCommandTask(
    [in] com::sun::star::ucb::Command TheCommand, [in]
    com::sun::star::ucb::XResultAcceptor
    ResultAcceptor, [in]
    com::sun::star::ucb::XContentTaskEnvironment
    Environment );
com::sun::star::ucb::XCommandInfo getCommandsInfo ( );
};
```

Interface XCommandTask defines a task for executing commands. Interface XCommandTask inherits from interface XContentTask. Method getCommand returns the command to execute by the task.

TABLE 42

Interface XCommandTask

```
interface XCommandTask:
    com::sun::star::ucb::XContentTask
{
com::sun::star::ucb::Command getCommand ( );
};
```

Interface XContentTask defines a task, which can be processed synchronously or asynchronously in a specific execution environment. This interface inherits from interface XInterface. Method start starts asynchronous execution of a task. In general, the task will is not completed on return of this method. If the task is performed asynchronously, event notification occurs through interface XContentTaskEnvironment. Method execute executes a task synchronously. The task always is completed on return of this method. Method abort ends execution of a task. Method getStatus returns the current status of a task. Method getEnvironment returns the environment of the task. Interface XContentTask is a super interface that is used by both interface XCommandTask and interface XPropertyTask.

TABLE 43

Interface XContentTask

```
interface XContentTask:
    com::sun::star::uno::XInterface
{
[oneway] void start ( );
void execute ( )
    raises( com::sun::star::uno::Exception );
[oneway] void abort ( );
com::sun::star::ucb::ContentTaskStatus getStatus ( );
com::sun::star::ucb::XContentTaskEnvironment
    getEnvironment ( );
};
```

Enumeration ContentTaskStatus contains the possible task states. State CREATED means the task was just created and is waiting to be processed. This is the initial task state. No event is send to a task client to indicate this state (there is no change). State RUNNING means the task processing was just started. State DONE means the task was finished successfully. State ABORTED means the task was finished unsuccessfully, i.e. termination from "outside", or due to an unrecoverable error

TABLE 44

Enumeration ContentTaskStatus

```
enum ContentTaskStatus
{
CREATED,
RUNNING,
DONE
ABORTED
};
```

Interface XContentTaskEnvironment defines the execution environment of a task. This interface inherits from interface XInterface. Method getClient returns the task's client. Method getInteractionHandler returns the task's interaction handler. Method getProgressHandler returns the task's progress handler. Interface XContentTaskEnvironment provides a context for asynchronous tasks (commands and property operations) to handle errors and notify the listeners when tasks have changed status. An implementation of interface XContentTaskEnvironment also includes the ability to set a reference to interface XContentTaskClient, which is used provide task status feedback.

TABLE 45

Interface XContentTaskEnvironment

```
interface XContentTaskEnvironment:
    com::sun::star::uno::XInterface
com::sun::star::ucb::XContentTaskClient getClient ( );
com::sun::star::task::XInteractionHandler
    getInteractionHandler( );
com::sun::star::ucb::XProgressHandler
    getProgressHandler( );
};
```

Interface XContentTaskClient defines a client for content tasks. Interface XContentTaskClient inherits from interface XEventListener. Method contentEventTask is called to notify listeners of a status change of a content task via a structure ContentTaskEvent.

TABLE 46

INTERFACE XContentTaskClient

```
interface XContentTaskClient:
    com::sun::star::lang::XEventListener
{
void contentTaskEvent( [in]
    com::sun::star::ucb::ContentTaskEvent Event );
};
```

Structure ContentTaskEvent inherits from structure EventObject. The structure contains the old status and the new status.

TABLE 47

Structure ContentTaskEvent

```
struct ContentTaskEvent:
    com::sun::star::lang::EventObject
{
com::sun::star::ucb::ContentTaskStatus OldStatus;
com::sun::star::ucb::ContentTaskStatus NewStatus;
};
```

Interface XInteractionHandler handles an interaction request. This interface inherits from interface XInterface.

TABLE 48

Interface XInteractionHandler

```
interface XInteractionHandler:
    com::sun::star::uno::XInterface
{
void handle( [in]
    com::sun::star::task::XInteractionRequest Request
    );
};
```

Interface XInteractionRequest gets information about the request itself.

TABLE 49

Interface XInteractionRequest

```
interface XInteractionRequest:
    com::sun::star::uno::XInterface
{
[const] any getRequest ( );
[const]
    sequence<com::sun::star::task::XInteractionContinu
    ation> getContinuations ( );
};
```

Interface XInteractionContinuation inherits from interface XInterface. Method select selects a way of continuing from an interaction request given a choice of various interfaces XInteractionContinuation

TABLE 50

Interface XInteractionContinuation

```
interface XInteractionContinuation:
    com::sun::star::uno::XInterface
{
void select ( );
};
```

Interface XProgressHandler handles a tasks notification that the task has made some progress. Method push notifies the handler that the task has started some new activity, possibly a sub-activity of another activity already making progress. Therefore, these notifications behave in a stack-like manner. Method update notifies the handler that the task's current activity is making progress Method pop notifies the handler that the task has finished its current activity.

TABLE 51

INTERFACE XProgressHandler

```
interface XProgressHandler:
    com::sun::star::uno::XInterface
{
void push( [in] any Status);
void update( [in] any Status);
void pop( );
};
```

Structure Command contains a command. Name contains the name of the command. Handle contains an implementation-specific handle for the command. Handle may be −1 if the implementation has no handle. Argument contains the argument of the command.

TABLE 52

Structure Command

```
struct Command
{
string Name;
long Handle;
any Argument;
};
```

Interface XResultAcceptor defines an acceptor for results. This interface offers two communication channels for the propagation of the results. The first channel is used to propagate results as soon as the results are available. The second channel is used to supply the complete result set once. Interface XResultAcceptor inherits from interface XEventListener. Method usePartialResultChannel indicates what channel to use for the propagation of results. If the implementation of this interface is interested in getting any partial result as soon as it is produced by the result supplier, this method should return TRUE. In this case, the complete result set will not be supplied by the supplier. If the implementation is only interested in getting the complete result of the operation this method should return FALSE. The supplier will not propagate any partial results in this case. Method partialResults is called to supply a partial result, i.e., a single child just processed while populating a container). Method completeResult is called to supply the complete result, i.e., a sequence containing all children of a container.

TABLE 53

INTERFACE XResultAcceptor

```
interface XResultAcceptor :
    com::sun::star::lang::XEventListener
{
boolean usePartialResultChannel( );
void partialResult( [in] any Result );
void completeResult( [in] any Result );
};
```

Interface XCommandInfo provides access to information about executable commands. Method getCommands returns a sequence of all commands supported by the object. Method getCommandInfoByName returns the command with the specified name from the object. This method throws exception UnsupportedCommandException if the command name is unknown to the object. Method getCommandInfoByHandle returns the command with the specified handle from the object and throws exception UnsupportedCommandException if the command handle is unknown to the object. Method hasCommandByName returns TRUE if a command with the specified name is supported, and otherwise FALSE is returned. Method hasCommandByHandle returns TRUE if a command with the specified handle is supported, and otherwise FALSE is returned.

TABLE 54

Interface XCommandInfo

```
interface XCommandInfo: com::sun::star::uno::XInterface
{
[const] sequence<com::sun::star::ucb::CommandInfo>
    get Commands( );
[const] com::sun::star::ucb::CommandInfo
    getCommandInfoByName( [in] string Name )
raises(
    com::sun::star::ucb::UnsupportedCommandException
    );
[const] com::sun::star::ucb::CommandInfo
    getCommandInfoByHandle( [in] long Handle )
raises(
    com::sun::star::ucb::UnsupportedCommandException
    );
[const] boolean hasCommandByName( [in] string Name );
[const] boolean hasCommandByHandle( [in] long Handle );
};
```

Structure CommandInfo describes a command. Name contains the name of the command. Handle contains an implementation-specific handle for the command. Handle may be −1 if the implementation has no handle. ArgType contains the type of argument of the command.

TABLE 55

STRUCTURE CommandInfo

```
struct CommandInfo
{
string Name;
long Handle;
TYPE_XIDLCLASS ArgType;
};
```

Exception UnsupportedCommand is thrown to indicate that the command is not known by the implementation of an interface.

TABLE 56

Exception UnsupportedCommand

```
exception UnsupportedCommandException:
    com::sun::star::uno::Exception
{
};
```

The above interfaces are associated with interface XCommandTaskProcessor. Interface XCommandProcessor defines a processor for synchronous commands, which are executed in a specific execution environment. Interface XCommandProcessor inherits from interface XInterface. Method createCommandIdentifier creates a unique identifier for a command, which can be used to abort the execution of the command associated with that identifier. Note that it is generally not necessary to obtain a new id for each command, because commands are executed synchronously. So the id for a command is valid again after a command previously associated with this id has finished. Preferably, only one identifier per thread is obtained and that identifier is assigned to every command executed by that thread. Method execute executes a command. Parameter aCommand is the command to execute. Parameter CommandId is a unique id for the command. This identifier was obtained by calling method createCommandIdentifier. A value of zero can be used, if the command never shall be aborted. Parameter Environment is the execution environment. Method execute returns the result according to the specification of the command. Exception CommandAbortedException is thrown to indicate that the execution of the command was aborted. Method abort ends execution of the command associated with the given id. Parameter CommandId was defined above.

TABLE 57

Interface XCommandProcessor

```
interface XCommandprocessor :
    com::sun::star::uno::XInterface
{
long createCommandIdentifier( );
any execute( [in] Command aCommand, [in] long
    CommandId, [in] XCommandEnvironment Environment )
raises ( com::sun::star::uno::Exception,
    CommandAbortedException );
[oneway] void abort( [in] long CommandId );
};
```

Interface XCommandEnvironment defines the environment of a command. Interface XCommandEnvironment inherits from interface XInterface. Method getInteractionHandler returns the command's interaction handler. Method getProgressHandler returns the command's progress handler.

TABLE 58

Interface XCommandEnvironment

```
interface XCommandEnvironment :
    com::sun::star::uno::XInterface
{
com::sun::star::task::XInteractionHandler
    getInteractionHandler( );
```

TABLE 58-continued

Interface XCommandEnvironment

```
com::sun::star::ucb::XProgressHandler
    getProgressHandler( );
};
```

The above interfaces present alternative ways to process commands associated with content. Other actions associated with content concerns properties associated with the content.

The querying of property types is performed through interface XMultiPropertySet that was described above and is incorporated herein by reference. Thus, a content object also must implement this interface.

Interface XPropertyTaskProcessor inherits from interface XInterface. This interface encapsulates behavior similar to interface XCommandTaskProcessor. Interface XPropertyTaskProcessor creates tasks for getting and for setting properties of the implementation of this interface and provides access to information about the supported properties. Method createPropertyTask creates a task for handling properties. Input parameter Type is the type of the task (GET or SET). Input Parameter Properties is the properties to get or set by the task. For a Get-task, only the member Name and/or Handle must be filled. For a Set-task, both Name and/or Handle and Value member must be filled. If a handle is given, the handle is preferred over the property name. Input parameter Environment is the execution environment. Input parameter PropertyListener is a listener for changes of properties processed by the task. Method createPropertyTask returns the property task. Method getPropertyInfo returns interface XPropertySetInfo interface, which describes all properties of the object to which this interfaces belongs. NULL is returned if the object cannot or will not provide information about the properties. Method addPropertiesChangeListener adds an interface XPropertiesChangeListener to the specified properties with the specified names. Method removePropertiesChangeListener removes an interface XPropertiesChangeListener from the listener list for the specified properties with the specified names. An empty sequence means all properties.

TABLE 59

Interface XPropertyTaskProcessor

```
interface XPropertyTaskProcessor:
    com::sun::star::uno::XInterface
{
com::sun::star::ucb::XPropertyTask createPropertyTask(
    [in] com::sun::star::ucb::PropertyTaskType Type,
    [in]
    sequence<com::sun::star::beans::PropertyValue>
    Properties, [in]
    com::sun::star::ucb::XContentTaskEnvironment
    Environment );
com::sun::star::beans::XPropertySetInfo
    getPropertySetInfo( );
[oneway] void addPropertiesChangeListener( [in]
    sequence<string> PropertyNames, [in]
    com::sun::star::beans::XPropertiesChangeListener
    Listener );
[oneway] void removePropertiesChangeListener( [in]
    sequence<string> PropertyNames, [in]
    com::sun::star::beans::XPropertiesChangeListener
    Listener );
};
```

Interface XPropertyTask defines a task for getting or setting properties. Interface XPropertyTask inherits from interface XContentTask that was described above. Method getType returns whether the task is for getting or for setting properties. Method getProperties returns the properties to be processed by the task. The status of the properties can be obtained at anytime by checking member ProcessingState of each PropertyValueInfo.

TABLE 60

INTERFACE XPropertyTask

```
interface XPropertyTask:
   com::sun::star::ucb::XContentTask
{
com::sun::star::ucb::PropertyTaskType getType( );
sequence<com::sun::star::ucb::PropertyValueInfo>
   getProperties( );
};
```

Enumeration PropertyTaskType defines the possible types for a property task.

TABLE 61

Enumeration PropertyTaskType

```
enum PropertyTaskType
{
  GET,
  SET
};
```

Structure PropertyValueInfo contains value and state of a property to be processed. Structure ProperteryValueInfo inherits form structure PropertyValue.

TABLE 62

STRUCTURE PropertyValueInfo

```
struct PropertyValueInfo:
   com::sun::star::beans::PropertyValue
{
com::sun::star::ucb::PropertyValueState ValueState;
};
```

Enumeration PropertyValueState defines the possible states of a property to be processed by the task. State UNPROCESSED means the property value is to be processed by the task. State PROCESSED means the value was set or it was obtained by the task. In the last case the value is stored in member Value of structure PropertyValueInfo. State INVALID_NAME means the given property name/handle is invalid. State INVALID_TYPE means the given property type is invalid.

TABLE 63

Enumeration PropertyValueState

```
enum PropertyValueState
{
  UNPROCESSED,
  PROCESSED,
  INVALID_NAME,
  INVALID_TYPE
};
```

Structure PropertyValue specifies a property value. Name specifies the name of the property. The name is unique with a sequence of property values. Handle contains an implementation-specific handle for the property. The handle may be −1 if the implementation has no handle. Value contains the value of the property or void if no value is available. State determines if the value comes from the object itself or from a default and if the value cannot be determined exactly.

TABLE 64

STRUCTURE PropertyValue

```
struct PropertyValue
{
string Name;
long Handle;
any Value;
com::sun::star::beans::PropertyState State;
};
```

Structure Property describes a property of the content. There are three types of properties: bound properties; constrained properties; and free properties. Name specifies the name of the property. The name is unique within an XPropertySet. Handle contains an implementation-specific handle for the property. The handle may be −1 if the implementation has no handle. Type contains an object that identifies the declared type for the property. If the property has multiple types or the type is not known but not any, void must be returned. Field attributes may contain zero or more constants of the PropertyAttribute constants group. See constants PropertyAttribute above.

TABLE 65

STRUCTURE Property

```
struct Property
{
string Name;
long Handle;
TYPE_XIDLCLASS Type;
short Attributes;
};
```

Exception UnknownPropertyException is thrown to indicate that the property is unknown to the implementation.

TABLE 66

EXCEPTION UnknownPropertyException

```
exception UnknownPropertyException:
   com::sun::star::uno::Exception
{
};
```

Interface XPropertiesChangeListener receives events, which get fired whenever a bound property is changed. Interface XPropertiesChangeListener inherits from interface XEventListener. Method propertiesChange is called when bound properties are changed. Input parameter aEvent contains a sequence of Properties Change Event objects that describe the event source and the properties that have changed.

TABLE 67

INTERFACE XPropertiesChangeListener

```
interface XPropertiesChangeListener:
    com::sun::star::lang::XEventListener
{
void propertiesChange( [in]
    sequence<com::sun::star::beans::PropertyChangeEve
nt> evt );
};
```

Structure PropertyChangeEvent is delivered whenever a "bound" or "constrained" property is changed. A PropertyChangeEvent object is sent as an argument to the methods of interface XPropertyChangeListener. Normally, such events contain the name and the old and new value of the changed property. Void values may be provided for the old and the new values if their true values are not known.

TABLE 68

STRUCTURE PropertyChangeEvent

```
struct PropertyChangeEvent:
    com::sun::star::lang::EventObject
{
string PropertyName;
boolean Further;
long PropertyHandle;
any OldValue;
any NewValue;
};
```

Figure 20:
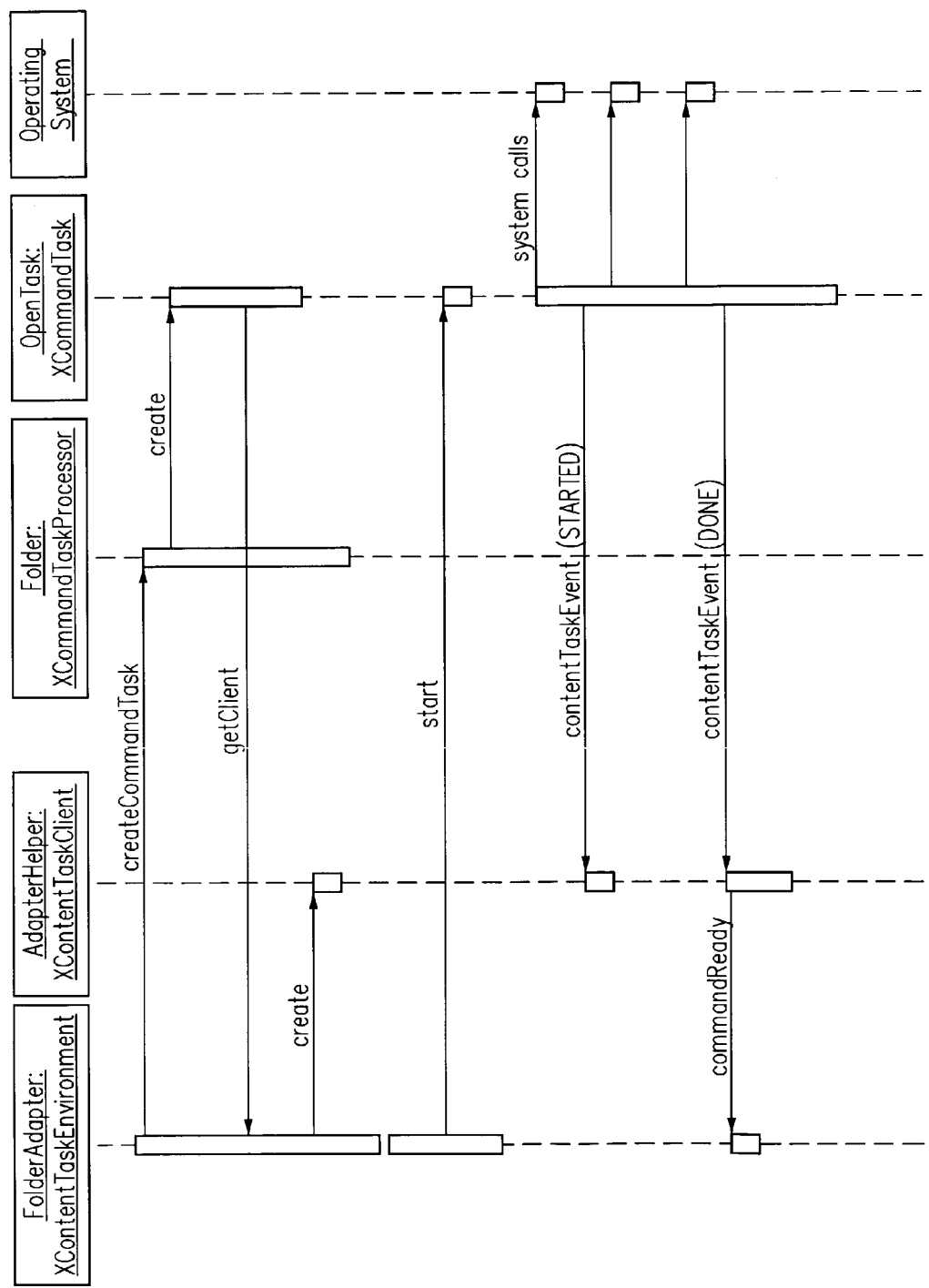
FIG. 20 is a sequence diagram that illustrates the asynchronous processing capability of the interfaces according to another embodiment of the present invention.

As described above, a content object that creates content implements interface XContentCreator. This interface defines what type of content may be created via method queryCreatableContentsInfo. This interface returns a structure, which contains the MIME types of content that may be created. New content is created by calling method createNewContent with the appropriate ContentInfo, i.e., a supported MIME type. This method does not persist the content since what has been created has not been initialized. Initialization may result in property and command operations on the new content. When the content has been initialized, the content can be inserted into the parent. FIG. 20 is a sequence diagram that illustrates the asynchronous operation of a command on a file system folder. In this example folder adapter object 505 implements interface XContentTaskEnvironment, and issues a call to method createCommandTask of a folder object that implements interface XCommandTaskProcessor.

In response to the call to method createCommandTask, a call to method create (FIG. 20) in interface XCommandTask of an opentask object is issued. Interface XCommandTask issues a call to method getClient of interface XContentTaskEnvironment. When the task is returned to interface XContentTaskEnvironment, an interface XContentTaskClient is created for the task and then method start is called in interface XCommandTask. Notice that the method returns before execution is completed.

At a later time, interface XCommandTask executes the task by making systems calls to the operating system. Also, the task status is returned to interface XContentTaskClient. When the task is done, a done event is sent to interface XContentTaskClient that calls method commandready in interface XContentTaskEnvironment to indicate that the task is done. Notice that the folder adapter object was not required to remain active while the task was being executed.

Figure 21:
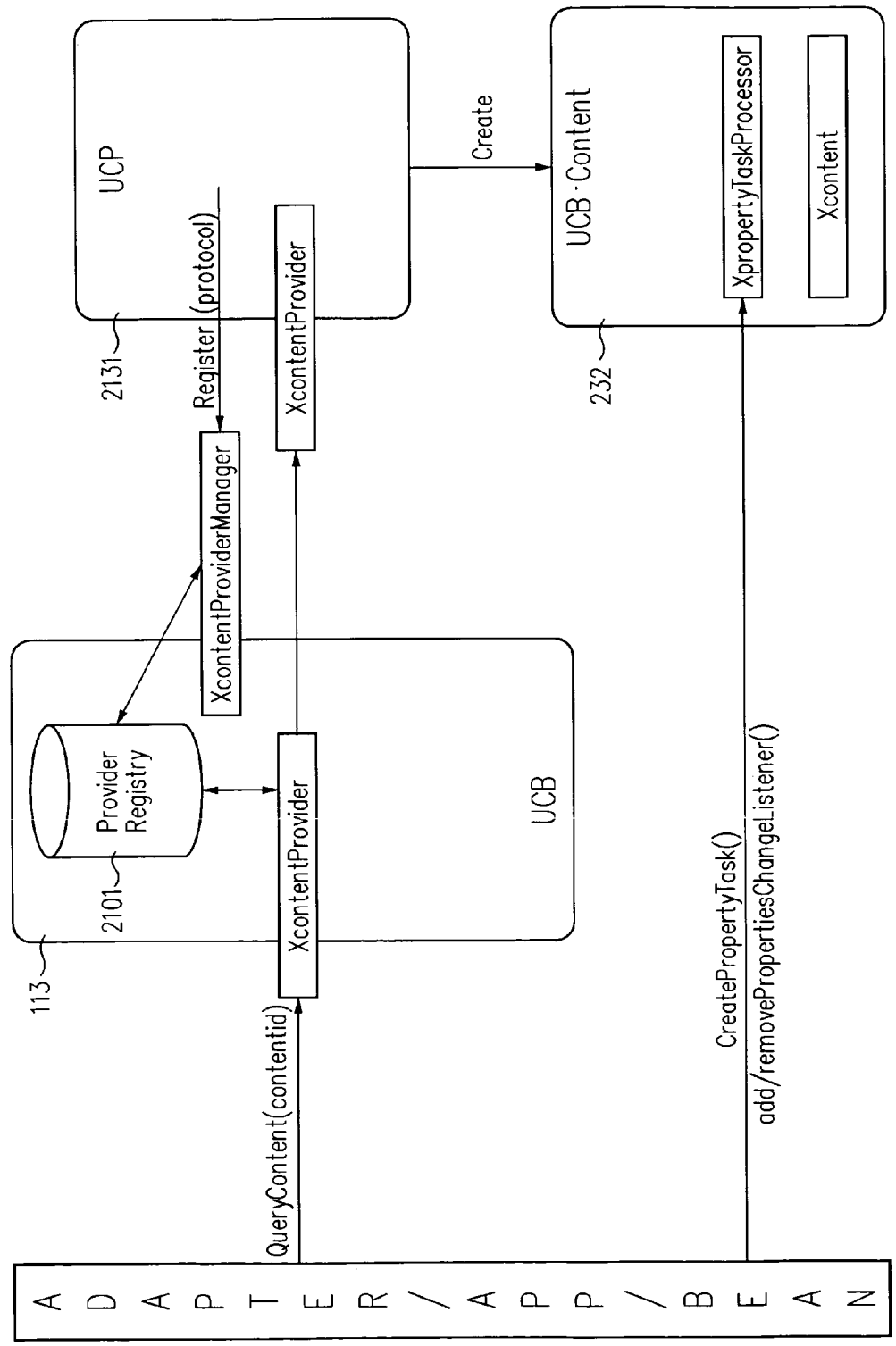
FIG. 21 is an illustration of the processes implemented by the universal content broker according to another embodiment of the present invention.
Figure 22:
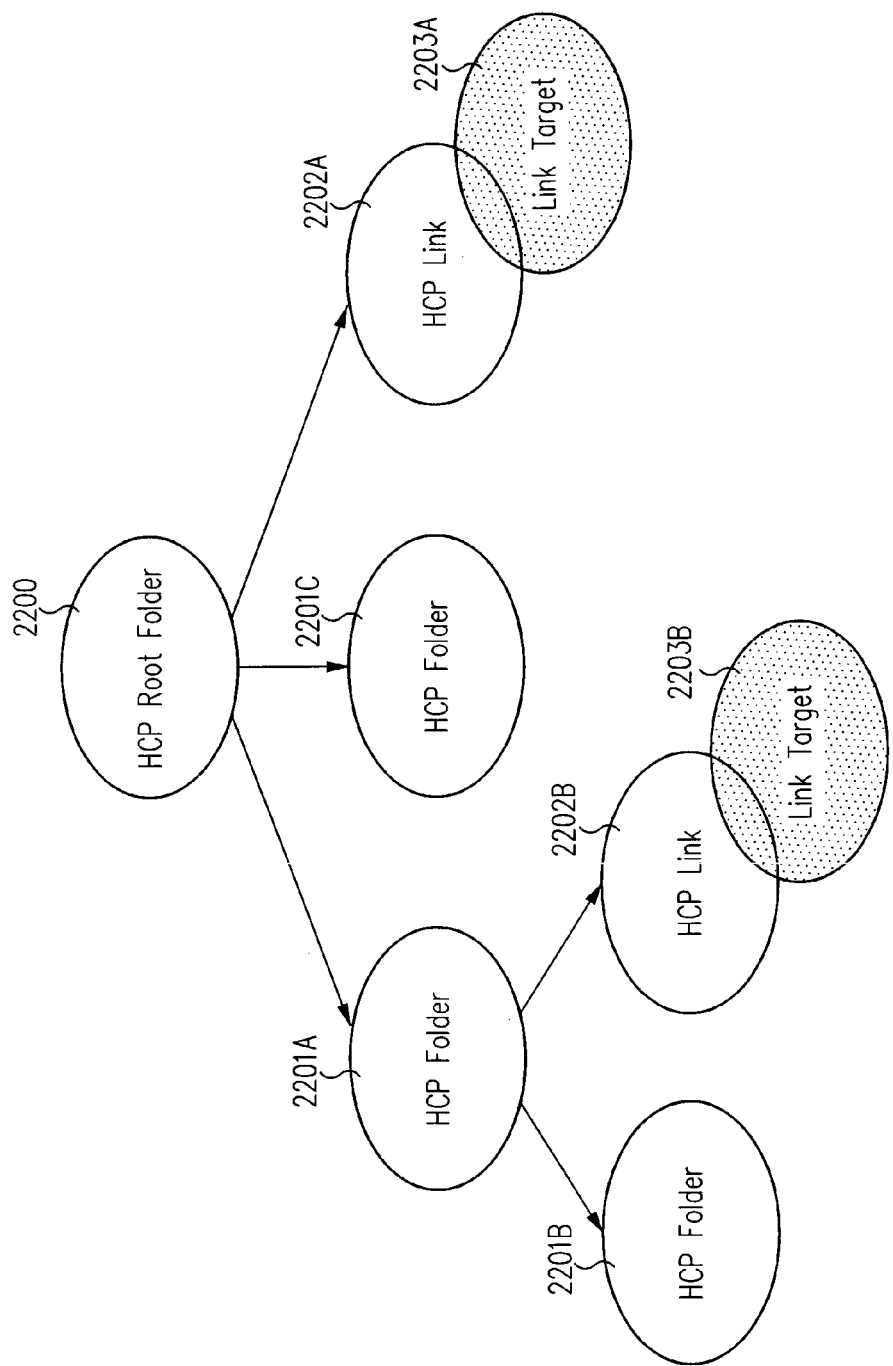
FIG. 22 is an illustration of the components of the hierarchy service according to another embodiment of the present invention.

The following table is another pseudo-code example of the use of the interfaces described above. In this example, UCB 113 is used to open a file folder and to add a new file in the file folder. As described above, a runtime function getGlobalServiceManager is used to create an instance of UCB 113 that implements service UniversalContentBroker. As shown in FIG. 21, a file system registers with UCB 113 as a universal content provider 2131 for protocol "file" that was sometimes referred to as a URL scheme. As illustrated in FIG. 21, universal content provider 2131 uses interface XContentProviderManager, which was described above, to register with UCB 113 and to be place in provider registry 2101.

Figure 8:
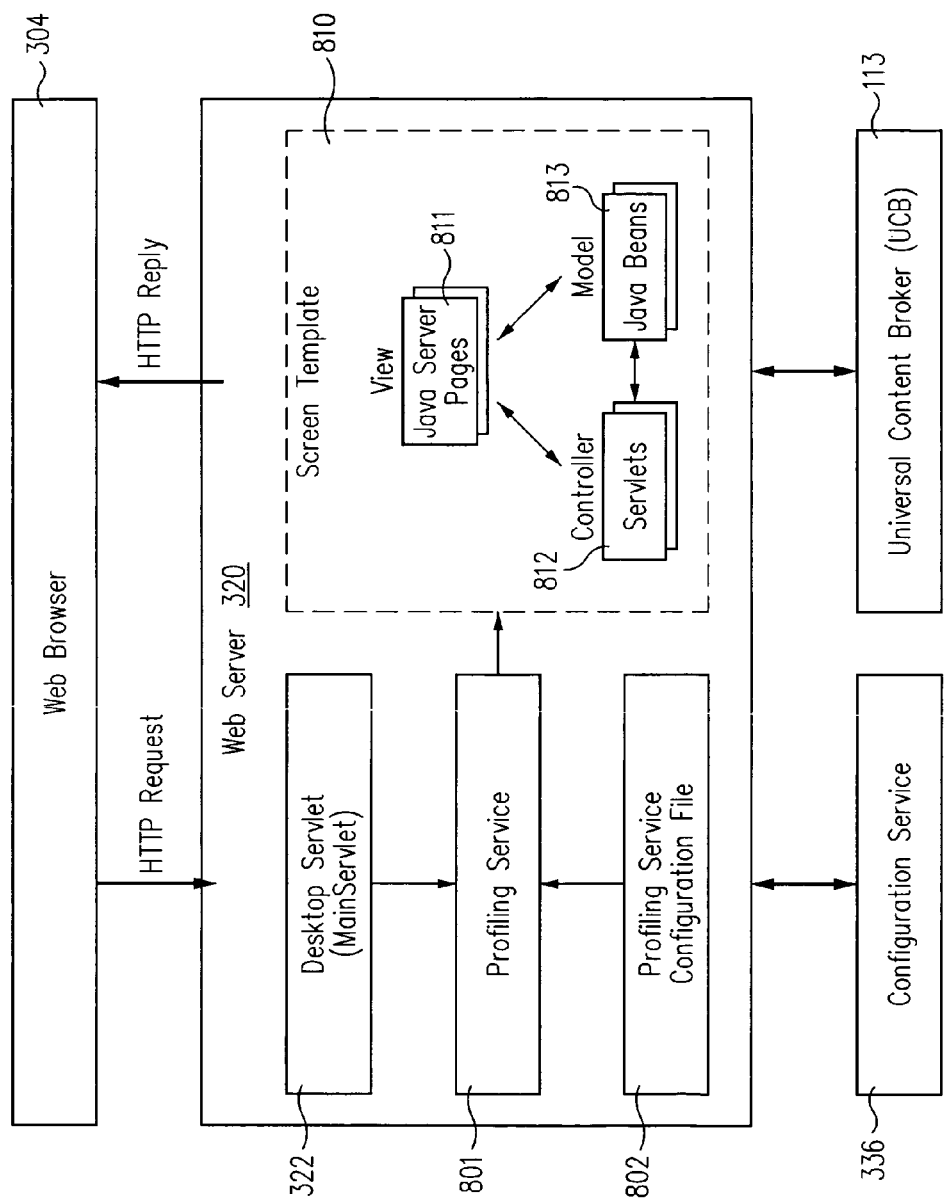
FIG. 8 is a more detailed illustration of the presentation and logic service according to another embodiment of the present invention.

A client of UCB 113, which as described above can be an application/service in remote applications 310, a folder adapter 505 of FIG. 5, or a JAVA bean of FIG. 8, creates an identifier factory that implements interface XContentIdentifierFactory. The client creates a provider object that implements interface XContentProvider, and then obtains an identifier for a folder on the file system by passing a URL to the folder to method createContentIdentifer of interface XContentIdentifierFactory. To open the file system folder, the client, as illustrated in FIG. 21 issues a call to method queryContent to interface XContentProvider of the provider object.

Next, to create a file as new UCB content, a content creator object is defined that implements interface XContentCreator. Method createNewContent is called in the content creator object with content type of text/html to create object newfileContent. Properties of the new file are initialized, and then property task processor is created that implements interface XPropertyTaskProcessor. A property task is obtained by a call to method createPropertyTask (See FIG. 21 and following Table) and then executed to assign the properties to object newfileContent. Next, the file with the properties is inserted in the parent folder using interface XCommandProcessor.

TABLE 69

Example of Using UCB.

```
// opening a file system folder
globalManager := getGlobalServiceManager ( )
ucb :=
    globalManager.createInstance ("com.sun.star.ucb.Uni
    versalContentBroker")
identifierFactory :=
    ucb.queryInterface ("com.sun.star.ucb.XContentIdent
    ifierFactory")
provider :=
    ucb.queryInterface ("com.sun.star.ucb.XContentProvi
    der")
identifier :=
    identifierFactory.createContentIdentifier ("file://
    /home/usr/user1")
folderContent := provider.queryContent (identifier)
// create a file as new UCB content
contentCreator := folderContent.
    queryInterface ("com.sun.star.ucb.XContentCreator")
contentInfo.Type := "text/html"
```

TABLE 69-continued

Example of Using UCB.

```
newFileContent := contentCreator.
    createNewContent (contentInfo)
// initialize the new content with one attribute
properties := new PropertyValue[1]
properties[0].Name := "Title"
properties[0].Value := "test.html"
propertyTaskProc := newFileContent.
    queryInterface ("com.sun.star.XPropertyTaskProcesso
    r")
propertyTask :=
    propertyTaskProc.createPropertyTask (PropertyTaskTy
    pe.SET, properties, 0)
propertyTask.execute ( )
// insert the file into the parent folder
commandProc :=
    newFileContent.queryInterface("com.sun.star.ucb.XC
    ommandProcessor")
command.Name := "Insert"
id = commandProc.createCommandIdentifier( )
commandProc.execute (id, command, 0)
// on successful return the changes are stored
```

Obtaining Children From Content

From the content object, a reference to interface XIndexAccess is obtained. The number of children is obtained from method getCount. Each child is obtained via method getByIndex, which is of type Any. If type Any can be cast to a reference to a pointer to interface XContent, an XContent reference is obtained. The XContentIdentifier reference is obtained from interface XContent. From this the scheme is printed out. From XContent the MIME type is printed out. See the following table.

TABLE 70

```
Reference< XIndexAccess > xIdx(
    Reference< XIndexAccess >::query( m_xContent
) );
sal_uInt32 nCount = xIdx->getCount( );
if ( nCount
{
    print( "Children:" );
    for ( sal_uInt32 n = 0; n < nCount; ++n )
    {
        Any aChild = xIdx->getByIndex( n );
        if ( aChild.getValueType( ) ==
            getCppuType( (const Reference< XContent
>*)NULL ) )
        {
            const Reference< XContent >*
pContent =
                SAL_STATIC_CAST( const
Reference< XContent >*,
                aChild.getValue( ) );
            Reference< XContent > xContent(
*pContent );
            Reference<XContentIdentifier >
xId(
                xContent->getIdentifier( ) );
            WString aText( "\t" );
            aText += xId-
>getContentIdentifier( ).getStr( );
            aText += " – ";
            aText += xContent-
>getContentType( );
            print( aText );
        }
    }
}
```

Executing Tasks on Content Objects.

Once an XContent reference is obtained for a content object, it is possible, if supported, to execute tasks on the content to send commands or get and set values of properties.

Querying Commands.

From the content object, a reference to interface XCommandProcessor is obtained. If the reference is valid, a reference to interface XCommandInfo is obtained and from this the sequence of possible commands. The command names are then printed out.

Executing Commands.

A reference to interface XCommandTask is created from the reference to interface XCommandTaskProcessor with a given Command and reference to the XContentTaskEnvironment. If the task is valid, the task is executed synchronously via method execute. The resultant object of type any is obtained via method getResult. See the above examples.

Querying Properties.

From the XContent reference the XPropertyTaskProcessor reference is obtained. If the task is valid, then the reference to interface XPropertySetInfo is obtained via the method getPropertySetInfo. The sequence of property names is then obtained from method getProperties. The property names are then printed out.

Get Value of a Property.

From the XPropertyTaskProcessor reference, an XPropertyTask reference is created via the method createPropertyTask with a sequence of properties and a reference to interface XContentTaskEnvironment. If the task is valid, the property is obtained by calling method execute. Thus, the property is obtained synchronously. The sequence of values is then obtained from method getProperties method. The value of the first property is then obtained in an any.

Hierarchy Service

As described above, UCB 113 aggregates the content from different transport protocols and different storage systems in a homogeneous API. As the UCB aggregates content on API level, hierarchy service 335 extend the concept of hierarchal relations to virtual hierarchy of UCB contents (FIG. 2D). Hierarchy service 335 is a UCP, which provides three kinds of contents: a root folder, virtual folders and links to other UCB contents. This means a client can use hierarchy service 335 to store a user defined 'view' on several UCB contents. The 'view' is defined by the hierarchical relation between virtual folders and links to other UCB contents. These relations are stored in user configuration service, as described above.

Hierarchy service 335 provides three different types of contents: a HCP Link, a HCP Folder and a HCP Root Folder. A HCP link 2202A is a content, which points to another UCB content 2203A. A HCP link 2202A is always contained in a HCP Folder 2200. A HCP Link has no children. A HCP Folder, e.g., folders 2200, 2201A to 2201C, is a container for other HCP Folders and HCP Links. There is at most one instance of a HCP Root Folder 2200 at a time. All other HCP contents are children of this folder. The HCP Root Folder can contain HCP Folders and HCP Links. In one embodiment, root folder 2200 has a URL such as vnd.sun.star.hier:/.

HCP Folders 2201A to 2201C and HCP Root Folder 2200 implement the interface XContentCreator. HCP Links and HCP Folders support the command „insert". This means all HCP Folders and the HCP Root Folder as well can create new HCP Folders and HCP Links.

To create a new child of a HCP Folder, the parent folder creates a new content by calling its method createNewContent. The content type to use for new folders is application/vnd.sun.star.hier-folder. To create a new link, the type string application/vnd.sun.star.hier-link is used. The URLs used here are illustrative only and are not intended to limit the invention to the specific example.

To set a title at the new folder/link, the new child executes a command setPropertyValues, which sets at least the property „Title" to a non-empty value. Also, the child can set the property TargetURL as well at this time, but this is not required. This property may also be set later.

Next, the new child (not the parent) executes the command „insert". This commits the creation process.

URL Scheme for HCP Contents

Each HCP content has an identifier corresponding to the following scheme:
vnd.sun.star.hier:/<path>
where <path> is a hierarchical path of the form <name>/<name>/ . . . /<name>
where <name> is a string encoded according to the URL conventions.

EXAMPLES vnd.sun.star.hier:/ (The URL of the HCP Root Folder)
vnd.sun.star.hier:/Bookmarks/Sun%20Microsystems%20Home%20Page
vnd.sun.star.hier:/Workplace/Printers The following table gives an overview of different HCP contents.

HCP 335 is transparent for the client program code, whether the UCB content is stored on the file system, retrieved via HTTP or just a virtual folder, provided by the users configuration. Transparent means, that the same client program code, which works on a UCB content from file system, works on UCB content from HCP and any other UCP, too. HCP 335 uses configuration server 336 as persistent storage for the virtual hierarchy. In one embodiment, the hierarch content provider 335 stores the relations between virtual folders and links also in XML.

Interface XPropertiesChangeNotifier includes two methods. Method addPropertiesChangeListener adds an interface XPropertiesChangeListener to the specified properties with the specified names. Input parameter PropertyNames specifies the names of the properties. An empty sequence means "all properties". Input parameter Listener contains the listener for the property change events. Method removePropertiesChangeListener removes an interface XPropertiesChangeListener from the list.

TABLE 71

Interface XPropertiesChangeNotifier interface XPropertiesChangeNotifier :
   com::sun::star::uno::XInterface
{
[oneway] void addPropertiesChangeListener( [in]
   sequence<string> PropertyNames, [in]
   com::sun::star::beans::XPropertiesChangeListener
   Listener ) ;
[oneway] void removePropertiesChangeListener( [in]
   sequence<string> PropertyNames, [in]
   com::sun::star::beans::XPropertiesChangeListener
   Listener );
};

|   | UCB Type (returned by XContent::getContentType ) | Properties | Commands | Interfaces |
|---|---|---|---|---|
| Link | application/vnd.sun.star.hier-link | ContentType IsDocument IsFolder Title TargetURL | getCommandsInfo getPropertySetInfo getPropertyValues setPropertyValues insert delete | XTypeProvider, XServiceInfo, XComponent, XContent, XCommandProcessor, XPropertiesChangeNotifier, XPropertyContainer, XPropertySetInfoChangeNotifier, XCommandInfoChangeNotifier, XChild |
| Folder | application/vnd.sun.star.hier-folder | ContentType IsDocument IsFolder Title | getCommandInfo getPropertySetInfo getPropertyValues setPropertyValues insert delete open transfer* | same as HCP Link, XContentCreator |
| Root Folder | application/vnd.sun.star.hier-folder | ContentType IsDocument IsFolder Title | getCommandInfo getPropertySetInfo getPropertyValues setPropertyValues open transfer* | same as HCP Link, XContentCreator |

*The "transfer" Command only transfers HCP-Contents to HCP folders. It does not handle contents with a URL scheme other then the HCP-URL-scheme.

Interface XPropertyContainer includes methods to add a property and remove a property from a container. Parameter Name specifies the name of the new property. Parameter Attributes specifies the attributes for the new property. Parameter DefaultValue specifies the default value for the new property.

TABLE 72

Interface XPropertyContainer

```
interface XPropertyContainer:
    com::sun::star::uno::XInterface
{
void addProperty( [in] string Name, [in] short
    Attributes, [in] any DefaultValue )
    raises(
    com::sun::star::beans::PropertyExistException,
    com::sun::star::beans::IllegalTypeException,
    com::sun::star::lang::IllegalArgumentException );
void removeProperty( [in] string Name )
    raises(
    com::sun::star::beans::UnknownPropertyException,
    com::sun::star::beans::NotRemoveableException );
};
```

Interface XPropertySetInfoChangeNotifier includes methods to add and remove listeners for property set information change events.

TABLE 73

Interface XPropertySetInfoChangeNotifier

```
interface XPropertySetInfoChangeNotifier :
    com::sun::star::uno::XInterface
{
void addPropertySetInfoChangeListener ( [in]
    XPropertySetInfoChangeListener Listener );
void removePropertySetInfoChangeListener(
    [in] XPropertySetInfoChangeListener Listener );
};
```

Interface XPropertySetInfoChangeListener includes method propertySetInfoChange that is called whenever changes of an interface XPropertySetInfo is to be propagated.

TABLE 74

Interface XPropertySetInfoChangeListener

```
interface XPropertySetInfoChangeListener :
    com::sun::star::lang::XEventListener
{ void propertySetInfoChange( [in]
    PropertySetInfoChangeEvent evt );
};
```

TABLE 75

Structure PropertySetInfoChangeEvent

```
struct PropertySetInfoChangeEvent:
    com::sun::star::lang::EventObject
{
string Name;
long Handle;
/** contains the reason for the event. */
long Reason;
};
```

Interface XCommandInfoChangeNotifier adds, i.e., registers listeners for CommandInfoChangeEvents.

TABLE 76

Interface XCommandInfoChangeNotifier

```
interface XCommandInfoChangeNotifier :
    com::sun::star::uno::XInterface
{
void addCommandInfoChangeListener ( [in]
    XCommandInfoChangeListener Listener );
void removeCommandInfoChangeListener ( [in]
    XCommandInfoChangeListener Listener );
};
```

The function of interface XCommandInfoChangeListener is equivalent to the other listener interfaces described above.

TABLE 77

Interface XCommandInfoChangeListener

```
interface XCommandInfoChangeListener :
    com::sun::star::lang::XEventListener
{
void commandInfoChange( [in] CommandInfoChangeEvent evt
    );
};
```

Other interfaces that are used include the following. Interface XIdlClass provides information about a type or module. Every array also belongs to a type that is reflected as a XIdlClass object that is shared by all arrays with the same element type and number of dimensions. Finally, any of the primitive IDL types are also represented as XIdlClass objects. This includes "void, any, boolean, char, float, double, octet, short, long, hyper, unsigned octet, unsigned short, unsigned long" and "unsigned hyper". Interface XIdlClass inherits from interface XInterface.

TABLE 78

INTERFACE XIdlClass

```
interface XIdlClass: com::sun::star::uno::XInterface
{
sequence<XIdlClass> getClasses ( );
XIdlClass getClass( [in] string aName );
boolean equals( [in] XIdlClass Type );
boolean isAssignableFrom( [in] XIdlClass xType );
com::sun::star::uno::TypeClass getTypeClass ( );
string getName ( );
[const] com::sun::star::uno::Uik getUik ( );
sequence<XIdlClass> getSuperclasses ( );
sequence<XIdlclass> getInterfaces ( );
XIdlClass getComponentType ( );
XIdlField getField( [in] string aName );
sequence<XIdlField> getFields ( );
XIdlMethod getMethod( [in] string aName );
sequence<XIdlMethod> getMethods ( );
XIdlArray getArray ( );
void createObject( [out] any obj );
};
```

Method getClasses returns all types and modules, which are declared in this class. Method getClass returns a type or module with the given name that is declared in this class. Method equals returns <TRUE> if the instances describe the same type, otherwise <FALSE>. Method isAssignableFrom tests if the parameter xType is a subclass of this class. Method getTypeClass returns the type that this instance represents. Method getName returns the fully qualified name of the type of object (class, interface, array, sequence, struct, union, enum or primitive) represented by this XIdlClass object. Method getUik returns the UIK from this type. If the type has no UIK, the returned UIK is zero.

If this object represents an interface or a class, the objects that represent the superclasses or superinterfaces of that class are returned by method getSuperclasses. If this object is the one that represents the topmost class or interface, an empty sequence is returned.

Method getInterfaces determines the interfaces implemented by the class or interface represented by this object. If the class or interface implements no interfaces, the method returns a sequence of length 0.

If this class represents an array or sequence type, method GetComponentType returns the XIdlClass object representing the component type of the array or sequence; otherwise it returns null. Method getField returns a XIdlField object that reflects the specified member field of the class, interface, struct, union, enum or exception represented by this XIdlClass object. If a field with the specified name is not found, zero is returned. The field to be reflected is located by searching all the member fields of the class, interface, struct, union, enum or exception represented by this XIdlClass object for a field with the specified name or for NULL, if a field with the specified name is not found. Parameter aName specifies the simple name of the desired field.

Method getFields returns a sequence containing Field objects reflecting all the accessible fields of the class, interface, struct, union or enum represented by this XIdlClass object. Method getFields returns a sequence of length zero if the class or interface has no accessible fields, or if it represents an array, a sequence or a primitive type. Specifically, if this XIdlClass object represents a class, this method returns the fields of this class and of all its superclasses. If this XIdlClass object represents an interface, the method returns the fields of this interface and of all its superinterfaces. If this XIdlClass object represents an array, sequence or primitive type, this method returns a sequence of length zero.

Method getMethod returns a XIdlMethod object that reflects the specified member method of the interface represented by this XIdlClass object. If a method with the specified name is not found, "0" is returned. The method to be reflected is located by searching all the member methods of the interface represented by this XIdlClass object for a method with the specified name. Parameter aName specifies the simple name of the desired method.

Method getMethods returns a sequence containing XIdlMethod objects reflecting all the member methods of the class or interface represented by this XIdlClass object, including those declared by the class or interface and those inherited from superclasses and superinterfaces. Returns a sequence of length 0 if the class or interface has no member methods.

Method getArray returns interface XIdlArray to get and set the elements by index if the represented type is an array or sequence. Method createObject creates an instance of the type represented by this XIdlClass object if the represented type is a basic type, struct, enum, or sequence.

Enumeration TypeClass describe all type classes, which can be defined in the IDL.

TABLE 79

Enumeration TypeClass enum TypeClass
{
VOID,
CHAR,
BOOLEAN,
BYTE,
SHORT,
UNSIGNED_SHORT,
LONG,
UNSIGNED_LONG,
HYPER,
UNSIGNED_HYPER,
FLOAT,
DOUBLE,
STRING,
TYPE,
ANY,
ENUM,
TYPEDEF,
STRUCT,
UNION,
ARRAY,
INTERFACE,
SERVICE,
MODULE,
INTERFACE_METHOD,
INTERFACE_ATTRIBUTE,
UNKNOWN
};

Interface XIdlField inherits from interface X-TdlMember.

TABLE 80

INTERFACE XIdlField interface XIdlField:
    com::sun::star::reflection::XIdlMember
{
com::sun::star::reflection::XIdlClass getType( );
com::sun::star::reflection::FieldAccessMode
    getAccessMode( );
any get( [in] any obj )
    raises(
        com::sun::star::lang::IllegalArgumentException );
void set( [in] any obj, [in] any value )
    raises(
        com::sun::star::lang::IllegalArgumentException,
        com::sun::star::lang::IllegalAccessException );
};

Method getType returns a XIdlClass object that identifies the declared type for the field represented by this XIdlField object. Method getAccessMode returns an enumeration value, which denotes whether the field is "const", "readonly", "writeonly" or "readwrite".

Method get returns the value of the field represented by this field on the specified object. The underlying field's value is obtained as follows:
If the underlying field is a constant, the object argument is ignored; it may be NULL;
Otherwise, the underlying field is an instance field.
If the specified object argument is NULL, the method throws an "IllegalArgumentException". If the specified object is not an instance of the class, interface, struct, union or enum declaring the underlying field, the method throws an "IllegalArgumentException". Otherwise, the value is retrieved from the underlying instance or constant.

Method set sets the field represented by this XIdlField object on the specified object argument to the specified new value. The operation proceeds as follows. If the specified object argument is NULL, the method throws an exception IllegalArgumentException. If the specified object argument is not an instance of the class or interface declaring the underlying field, the method throws an exception IllegalArgumentException. If the underlying field is constant, the method throws an exception IllegalAccessException. If the new value cannot be converted to the type of underlying field by an identity or widening conversion, the method throws an IllegalArgumentException. The field is set to the possibly widened new value.

Interface XIdlMember inherits from interface XInterface. Interface XIdlMember makes it possible to access members of classes dynamically.

TABLE 81

INTERFACE XIdlMember interface XIdlMember: com::sun::star::uno::XInterface
{
XIdlClass getDeclaringClass( );
string getName( );
};

Method getDeclaringClass returns the XIdlClass object representing the class, interface, struct, union or enum that declares the member represented by this member. Method getName returns the fully qualified name of the type (class, interface, array, sequence, struct, union, enum or primitive) represented by this XIdlClass object, as a string.

The values in enumeration FieldAccessMode are used to specify the kind of attribute or property.

TABLE 82

Enumeration FieldAccessMode enum FieldAccessMode
{
//------------------------------------------------
/** The property is readable and writeable
*/
READWRITE,
//------------------------------------------------
/** The property is readonly
*/
READONLY,
//------------------------------------------------
/** The property is write only
*/
WRITEONLY,
//------------------------------------------------
/** @deprecated
*/
CONST
};

Exception IllegalArgumentException is thrown to indicate that a method has passed an illegal or inappropriate argument. Exception IllegalArgumentException inherits from exception Exception. Field ArgumentPosition identifies the position of the illegal argument. This field is −1 if the position is not known.

TABLE 83

EXCEPTION IllegalArgumentException exception IllegalArgumentException:
    com::sun::star::uno::Exception
{

TABLE 83-continued

EXCEPTION IllegalArgumentException short ArgumentPosition;
};

Exception IllegalAccessException is thrown when an application tries to change a constant property. Exception IllegalAccessException inherits from exception Exception.

TABLE 84

EXCEPTION IllegalAccessException exception IllegalAccessException:
    com::sun::star::uno::Exception
{
};

Interface XIdlMethod inherits from interface X-TdlMember. Interface X-TdlMember makes it possible to access the specification of a method dynamically.

TABLE 85

INTERFACE XIdlMethod interface XIdlMethod:
    com::sun::star::reflection::XIdlMember
{
XIdlClass getReturnType( );
sequence<XIdlClass> getParameterTypes( );
sequence<ParamInfo> getParameterInfos( );
sequence<com::sun::star::reflection::XIdlClass>
    getExceptionTypes( );
com::sun::star::reflection::MethodMode getMode( );
any invoke( [in] any obj, [inout] sequence<any> args )
    raises(
    com::sun::star::lang::IllegalArgumentException,
    com::sun::star::reflection::InvocationTargetException
    );
};

Method getReturnType returns a XIdlClass object that represents the formal return type of the method represented by this method object. Method getParameterTypes returns a sequence of XIdlClass objects that represent the formal parameter types, in declaration order, of the method represented by this Method object. Method getParameterTypes returns a sequence of length 0 if the underlying method takes no parameters.

Method getParameterInfos returns a sequence of ParamInfo objects that represent all information about the formal parameter types, in declaration order, of the method represented by this Method object. Method getParameterInfos returns a sequence of length 0 if the underlying method takes no parameters.

Method getExceptionTypes returns a sequence of XIdlClass objects that represent the types of the checked exceptions thrown by the underlying method represented by this Method object. Method getExceptionTypes returns a sequence of length 0 if the method throws no checked exceptions.

Method getMode returns an enumeration value, which denotes whether the method is one-way or two-way. Method invoke invokes the underlying method represented by this method object on the specified object with the specified parameters. Individual parameters are subject to widening conversions as necessary.

Method invocation proceeds in the following order:

If the specified object argument is NULL, the invocation throws an IllegalArgumentException; and Otherwise, if the specified object argument is not an instance of the class or interface declaring the underlying method, the invocation throws an exception IllegalArgumentException.

If the number of actual parameters supplied via args is different from the number of formal parameters required by the underlying method, the invocation throws an Exception IllegalArgumentException. For each actual parameter in the supplied args array, if the parameter value cannot be converted to the corresponding formal parameter type by an identity or widening conversion, the invocation throws exception. IllegalArgumentException. When the control transfers to the underlying method and the method stops abruptly by throwing an exception, the exception is placed in an exception InvocationTargetException and thrown in turn to the caller of the method. If the method completes normally, the value it returns is returned to the caller of the method. If the underlying method returns type is void, the invocation returns VOID.

Structure ParamInfo describes a formal parameter of a method.

TABLE 86

| STRUCTURE ParamInfo |
| --- |
| struct ParamInfo<br>{<br>/** The name of the parameter.<br>*/<br>string aName;<br>//---------------------------------------------------------------------<br>/** One of the values IN, OUT, INOUT from the ParamMode enumeration.<br>  */<br>ParamMode aMode;<br>//---------------------------------------------------------------------<br>/** The type of the parameter.<br>  */<br>XIdlClass aType;<br>}; |

The values in Enumeration ParamMode are used to specify if a formal parameter of a method is used for input, output or both. If the value is an IN parameter, data can only transferred from the callee to the caller. If the value is an OUT parameter, data can only transferred from the caller to the callee. If value is an INOUT parameter, data can be transferred in both directions.

TABLE 87

| ENUMERATION ParamMode |
| --- |
| enum ParamMode<br>{<br>IN,<br>OUT,<br>INOUT<br>}; |

The values in Enumeration MethodMode are used to specify the calling mode of a method. If the value is an ONEWAY parameter, the method call may be asynchronous. If the value is a TWOWAY parameter, the method call is synchronous.

TABLE 88

| ENUMERATION MethodMode |
| --- |
| enum MethodMode<br>{<br>ONEWAY,<br>TWOWAY<br>}; |

Exception InvocationTargetException is a checked exception that wraps another exception. Typically such exceptions are thrown by an invoked method or constructor. Exception InvocationTargetException inherits from exception WrappedTargetException.

TABLE 89

| EXCEPTION InvocationTargetException |
| --- |
| exception InvocationTargetException:<br>   com::sun::star::lang::WrappedTargetException<br>{<br>}; |

Exception WrappedTargetException is a checked exception that wraps an exception thrown by the original target. Normally this exception is declared for generic methods. Exception WrappedTargetException inherits from exception Exception.

TABLE 90

| EXCEPTION WrappedTargetException |
| --- |
| exception WrappedTargetException:<br>   com::sun::star::uno::Exception<br>{<br>any TargetException;<br>}; |

Interface XIdlArray provides methods to dynamically access arrays. Interface XIdlArray inherits from interface XInterface.

TABLE 91

| INTERFACE XIdlArray |
| --- |
| interface XIdlArray: com::sun::star::uno::XInterface<br>{<br>void realloc( [inout] any array, [in] long length )<br>  raises(<br>    com::sun::star::lang::IllegalArgumentException );<br>long getLen( [in] any array )<br>  raises(<br>    com::sun::star::lang::IllegalArgumentException );<br>any get( [in] any aArray, [in] long nIndex )<br>  raises(<br>    com::sun::star::lang::IllegalArgumentException,<br>    com::sun::star::lang::ArrayIndexOutOfBoundsExcepti<br>      on );<br>void set( [inout] any aArray, [in] long nIndex, [in]<br>    any aNewValue )<br>  raises(<br>    com::sun::star::lang::IllegalArgumentException,<br>    com::sun::star::lang::ArrayIndexOutOfBoundsException<br>      );<br>}; |

Method realloc in interface XIdlArray changes the size of the array to the new size. If the new length is greater, the additional elements are default constructed, otherwise the elements are destructed. Method realloc throws an exception IllegalArgumentException if the specified object is not an array or if the specified object is null.

Method getLen in interface XIdlArray returns the number of elements in the array. Method getLen throws an exception IllegalArgumentException if the specified object is not an array or if the specified object is null.

Method get in interface XIdlArray returns the value of the indexed component in the specified array object. Method get throws exception IllegalArgumentException, if the specified object is not an array or if the specified object is null. Method get throws exception ArrayIndexOutOfBoundsException, if the specified index argument is negative, or if the specified index argument is greater than or equal to the length of the specified array.

Method set in interface XIdlArray sets the value of the indexed component of the specified array object to the specified new value. Method set throws exception IllegalArgumentException, if the specified object is not an array or if the specified object is null. Method set throws exception ArrayIndexOutOfBoundsException, if the specified index argument is negative, or if the specified index argument is greater than or equal to the length of the specified array.

Exception ArrayIndexOutOfBoundsException is thrown to indicate that an array has been accessed with an illegal index. The index is either negative or greater than or equal to the size of the array. Exception ArrayIndexOutOfBoundsException inherits from exception IndexOutOfBoundsException.

TABLE 92

EXCEPTION
ArrayIndexOutOfBoundsException exception ArrayIndexOutOfBoundsException:
    com::sun::star::lang::IndexOutOfBoundsException
{
};

Exception IndexOutOfBoundsException is thrown to indicate that a container has been accessed with an illegal index. The index is either negative or greater than or equal to the count of the elements. Exception IndexOutOfBoundsException inherits from exception Exception.

TABLE 93

EXCEPTION IndexOutOfBoundsException exception IndexOutOfBoundsException;
    com::sun::star::uno::Exception
{
};

Those skilled in the art will readily understand that the operations and actions described herein represent actions performed by a CPU of a computer in accordance with computer instructions provided by a computer program. Therefore, the various processes described herein, and the interfaces described herein may be implemented by a computer program causing the CPU of the computer to carry out instructions representing the individual operations or actions as described hereinbefore. The computer instructions can also be stored on a computer-readable medium, or they can be embodied in any computer-readable medium such as any communications link, like a transmission link to a LAN, a link to the internet, or the like.

Thus, the processes and/or interfaces can be implemented by a computer program comprising computer program code or application code. This application code or computer program code may be embodied in any form of a computer program product. A computer program product comprises a medium configured to store or transport this computer-readable code, or in which this computer-readable code may be embodied. Some examples of computer program products are CD-ROM discs, ROM cards, floppy discs, magnetic tapes, computer hard drives, servers on a network, and carrier waves. The computer program product may also comprise signals, which do not use carrier waves, such as digital signals transmitted over a network (including the Internet) without the use of a carrier wave.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

This application is related to the following copending, commonly filed, and commonly assigned applications, each of which is incorporated herein by reference in its entirety:

U.S. patent application Ser. No. 09/760,321, now abandoned, entitled "A METHOD AND SYSTEM FOR DYNAMICALLY DISPATCHING FUNCTION CALLS FROM A FIRST EXECUTION ENVIRONMENT TO A SECOND EXECUTION ENVIRONMENT," of Markus Meyer;

U.S. patent application Ser. No. 09/759,742, entitled "A METHOD AND STRUCTURE FOR DYNAMIC CONVERSION OF DATA," of Ralf Hofmann and Michael Hönning;

U.S. patent application Ser. No. 09/759,744, entitled "A COMPUTER-BASED PRESENTATION MANAGER AND METHOD FOR INDIVIDUAL USER-DEVICE DATA REPRESENTATION," of Ralf Hofmann, Torsten Schulz, Bernd Eilers, and Thomas Pfohe;

U.S. patent application Ser. No. 09/759,786, entitled "METHOD AND SYSTEM FOR REMOTE CONTROL AND INTERACTION WITH A RUN TIME ENVIRONMENT COMPONENT," of Ralf Hofmann and Torsten Schulz.

While the present invention has been explained in connection with certain embodiments thereof, other embodiments will be apparent to those skilled in the art from consideration of the specification and practice of the invention disclosed therein. It is intended that the specification and examples be considered as exemplary only, without limiting the spirit and scope of the invention.

We claim:

1. A network portal system comprising:
    a middle tier including a web-top manager, wherein said web-top manager is configured to receive a content request, for content provided by a content provider, from a user device in a client tier wherein said content request includes a content provider identifier, wherein said web-top manager further comprises:
        a web server;
        a main servlet executing on said web server, wherein said main servlet receives a user device content request; and
        a presentation and logic system coupled to said main servlet and on said web server, said presentation and logic system configured to receive raw data content in a plurality of different raw data formats from a universal content broker system, wherein said presentation and logic system converts raw data content irrespective of said raw data format, based upon characteristics of said user device, into a page displayable on said user device,
  wherein said presentation and logic system comprises:
    a plurality of templates;
    a plurality of provider objects wherein each provider object is associated with a different content provider identifier; and
    a plurality of adapter objects wherein each adapter object is associated with a different content provider identifier, and further wherein said adapter object receives content from said content provider associated with said different content provider identifier and provides said content to a provider object associated with said different content provider identifier; and
  an information system tier including said universal content broker system coupled to said web-top manager, said universal content broker system comprising:
    a plurality of content providers, wherein each content provider in said plurality of content providers is associated with a different content provider identifier, and each content provider accesses content having a different raw data format;
    a configuration server wherein said configuration server further comprises a first DOM tree including at least one user profile;
    a configuration proxy coupled to said configuration server wherein said configuration proxy further comprises a second DOM tree wherein said second DOM tree includes a subset of data in said first DOM tree;
    a hierarchy content provider wherein said hierarchy content provider generates a virtual hierarchy of content of said universal content broker system; and
    a universal content broker coupled to said web-top manager and to said plurality of content providers wherein upon said receipt of said content request from said web-top manager, said universal content broker passes said request to a content provider, in said plurality of content providers that is associated with said content provider identifier, for said content provider to retrieve said content, if necessary, and to return a handle to said content to said universal content broker.

2. The system of claim 1 wherein said web-top manager further comprises a plurality of remote applications.

3. The system of claim 1 wherein said plurality of templates includes a first set of template sets wherein said first set of template sets is for a first type of user device page format.

4. The system of claim 3 wherein said first set of template sets includes a set of content format template sets wherein each content format template set is for a different one of said plurality of different raw data formats.

5. The system of claim 4 wherein said set of content format templates comprise a set of device capability specific templates.

6. The system of claim 3 wherein said plurality of templates includes a second set of template sets wherein said second set of template sets is for a second type of user device page format.

7. The system of claim 6 wherein said second set of template sets includes a set of content format template sets wherein each content format template set is for a different one of said plurality of different raw data formats.

8. The system of claim 7 wherein said set of content format templates comprise a set of device capability specific templates.

9. The system of claim 1 wherein said presentation and logic system comprises:
  a profiling service.

10. The system of claim 9 wherein said presentation and logic system comprises:
  a profiling service configuration file coupled to said profiling service.

11. The system of claim 10 wherein said profiling service configuration file includes a decision tree wherein said decision tree performs actions.

12. The system of claim 11 wherein said decision tree is a XML decision tree.

13. The system of claim 11 wherein said actions include an action based upon request parameters.

14. The system of claim 11 wherein said actions include an action based upon request header parameters.

15. The system of claim 11 wherein said actions include an action based upon user device properties.

16. The system of claim 11 wherein said actions include an action based upon resource properties.

17. The system of claim 9 wherein said presentation and logic system comprises a plurality of screen templates.

18. The system of claim 17 wherein one screen template in said plurality of screen templates is a default screen template for a HTML page.

19. The system of claim 17 wherein one screen template in said plurality of screen templates is a default screen template for a mobile telephone.

20. The system of claim 17 wherein one screen template in said plurality of screen templates is a default screen template for a personal digital assistant.

21. The system of claim 11 wherein said presentation and logic system comprises a plurality of screen templates.

22. The system of claim 21 wherein one screen template in a plurality of said screen templates comprises a default screen template.

23. The system of claim 22 wherein said default screen template includes a header region having at least one place holder and a body region having at least one place holder.

24. The system of claim 23 wherein said action of said decision tree determines a component that is used for said at least one placeholder in said body region.

25. The system of claim 24 wherein said component provides information that is taken from said raw data content.

26. The system of claim 1 wherein said universal content broker system further comprises:
  a registry of content providers coupled to said universal content broker wherein said universal content broker selects said content provider from said registry based upon said content provider identifier.

27. The system of claim 1, wherein said universal content broker system includes at least one interface adapted to associate property values with content.

28. The system of claim 1, wherein said universal content broker system includes at least one interface adapted to set a property value of content.

29. The system of claim 1, wherein said universal content broker system includes at least one interface adapted to read a property value of content.

30. The system of claim 1, wherein said universal content broker system includes an interface adapted to notify registered client systems when content of interest to said registered client systems is processed by said universal content broker system.

31. The system of claim 1 wherein said universal content broker system includes an interface adapted to notify registered client systems when new content is created by said universal content broker system.

32. The system of claim 1 wherein said universal content broker system further comprises a hierarchy content provider.

33. The system of claim 32 wherein said hierarchy content provider generates a virtual hierarchy of content of said universal content broker system.

34. The system of claim 1 wherein said first DOM tree includes application profiles.

35. The system of claim 1 further comprising a client system, in said client tier, coupled to said network portal system.

36. The system of claim 35 wherein said client system includes a client universal content broker system.

37. The system of claim 36 wherein said client universal content broker system includes a synchronization component for synchronizing content of said client universal content broker system with content of said universal content broker system.

38. The system of claim 1 wherein said web-top manager further comprises:
a plurality of portlets; and
a presentation manager coupled to said plurality of portlets, wherein upon receipt of said user request, said presentation manager sends said user request to one of said plurality of portlets.

39. A method for providing a plurality of content having different types and different protocols to a single user interface comprising:
receiving a content request from a client system, in a client tier, by a web-top manager in a middle tier wherein said content request comprises a content identifier and said web-top manager is included in a network portal system and said web-top manager further comprises:
a web server;
a main servlet executing on said web server, wherein said main servlet receives said content request; and
a presentation and logic system coupled to said main servlet and on said web server, said presentation and logic system configured to receive raw data content in a plurality of different raw data formats from a universal content broker system, wherein said presentation and logic system converts raw data content irrespective of said raw data format, based upon characteristics of said client system, into a page displayable on said client system,
wherein said presentation and logic system comprises:
a plurality of templates;
a plurality of provider objects wherein each provider object is associated with a different content provider identifier; and
a plurality of adapter objects wherein each adapter object is associated with a different content provider identifier, and further wherein said adapter object receives content from said content provider associated with said different content provider identifier and provides said content to a provider object associated with said different content provider identifier;
passing said content request to a universal content broker system in an information system tier by said web-top manager wherein said universal content broker system is included in said network portal system, and said universal content broker system further comprises:
a plurality of content providers, wherein each content provider in said plurality of content providers is associated with a different content provider identifier, and each content provider accesses content having a different raw data format;
a configuration server wherein said configuration server further comprises:
a first DOM tree including at least one user profile;
a configuration proxy coupled to said configuration server wherein said configuration proxy further comprises a second DOM tree wherein said second DOM tree includes a subset of data in said first DOM tree;
a hierarchy content provider wherein said hierarchy content provider generates a virtual hierarchy of content of said universal content broker system; and
a universal content broker coupled to said web-top manager and to said plurality of content providers;
selecting, by said universal content broker system, a content provider associated with said content identifier from said plurality of content providers wherein each of said content providers provides access to content having a different raw data format;
passing said content request to said content provider for said content provider to retrieve said content, if necessary, and to return a handle to said content;
returning said handle from said universal content broker system to said web-top manager;
retrieving said requested content from said selected content provider by said web-top manager using said handle; and
using, by said web-top manager, said retrieved requested content to generate a page displayable on said client system.

40. The method of claim 39 wherein said selecting a content provider comprises:
searching a registry including said plurality of content providers.

* * * * *

UNITED STATES PATENT AND TRADEMARK OFFICE
CERTIFICATE OF CORRECTION

| | | |
|---|---|---|
| PATENT NO. | : 7,269,664 B2 | Page 1 of 1 |
| APPLICATION NO. | : 09/759740 | |
| DATED | : September 11, 2007 | |
| INVENTOR(S) | : Matthias Hütsch, Ralf Hofmann and Kai Sommerfeld | |

It is certified that error appears in the above-identified patent and that said Letters Patent is hereby corrected as shown below:

In Column 95, Lines 13-18, delete entire Claim 32 and entire Claim 33.

Signed and Sealed this

Seventeenth Day of August, 2010

David J. Kappos
*Director of the United States Patent and Trademark Office*